United States Patent
Jung et al.

(10) Patent No.: US 8,966,630 B2
(45) Date of Patent: Feb. 24, 2015

(54) GENERATING AND DISTRIBUTING A MALWARE COUNTERMEASURE

(75) Inventors: Edward K. Y. Jung, Bellevue, WA (US); Royce A. Levien, Lexington, MA (US); Robert W. Lord, Seattle, WA (US); Mark A. Malamud, Seattle, WA (US); William Henry Mangione-Smith, Kirkland, WA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 1758 days.

(21) Appl. No.: 11/487,595

(22) Filed: Jul. 14, 2006

(65) Prior Publication Data

US 2007/0255724 A1    Nov. 1, 2007

Related U.S. Application Data

(63) Continuation-in-part of application No. 11/480,782, filed on Jun. 30, 2006, now Pat. No. 8,613,095, and a continuation-in-part of application No. 11/480,819, filed on Jun. 30, 2006, now Pat. No. 8,117,654, and a continuation-in-part of application No. 11/413,969, filed on Apr. 27, 2006, now Pat. No. 7,917,956, and a continuation-in-part of application No. 11/474,523, filed on Jun. 22, 2006, now Pat. No. 8,191,145, and a continuation-in-part of application No. 11/486,975, filed on Jul. 14, 2006, now Pat. No. 8,539,581.

(51) Int. Cl.
*G06F 11/00* (2006.01)
*H04L 29/06* (2006.01)

(52) U.S. Cl.
CPC .................................. *H04L 63/1441* (2013.01)
USPC ........................................................... 726/24

(58) Field of Classification Search
USPC ................ 707/9–10, 687; 726/22, 23, 24, 25; 713/188
See application file for complete search history.

(56) References Cited

U.S. PATENT DOCUMENTS

| | | |
|---|---|---|
| 5,414,833 A | 5/1995 | Hershey et al. |
| 5,903,735 A | 5/1999 | Kidder et al. |
| 5,918,008 A | 6/1999 | Togawa et al. |
| 5,987,610 A | 11/1999 | Franczek et al. |
| 6,081,894 A | 6/2000 | Mann |

(Continued)

FOREIGN PATENT DOCUMENTS

EP    1564623 A1    8/2005

OTHER PUBLICATIONS

U.S. Appl. No. 11/601,605, Jung et al.

(Continued)

*Primary Examiner* — Mohammed R Uddin

(57) ABSTRACT

Embodiments include a system, an apparatus, a device, computer-program product, and a method. An embodiment provides a network device. The network device includes a countermeasure engine operable to generate a countermeasure useable in at least substantially reducing a harm caused by a malware (hereafter "malware countermeasure"). The network device also includes a decision module operable to determine if a criterion is met for distribution of the generated malware countermeasure to a plurality of networked nodes. The network device further includes a distribution module operable to transmit the generated malware countermeasure to a first set of nodes of the plurality of networked nodes if the criterion is met.

33 Claims, 36 Drawing Sheets

(56) References Cited

U.S. PATENT DOCUMENTS

| | | | |
|---|---|---|---|
| 6,198,918 | B1 | 3/2001 | O'Donnell |
| 6,304,556 | B1 | 10/2001 | Haas |
| 6,311,277 | B1 | 10/2001 | Takaragi et al. |
| 6,374,303 | B1 | 4/2002 | Armitage et al. |
| 6,732,279 | B2 | 5/2004 | Hoffman |
| 6,851,057 | B1 | 2/2005 | Nachenberg |
| 7,010,696 | B1 | 3/2006 | Cambridge et al. |
| 7,093,293 | B1* | 8/2006 | Smithson et al. ............... 726/24 |
| 7,188,173 | B2 | 3/2007 | Anderson et al. |
| 7,287,278 | B2 | 10/2007 | Liang |
| 7,389,537 | B1 | 6/2008 | Callon et al. |
| 7,530,104 | B1 | 5/2009 | Thrower et al. |
| 7,571,483 | B1* | 8/2009 | Bascle et al. .................... 726/24 |
| 7,647,411 | B1 | 1/2010 | Schiavone et al. |
| 7,701,949 | B1 | 4/2010 | Rose et al. |
| 8,117,654 | B2 | 2/2012 | Jung et al. |
| 2002/0161918 | A1 | 10/2002 | Asano et al. |
| 2002/0174358 | A1 | 11/2002 | Wolff et al. |
| 2003/0018725 | A1 | 1/2003 | Turner et al. |
| 2003/0110395 | A1 | 6/2003 | Presotto et al. |
| 2003/0115483 | A1 | 6/2003 | Liang |
| 2003/0195861 | A1 | 10/2003 | McClure et al. |
| 2003/0233567 | A1 | 12/2003 | Lynn et al. |
| 2004/0005873 | A1 | 1/2004 | Groenendaal et al. |
| 2004/0073701 | A1 | 4/2004 | Huang et al. |
| 2004/0098482 | A1* | 5/2004 | Asano .......................... 709/225 |
| 2004/0218615 | A1 | 11/2004 | Griffin et al. |
| 2004/0268079 | A1 | 12/2004 | Riedle et al. |
| 2005/0022028 | A1* | 1/2005 | Hall ............................... 713/201 |
| 2005/0034027 | A1 | 2/2005 | Hamilton, II et al. |
| 2005/0050378 | A1* | 3/2005 | Liang ................................ 714/4 |
| 2005/0086499 | A1* | 4/2005 | Hoefelmeyer et al. ........ 713/188 |
| 2005/0091538 | A1 | 4/2005 | Hoche et al. |
| 2005/0120229 | A1 | 6/2005 | Lahti |
| 2005/0120231 | A1* | 6/2005 | Harada et al. .................. 713/189 |
| 2005/0165901 | A1 | 7/2005 | Bu et al. |
| 2005/0182949 | A1 | 8/2005 | Phillips et al. |
| 2005/0185582 | A1 | 8/2005 | Wybenga et al. |
| 2005/0187740 | A1 | 8/2005 | Marinescu |
| 2005/0193430 | A1 | 9/2005 | Cohen et al. |
| 2005/0198519 | A1* | 9/2005 | Tamura et al. ................. 713/188 |
| 2005/0201299 | A1 | 9/2005 | Radi et al. |
| 2005/0204150 | A1 | 9/2005 | Peikari |
| 2005/0273850 | A1 | 12/2005 | Freund |
| 2005/0288961 | A1 | 12/2005 | Tabrizi |
| 2005/0289649 | A1* | 12/2005 | Mitomo et al. .................. 726/22 |
| 2006/0031940 | A1* | 2/2006 | Rozman et al. .................. 726/27 |
| 2006/0048228 | A1* | 3/2006 | Takemori et al. ............... 726/22 |
| 2006/0053490 | A1 | 3/2006 | Herz et al. |
| 2006/0072527 | A1 | 4/2006 | Beck et al. |
| 2006/0075134 | A1 | 4/2006 | Aalto et al. |
| 2006/0095961 | A1 | 5/2006 | Govindarajan et al. |
| 2006/0095965 | A1 | 5/2006 | Phillips et al. |
| 2006/0101517 | A1 | 5/2006 | Banzhof et al. |
| 2006/0123479 | A1 | 6/2006 | Kumar et al. |
| 2006/0184470 | A1 | 8/2006 | Zhu |
| 2006/0185018 | A1 | 8/2006 | Saretto et al. |
| 2006/0190606 | A1 | 8/2006 | Kohavi |
| 2006/0218635 | A1 | 9/2006 | Kramer et al. |
| 2006/0236393 | A1 | 10/2006 | Kramer et al. |
| 2006/0272025 | A1 | 11/2006 | Mononen |
| 2007/0002838 | A1* | 1/2007 | Komura et al. ................. 370/352 |
| 2007/0011741 | A1 | 1/2007 | Robert et al. |
| 2007/0011743 | A1 | 1/2007 | Krishnamurthy |
| 2007/0064617 | A1 | 3/2007 | Reves |
| 2007/0074019 | A1 | 3/2007 | Seidel |
| 2007/0101422 | A1 | 5/2007 | Carpenter |
| 2007/0101430 | A1 | 5/2007 | Raikar |
| 2007/0192344 | A1* | 8/2007 | Meier et al. .................... 707/100 |
| 2007/0250931 | A1* | 10/2007 | Takahashi ........................ 726/24 |
| 2007/0294759 | A1* | 12/2007 | Browne ........................... 726/14 |
| 2008/0005784 | A1* | 1/2008 | Miliefsky .......................... 726/3 |

OTHER PUBLICATIONS

U.S. Appl. No. 11/526,213, Jung et al.
U.S. Appl. No. 11/526,062, Jung et al.
U.S. Appl. No. 11/513,901, Jung et al.
U.S. Appl. No. 11/492,691, Jung et al.
U.S. Appl. No. 11/492,689, Jung et al.
U.S. Appl. No. 11/486,975, Jung et al.
"Category: Network Monitoring"; Securityfocus.com; bearing a date of 2005; printed on Jun. 7, 2006; pp. 1-4; Security Focus; located at http://www.securityfocus.com/cgi-bin/index.cgi?o=10&1=10 &c=33 . . . .
Cavedon, Lawrence; "CS320: Introduction to Artificial Intelligence, Introduction to CLIPS"; Goanna.cs.rmit.edu.au; bearing dates of 1996 and May 5, 1997; printed on Jun. 15, 2006; pp. 1-8; Royal Melbourne Institution of Technology; located at http://goanna.cs.rmit.edu.au/~cavedon/courses/320/labs/clips.html.
Chen, Li-Chiou; Carley, Kathleen M.; "The Impact of Network Topology on the Spread of Anti-Virus Countermeasures"; printed on Jun. 8, 2006; pp. 1-4.
"CommView®, Overview"; Tamos.com; bearing a date of 1996-2006; printed on Jun. 14, 2006; pp. 1-2; Tamosoft; located at http://www.tamos.com/products/commview/.
"Computer networking device"; Wikipedia; bearing a date of Jun. 5, 2006; printed on Jun. 13, 2006; pp. 1-2; Wikimedia Foundation, Inc.; located at http://en.wikipedia.org/wiki/Computer_networking_device.
"Ethical Hacking and Countermeasures"; Eccouncil.org; bearing a date of 2002; printed on Jun. 15, 2006; pp. 1-30; EC-Council; located at http://www.eccouncil.org/EC-Council%20Education/ceh-course-outline.htm.
Keromytis, Angelos D.; "Patch on Demand Saves Even More Time?"; Cs.columbia.edu; bearing a date of Aug. 2004; printed on Jun. 20, 2006; pp. 94-96; located at http://www1.cs.columbia.edu/~angelos/Papers/r8094.pdf.
"McAfee® Glossary"; McAfee.com; printed on Jun. 6, 2006; pp. 1-2; located at http://www.mcafee.com/us/threat_center/glossary.html#v.
"Network Monitor—Track4Win helps you to monitor network and all computers."; Track4win.com; bearing a date of 2000-2006; printed on Jun. 7, 2006; pp. 1-2; Sepama Software; located at http://www.track4win.com/Network_Monitor.asp.
"Network probe"; Objectplanet.com; bearing dates of Mar. 14, 2006 and 2006; printed on Jun. 7, 2006; pp. 1-4; ObjectPlanet, Inc.; Oslo, Norway; located at http://www.objectplanet.com/probe/.
"Networking Hardware"; Wikipedia; bearing a date of May 31, 2006; printed on Jun. 13, 2006; pp. 1-1; Wikimedia Foundation, Inc.; located at: http://en.wikipedia.org/wiki/Networking_hardware.
Staniford, Stuart; Paxson, Vern; Weaver, Nicholas; "How to Own the Internet in Your Spare Time"; Proceedings of the 11th Usenix Security Symposium (Security '02); printed on Jun. 5, 2006; pp. 1-20; located at: http://www.icir.org/vern/papers/cdc-usenix-sec02/.
"Symantec Glossary"; Symantec.com; printed on Jun. 6, 2006; pp. 1-2; located at: http://securityresponse.symantec.com/avcenter/refa.html#worm.
"Symantec Glossary"; Symantec.com; printed on Jun. 6, 2006; pp. 1-3; located at: http://securityresponse.symantec.com/avcenter/refa.html#worm.
"W32/Kelvir.worm.bh"; McAfee; bearing dates of 2003-2005, May 21, 2005, May 23, 2005 and May 8, 2006; printed on Jun. 6, 2006; pp. 1-5; McAfee, Inc.; located at: http://vil.nai.com/vil/content/v_133908.htm.
Weaver, Nicholas; Staniford, Stuart; Paxson, Vern; "Very Fast Containment of Scanning Worms"; Proceedings of the 13th USENIX Security Symposium; bearing dates of 2004 and Aug. 9-13, 2004; printed on Jun. 7, 2006; pp. 1-17; The USENIX Association; located at: www.usenix/org/publications/library/proceedings/sec04/tech/weaver.html.
"What is the difference between viruses, worms, and Trojans?"; Symantec.com; bearing dates of 1995-2006, Apr. 12, 1999 and Mar. 30, 2005; pp. 1-4; Symantec Corporation; located at: http://service1.symantec.com/SUPPORT/nav.nsf/

(56) References Cited

OTHER PUBLICATIONS aab56492973adcc8825694500552355/
024c927836400f528825675100593eb2?OpenDocument
&src=sec_web_nam.
Zou, Cliff C.; Towsley, Don; Gong, Weibo; Cai, Songlin; "Routing Worm: A Fast, Selective Attack Worm based on IP Address Information"; printed on Jun. 19, 2006; pp. 1-17; Technical Report: TR-03-CSE-06; located at: http://citeseer.ist.psu.edu/cache/papers/cs2/48/http:zSzzSztennis.ecs.umass.eduzSz~czouzSzresearchzSzroutingWorm-techreport.pdf/zou05routing.pdf.

Korean Intellectual Property Office; Notice of Preliminary Rejection; App. No. 10-2008-7029123; Jul. 22, 2013; 11 pages (5 pages machine English translation).
European Patent Office Search Report; App. No. EP 07 86 1294; Apr. 13, 2012 pp. 1-6.
Mell et al.; "Guide to Malware Incident Prevention and Handling: Recommendations of the National Institute of Standards and Technology"; NIST Special Publication 800-83; Nov. 2005; 101 pages; Computer Security Division, Information Technology Laboratory, National Institute of Standards and Technology; Gaithersburg, MD, USA.

\* cited by examiner

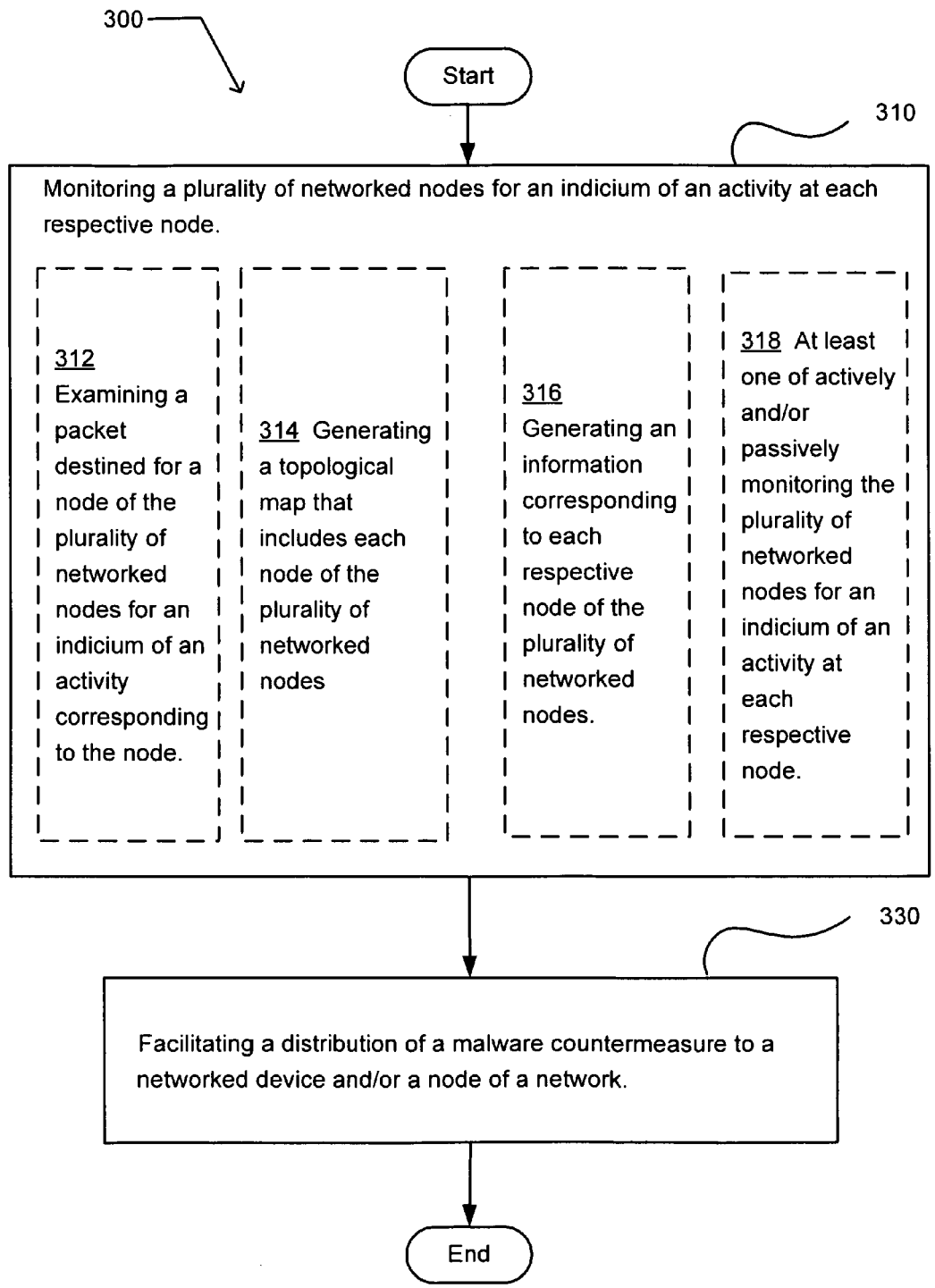

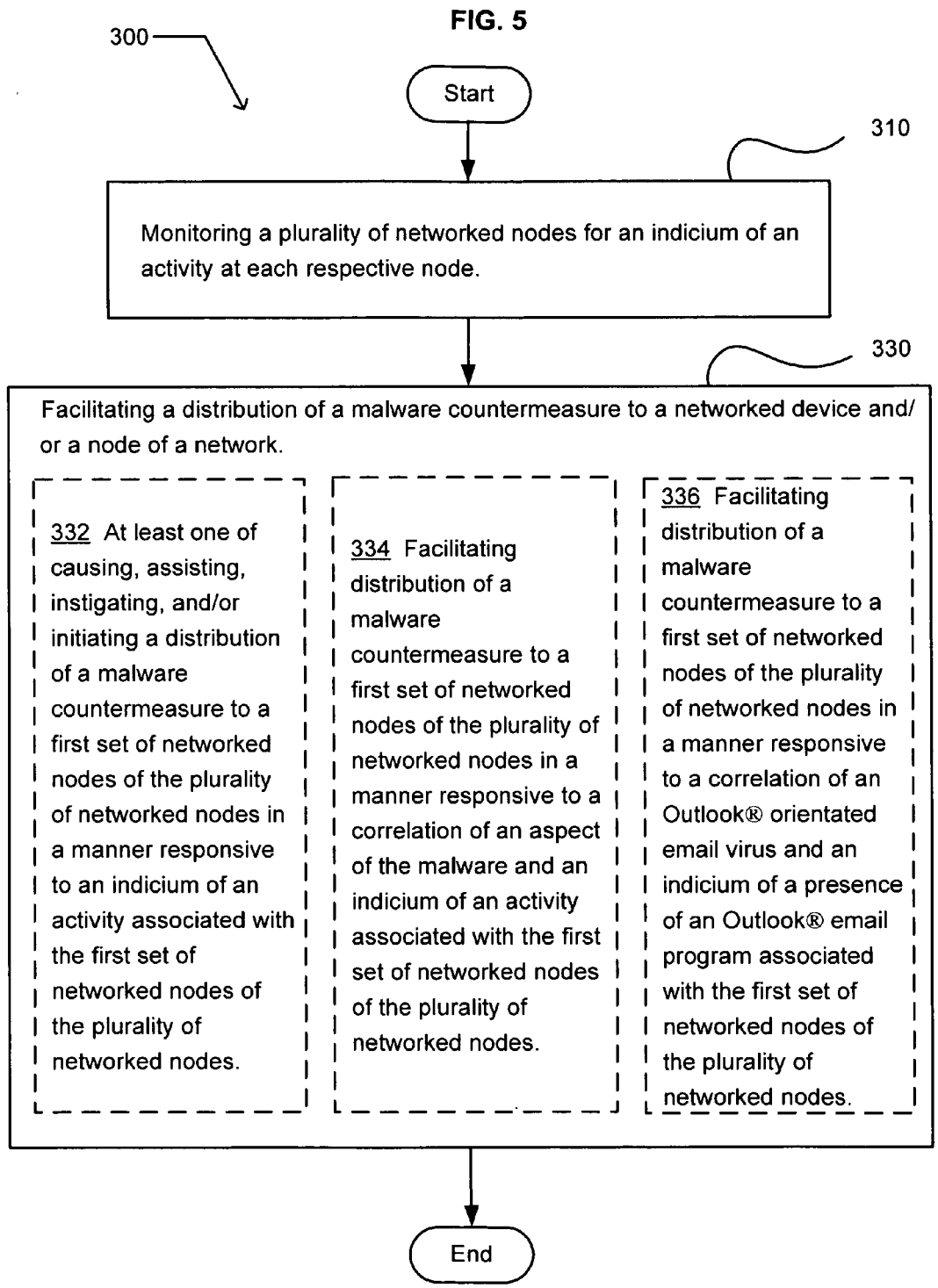

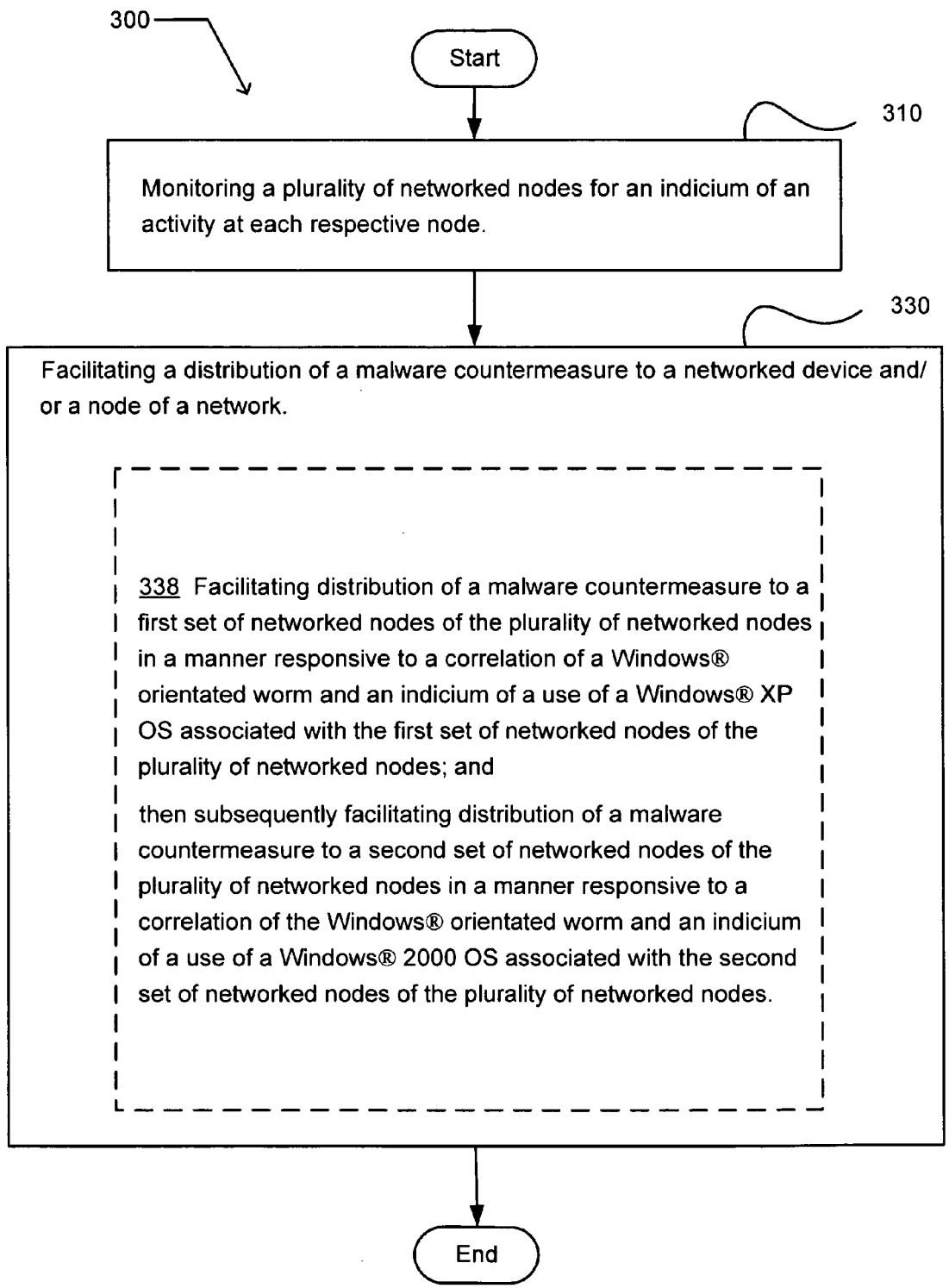

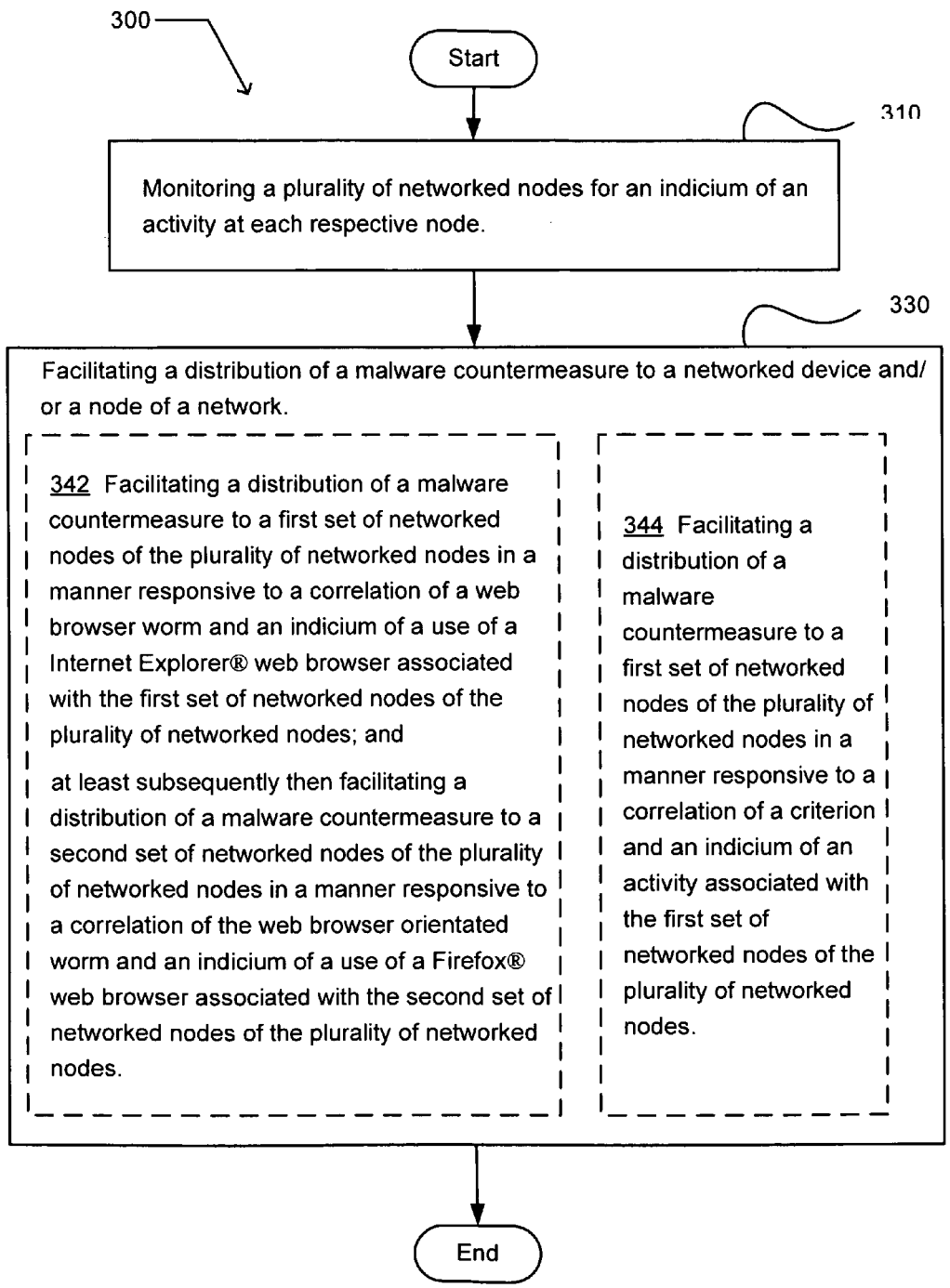

405 A computer-readable signal-bearing medium bearing the program instructions.

410 Program instructions operable to perform a process in a computing device, the process comprising:

monitor a plurality of networked nodes for an indicium of an activity at each respective node; and facilitate a distribution of a malware countermeasure to a first set of networked nodes of the plurality of networked nodes in a manner responsive to an indicium of an activity associated with the first set of networked nodes of the plurality of networked nodes.

412 facilitate a distribution of a malware countermeasure to a first set of networked nodes of the plurality of networked nodes in a manner responsive to correlation between a criterion and an indicium of an activity associated with the first set of networked nodes of the plurality of networked nodes.

422 The computer-readable signal-bearing medium includes a computer storage medium.

424 The computer-readable signal-bearing medium includes a communication medium.

1005 A computer-readable signal-bearing medium bearing the program instructions.

1010 Program instructions operable to perform a process in a computing device, the process comprising:

saving a countermeasure useable in at least substantially reducing a harm presented by a malware (hereafter the "malware countermeasure") to a networked device and/or a node of a network;

determining if a criterion for implementation of the malware countermeasure is met; and implementing the malware countermeasure in the computing device if the criterion is met for implementation of the malware countermeasure 1022 The computer-readable signal-bearing medium includes a computer storage medium.

1024 The computer-readable signal-bearing medium includes a communication medium.

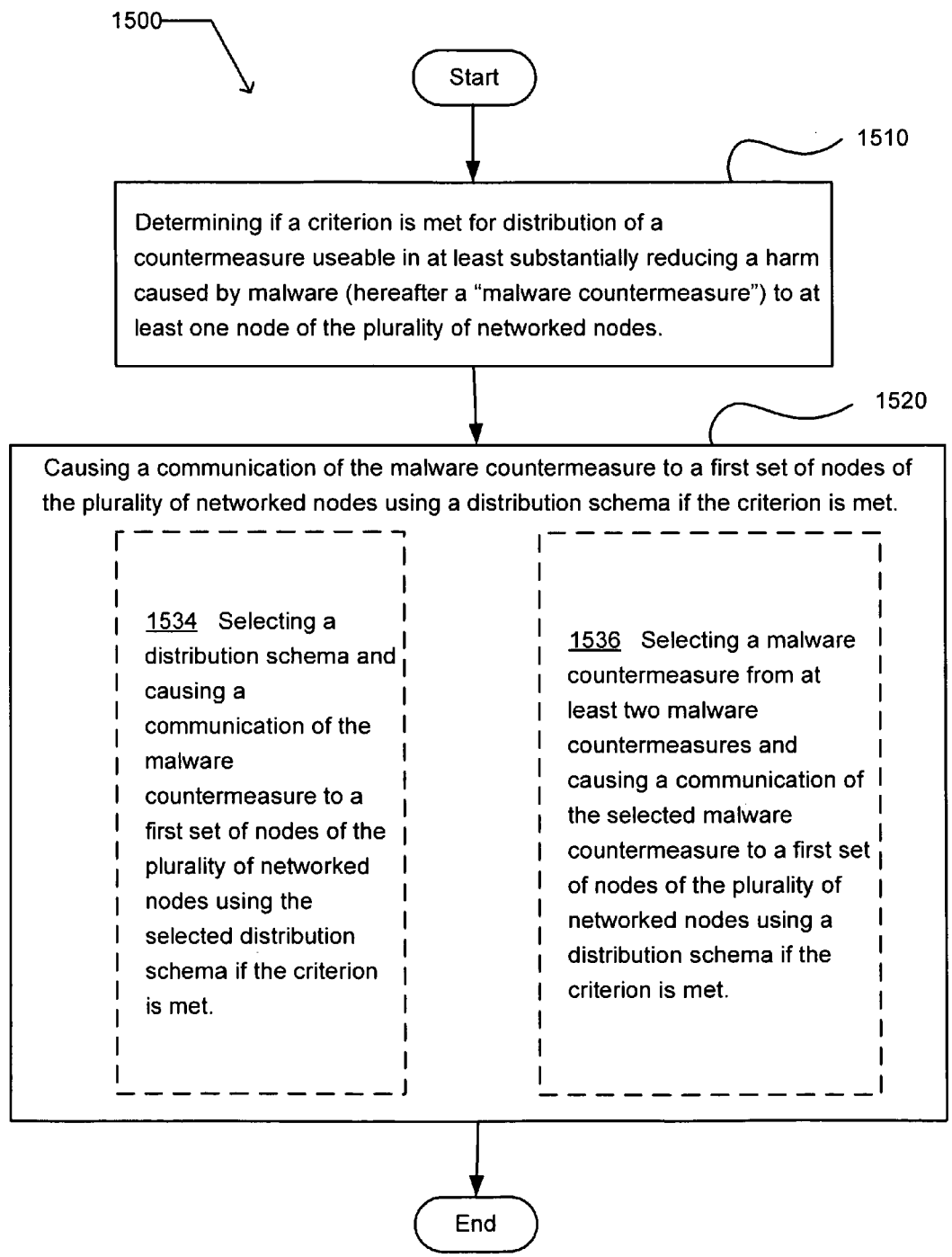

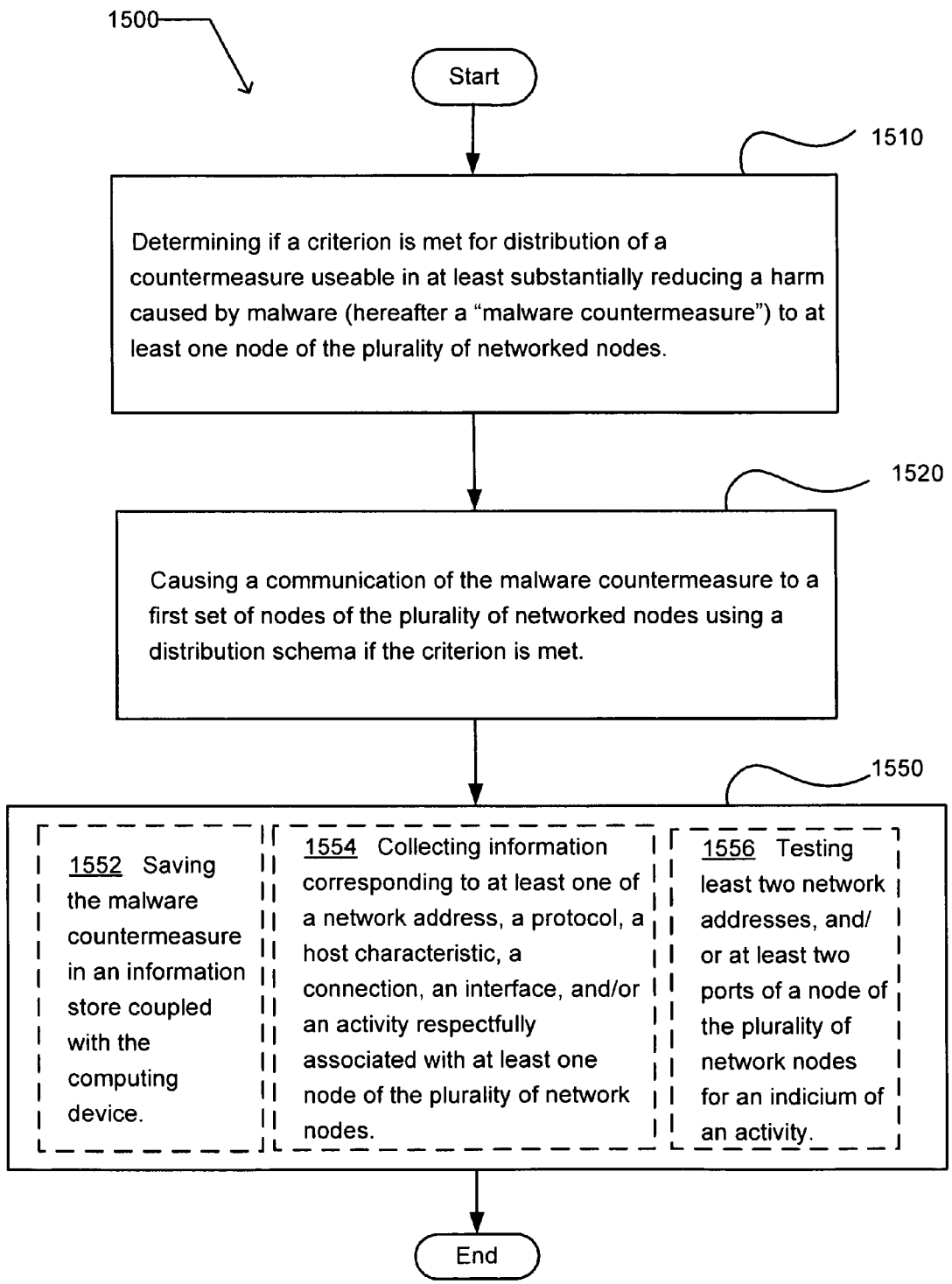

1610 Means for determining if a criterion is met for distribution of a countermeasure useable in at least substantially reducing a harm caused by malware (hereafter a "malware countermeasure") to at least one node of a plurality of networked nodes.

1620 Means for causing a communication of the malware countermeasure to a first set of nodes of the plurality of networked nodes using a distribution schema if the criterion is met.

1630 Means for saving the malware countermeasure in an information store coupled with the network device.

1640 Means for collecting information corresponding to at least one of a network address, a protocol, a host characteristic, a connection, an interface, and/or an activity respectfully associated with at least one node of the plurality of network nodes.

1650 Means for testing at least two network addresses, and/or at least two ports of a node of the plurality of network nodes for an indicium of an activity.

1705 A computer-readable signal-bearing medium bearing the program instructions.

1710 Program instructions operable to perform a process in a computing device, the process includes:

determining if a criterion is met for distribution of a countermeasure useable in at least substantially reducing a harm caused by malware (hereafter a "malware countermeasure") to at least one node of a plurality of networked nodes; and causing a communication of the malware countermeasure to a first set of nodes of the plurality of networked nodes using a distribution schema if the criterion is met.

1712 The process further includes saving the malware countermeasure in an information store.

1714 The process further includes collecting information corresponding to at least one of a network address, a protocol, a host characteristic, a connection, an interface, and/or an activity respectfully associated with at least one node of the plurality of network nodes.

1716 The process further includes testing at least two network addresses, and/or at least two ports of a node of the plurality of network nodes for an indicium of an activity.

1732 The computer-readable signal-bearing medium includes a computer storage medium.

1734 The computer-readable signal-bearing medium includes a communication medium.

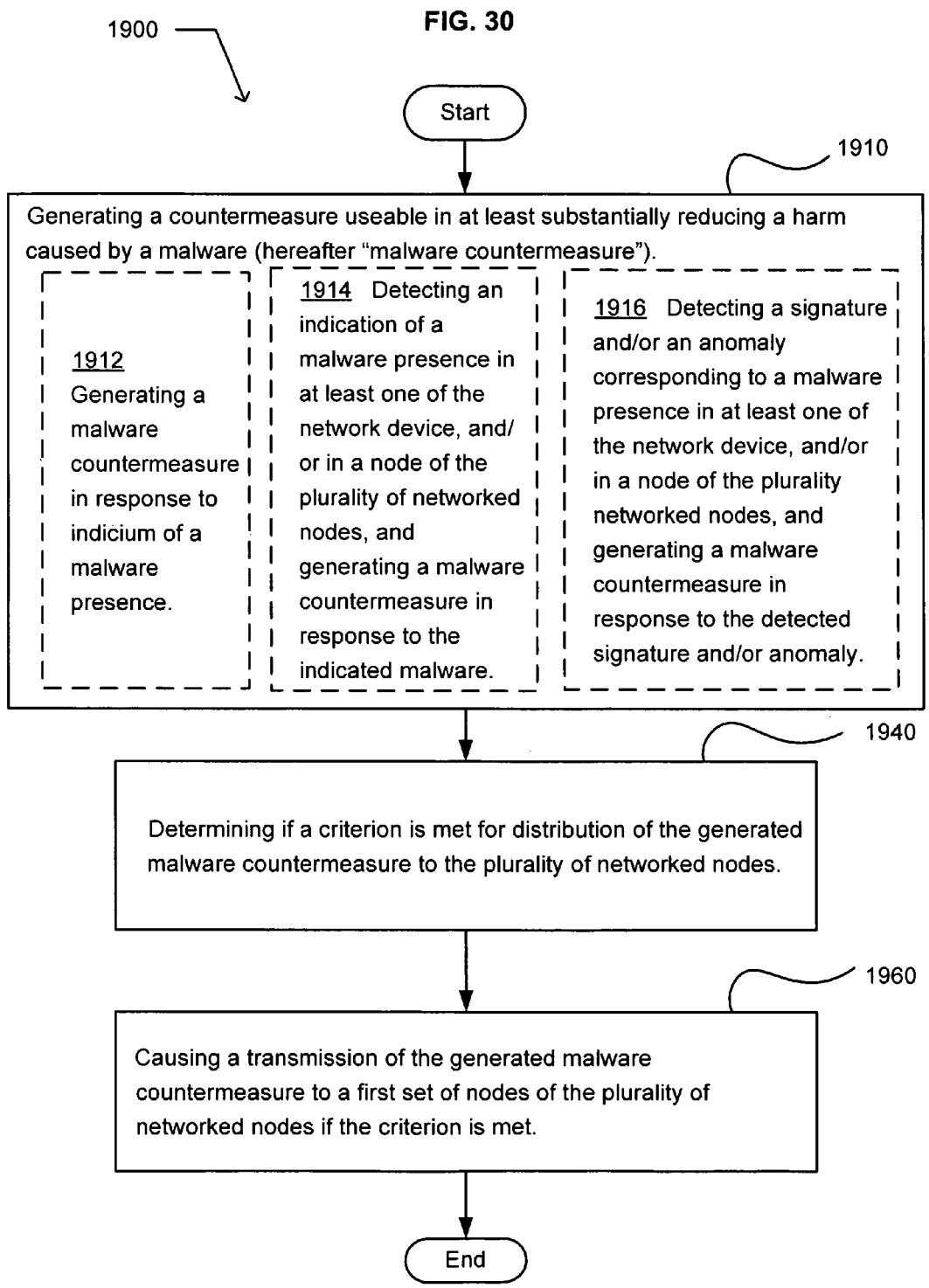

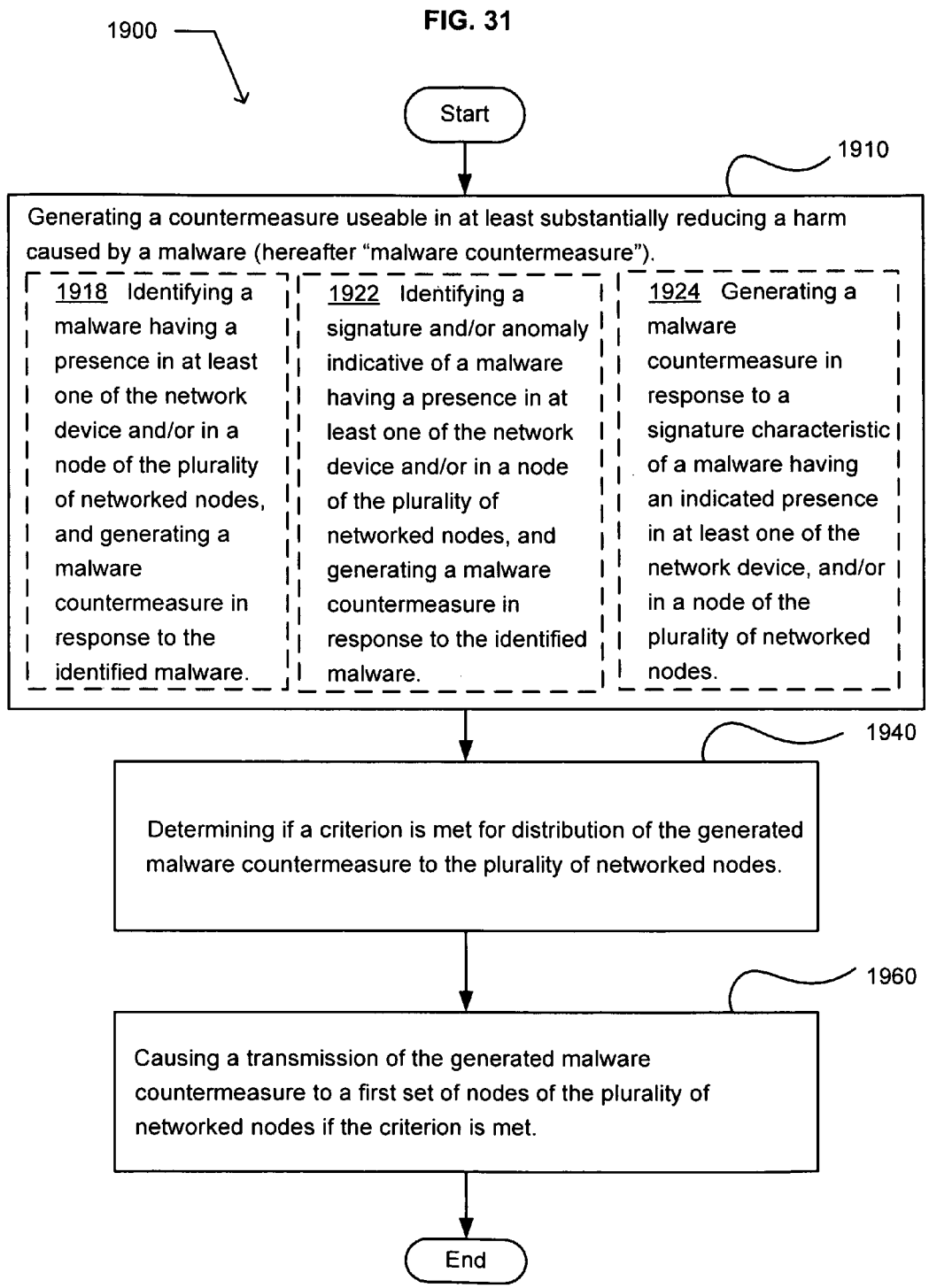

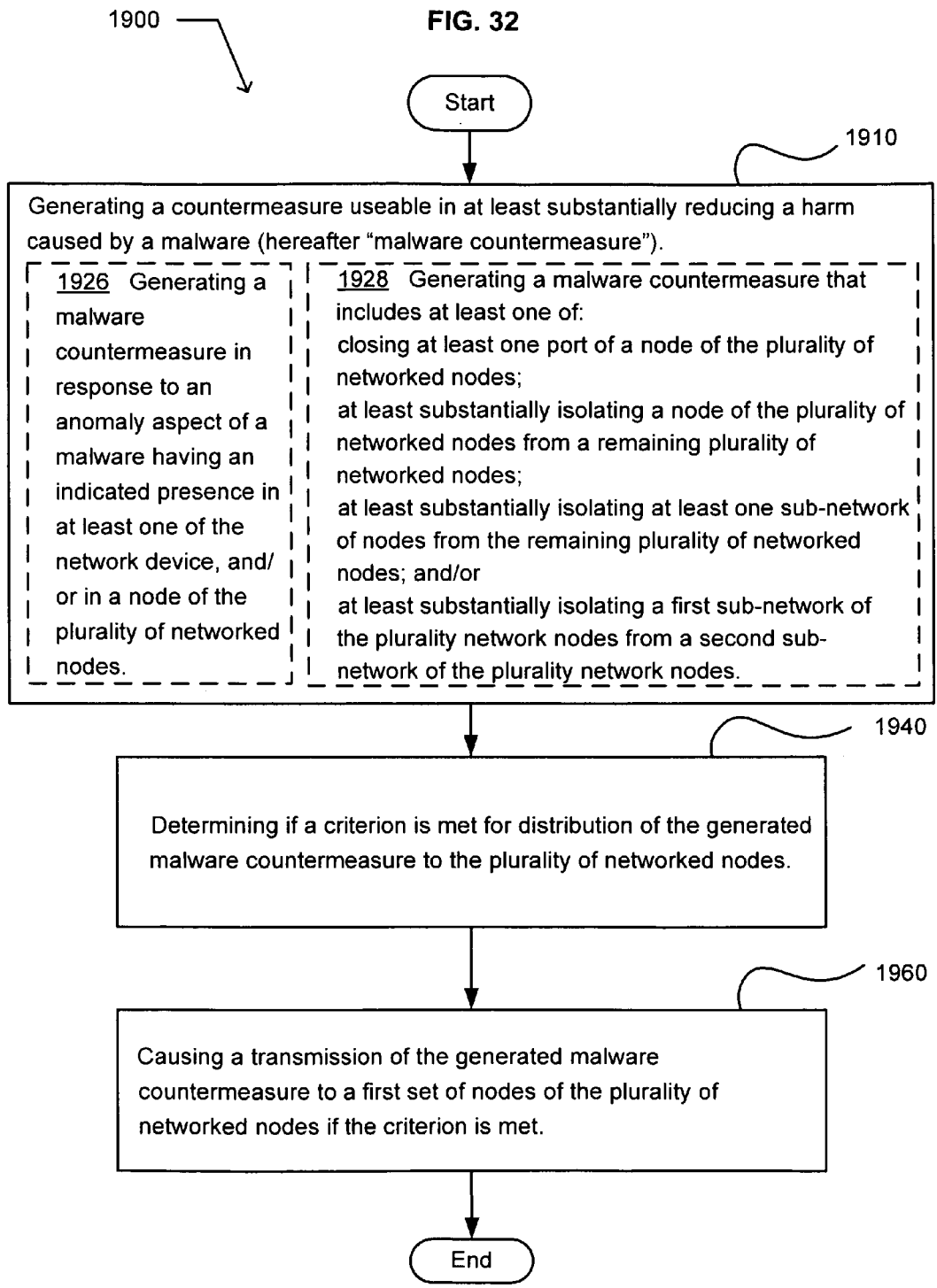

FIG. 33

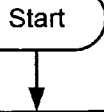
1900

Start ↓

1910 — Generating a countermeasure useable in at least substantially reducing a harm caused by a malware (hereafter "malware countermeasure").

> 1932 Generating a malware countermeasure that includes at least one of:
> at least substantially reducing a functionally of a node of the plurality of networked nodes;
> at least substantially reducing a communication privilege allowed a node of the plurality of networked nodes; and/or
> sending a notice receivable by a device associatable with a person associated with a node of the plurality of networked nodes.

1940 — Determining if a criterion is met for distribution of the generated malware countermeasure to the plurality of networked nodes.

1960 — Causing a transmission of the generated malware countermeasure to a first set of nodes of the plurality of networked nodes if the criterion is met.

End

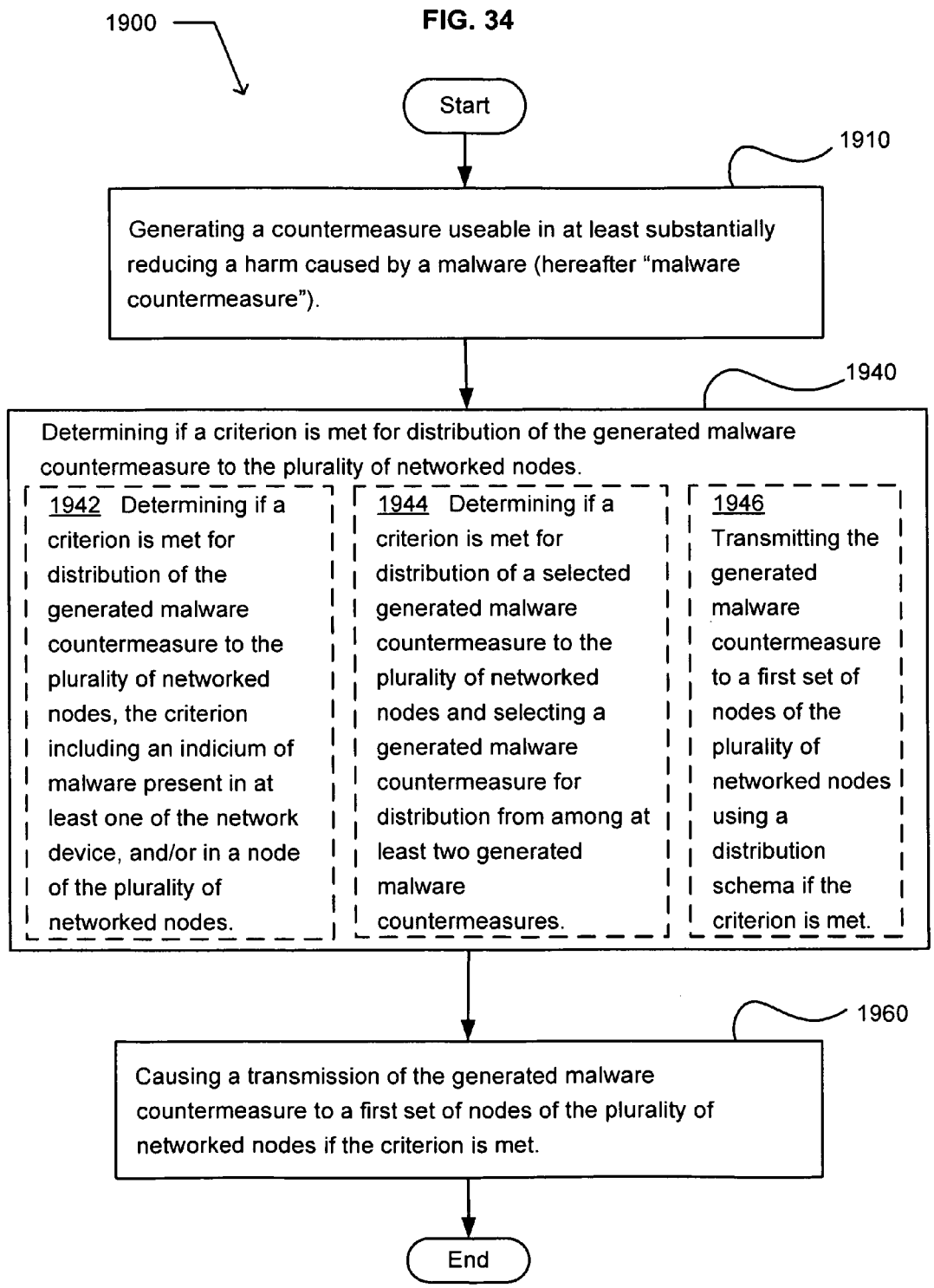

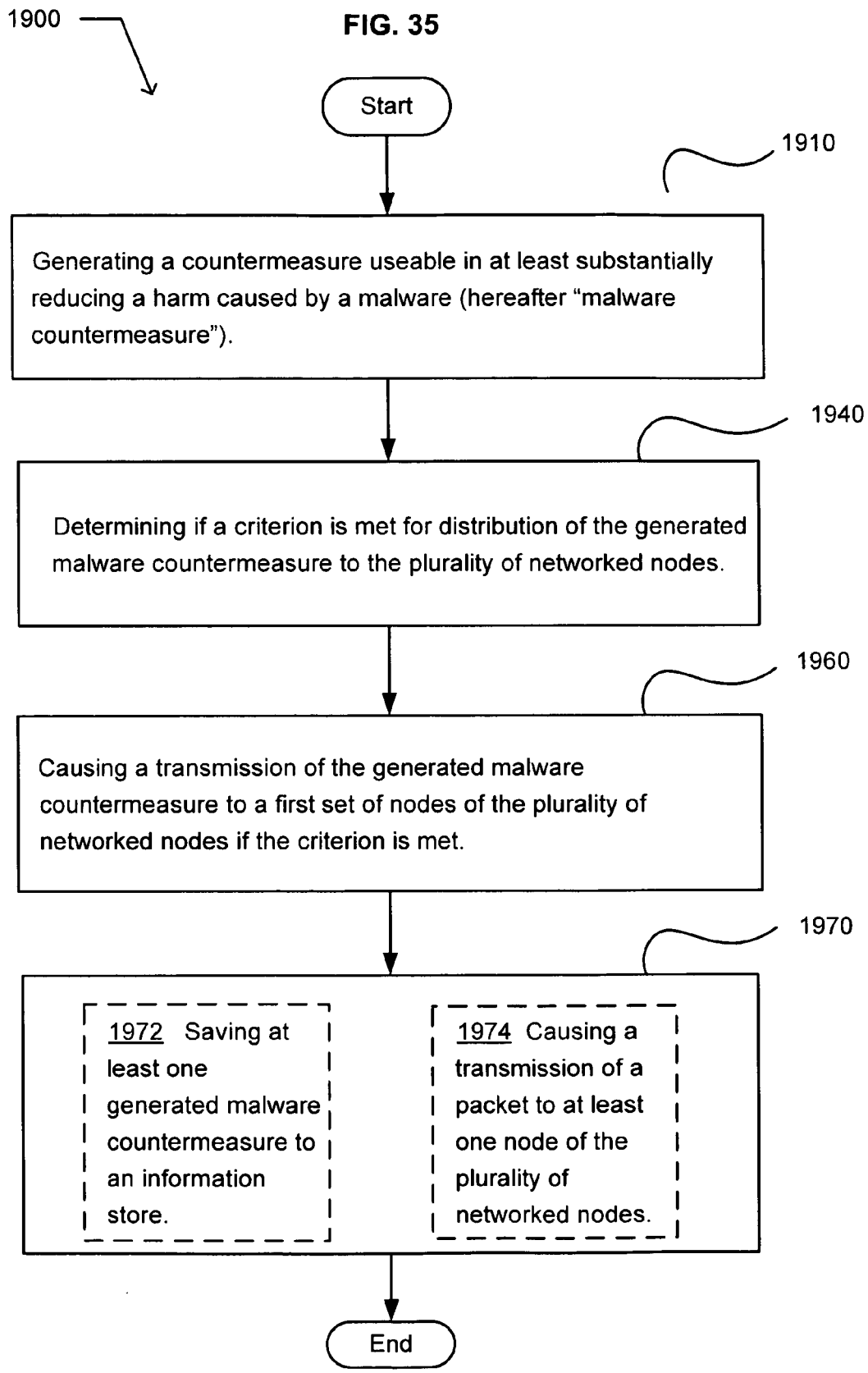

GENERATING AND DISTRIBUTING A MALWARE COUNTERMEASURE

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)).

RELATED APPLICATIONS

For purposes of the USPTO extra-statutory requirements, the present application constitutes a continuation-in-part of United States patent application entitled SMART DISTRIBUTION OF A MALWARE COUNTERMEASURE, naming Edward K. Y. Jung; Royce A. Levien; Robert W. Lord; Mark A. Malamud; and William Henry Mangione-Smith as inventors, U.S. application Ser. No. 11/480,782; filed Jun. 30, 2006 now U.S. Pat. No. 8,613,095.

For purposes of the USPTO extra-statutory requirements, the present application constitutes a continuation-in-part of United States patent application entitled IMPLEMENTATION OF MALWARE COUNTERMEASURES IN A NETWORK DEVICE, naming Edward K. Y. Jung; Royce A. Levien; Robert W. Lord; Mark A. Malamud; and William Henry Mangione-Smith as inventors, U.S. application Ser. No. 11/480,819; filed Jun. 30, 2006 now U.S. Pat. No. 8,117,654.

For purposes of the USPTO extra-statutory requirements, the present application constitutes a continuation-in-part of United States patent application entitled MULTI-NETWORK VIRUS IMMUNIZATION, naming Edward K. Y. Jung; Royce A. Levien; Robert W. Lord; Mark A. Malamud; John D. Rinaldo, Jr., and Lowell L. Wood, Jr. as inventors, U.S. application Ser. No. 11/413,969; filed Apr. 27, 2006 now U.S. Pat. No. 7,917,956.

For purposes of the USPTO extra-statutory requirements, the present application constitutes a continuation-in-part of United States patent application entitled VIRUS IMMUNIZATION USING PRIORITIZED ROUTING, naming Edward K. Y. Jung; Royce A. Levien; Robert W. Lord; Mark A. Malamud; John D. Rinaldo, Jr., and Lowell L. Wood, Jr. as inventors, U.S. application Ser. No. 11/474,523; filed Jun. 22, 2006 now U.S. Pat. No. 8,191,145.

For purposes of the USPTO extra-statutory requirements, the present application constitutes a continuation-in-part of United States patent application entitled EFFICIENT DISTRIBUTION OF A MALWARE COUNTERMEASURE, naming Edward K.Y. Jung; Royce A. Levien; Robert W. Lord; Mark A. Malamud; and William Henry Mangione-Smith as inventors, U.S. application Ser. No. 11/486,975; filed Jul. 14, 2006.

The United States Patent Office (USPTO) has published a notice to the effect that the USPTO's computer programs require that patent applicants reference both a serial number and indicate whether an application is a continuation or continuation-in-part. Stephen G. Kunin, Benefit of Prior-Filed Application, USPTO Official Gazette Mar. 18, 2003, available at http://www.uspto.gov/web/offices/com/sol/og/2003/week11/patbene.htm. The present applicant entity has provided above a specific reference to the application(s) from which priority is being claimed as recited by statute. Applicant entity understands that the statute is unambiguous in its specific reference language and does not require either a serial number or any characterization, such as "continuation" or "continuation-in-part," for claiming priority to U.S. patent applications. Notwithstanding the foregoing, applicant entity understands that the USPTO's computer programs have certain data entry requirements, and hence applicant entity is designating the present application as a continuation-in-part of its parent applications as set forth above, but expressly points out that such designations are not to be construed in any way as any type of commentary and/or admission as to whether or not the present application contains any new matter in addition to the matter of its parent application(s).

All subject matter of the Related Applications and of any and all parent, grandparent, great-grandparent, etc. applications of the Related Applications is incorporated herein by reference to the extent such subject matter is not inconsistent herewith.

SUMMARY

An embodiment provides a network device. The network device includes a network analyzer module operable to monitor a plurality of networked nodes for an indicium of an activity at each respective node. The network device includes a dissemination module operable to facilitate distribution of a malware countermeasure to a first set of networked nodes of the plurality of networked nodes in a manner responsive to an indicium of an activity associated with the first set of networked nodes of the plurality of networked nodes. The network device may include a communications module operable to send packets to at least one node of the plurality of networked nodes. In addition to the foregoing, other device embodiments are described in the claims, drawings, and text forming a part of the present application.

Another embodiment provides a method. The method includes monitoring a plurality of networked nodes for an indicium of an activity at each respective node. The method also includes facilitating a distribution of a countermeasure to a first set of networked nodes of the plurality of networked nodes in a manner responsive to an indicium of an activity associated with the first set of networked nodes of the plurality of networked nodes, the countermeasure useable in at least substantially reducing a harm presented by a malware (hereafter the "malware countermeasure") to a networked device and/or a node of a network. In addition to the foregoing, other method embodiments are described in the claims, drawings, and text forming a part of the present application.

A further embodiment provides a computer-program product. The computer-program product includes program instructions operable to perform a process in a computing device. The process includes monitor a plurality of networked nodes for an indicium of an activity at each respective node. The process also includes facilitate a distribution of a malware countermeasure to a first set of networked nodes of the plurality of networked nodes in a manner responsive to an indicium of an activity associated with the first set of networked nodes of the plurality of networked nodes. The computer-program product also includes a computer-readable signal-bearing medium bearing the program instructions. In addition to the foregoing, other computer-program product embodiments are described in the claims, drawings, and text forming a part of the present application.

An embodiment provides a network device. The network device includes means for monitoring a plurality of networked nodes for an indicium of an activity at each respective node. The network device also includes means for facilitating distribution of a malware countermeasure to a first set of networked nodes of the plurality of networked nodes in a manner responsive to an indicium of an activity associated with the first set of networked nodes of the plurality of networked nodes. The network device may include means for generating the malware countermeasure. In addition to the foregoing, other network device embodiments are described in the claims, drawings, and text forming a part of the present application.

Another embodiment provides active network device. The active network device includes a communications module operable to facilitate a movement of packets to at least one node of a plurality of networked nodes. The active network device also includes a network analyzer module operable to monitor each respective node of the plurality of networked nodes for an indicium of an activity. The active network device further includes a dissemination module operable to distribute a malware countermeasure to a first set of nodes of the plurality of networked nodes in a manner responsive to the indicium of an activity corresponding to the first set of networked nodes of the plurality of networked nodes. In addition to the foregoing, other active network device embodiments are described in the claims, drawings, and text forming a part of the present application.

A further embodiment provides a network device. The network device includes an information store operable to save a countermeasure useable in at least substantially reducing a harm caused by a malware (hereafter the "malware countermeasure"). The network device also includes a transmission circuit for sending a packet to at least one sub-network of a plurality of sub-networks. The network device further includes a protection circuit for implementing the malware countermeasure in the network device. The network device may include a processor. The network device may include a decision circuit for determining if a criterion is met for implementation of the malware countermeasure. The network device may include a countermeasure engine operable to generate the malware countermeasure. In addition to the foregoing, other network device embodiments are described in the claims, drawings, and text forming a part of the present application.

An embodiment provides a method implemented in a computing device operable to facilitate communication of a packet to at least one sub-network of a plurality of sub-networks. The method includes saving a countermeasure useable in at least substantially reducing a harm caused by a malware (hereafter the "malware countermeasure"). The method also includes determining if a criterion is met for implementation of the malware countermeasure. The method further includes implementing the malware countermeasure in the computing device if the criterion is met for implementation of the malware countermeasure. In addition to the foregoing, other method embodiments are described in the claims, drawings, and text forming a part of the present application.

Another embodiment provides a network device. The network device includes means for facilitating communication of a packet to at least one sub-network of a plurality of sub-networks. The network device also includes means for saving a countermeasure useable in at least substantially reducing a harm caused by a malware (hereafter the "malware countermeasure"). The network device further includes means for determining if a criterion is met for implementation of the malware countermeasure. The network device further includes means for implementing the malware countermeasure in the network device if the criterion for implementation of the malware countermeasure is met. In addition to the foregoing, other network device embodiments are described in the claims, drawings, and text forming a part of the present application.

A further embodiment provides a computer-program product. The computer-program product includes a computer-readable signal-bearing medium bearing the program instructions. The computer-program product also includes program instructions operable to perform a process in a computing device. The process includes saving a countermeasure useable in at least substantially reducing a harm presented by a malware to a networked device and/or a node of a network (hereafter the "malware countermeasure"). The process also includes determining if a criterion for implementation of the malware countermeasure is met. The process further includes implementing the malware countermeasure in the computing device if the criterion is met for implementation of the malware countermeasure. In addition to the foregoing, other computer-program product embodiments are described in the claims, drawings, and text forming a part of the present application.

An embodiment provides a network device. The network device includes an information store configurable by a countermeasure useable in at least substantially reducing a harm caused by a malware (hereafter a "malware countermeasure"). The network device also includes a decision circuit for determining if a criterion for implementation of a malware countermeasure is met. The network device further includes a defender circuit for applying a malware countermeasure to the network device if the criterion for implementation of a malware countermeasure is met. In addition to the foregoing, other network device embodiments are described in the claims, drawings, and text forming a part of the present application.

Another embodiment provides a method. The method includes configuring an information store of a network device with a countermeasure useable in at least substantially reducing a harm caused by a malware (hereafter a "malware countermeasure"). The method also includes determining if a criterion for implementation of a malware countermeasure is met. The method further includes applying a malware countermeasure to the network device if the criterion for implementation of a malware countermeasure is met. In addition to the foregoing, other method embodiments are described in the claims, drawings, and text forming a part of the present application.

A further embodiment provides a network device. The network device includes means for configuring an information store with a countermeasure useable in at least substantially reducing a harm caused by a malware (hereafter a "malware countermeasure"). The network device also includes means for determining if a criterion for implementation of a malware countermeasure is met. The network device further includes means for applying a malware countermeasure to the network device if the criterion for implementation of a malware countermeasure is met. In addition to the foregoing, other network device embodiments are described in the claims, drawings, and text forming a part of the present application.

An embodiment provides a network device: The network device includes a transmission circuit for communicating a packet to at least one node of a plurality of networked nodes. The network device also includes a decision circuit for determining if a criterion is met for distribution of a countermeasure to at least one node of the plurality of networked nodes, the countermeasure useable in at least substantially reducing a harm caused by malware (hereafter a "malware countermeasure"). The network device further includes a distribution circuit for causing, in response to a determination that the criterion is met, a communication of the malware countermeasure using a distribution schema to a first set of nodes of the plurality of networked nodes.

In an embodiment, the malware may include a virus, a worm, Trojan horse, a rootkit, a spyware, adware, a buffer overflow, a virus hoax, an adware, a dialer, a hack tool, a joke program, a remote access without user permission, a back door, a trackware, and/or a keystroke capture program. In another embodiment, the malware countermeasure includes an antivirus patch, a patch, a defense, a quarantine of at least one node of the plurality of networked nodes, a quarantine of at least one sub-network of the plurality of networked nodes, a containment measure, a blocking of a port of a host at a node of the plurality of networked nodes, and/or transmitting a notification receivable by a device associatable with a human.

The network device may include an information store operable to save at least two malware countermeasures. The network device may include a network analyzer circuit for respectively monitoring at least two nodes of the plurality of networked nodes. The network device may include a network probe circuit for collecting information corresponding to at least one of a network address, a protocol, a host characteristic, a connection, an interface, and/or an activity respectfully associated with at least one node of the plurality of network nodes. The network device may include a network scanning circuit for testing at least two network addresses, and/or a port of a node of the plurality of network nodes. In addition to the foregoing, other network device embodiments are described in the claims, drawings, and text forming a part of the present application.

Another embodiment provides a method implemented in a computing device operable to facilitate communication of a packet to at least one node of a plurality of networked nodes. The method includes determining if a criterion is met for distribution of a countermeasure useable in at least substantially reducing a harm caused by malware (hereafter a "malware countermeasure") to at least one node of the plurality of networked nodes. The method also includes causing a communication of the malware countermeasure to a first set of nodes of the plurality of networked nodes using a distribution schema if the criterion is met. The method may include saving the malware countermeasure in an information store coupled with the computing device. The method may further include collecting information corresponding to at least one of a network address, a protocol, a host characteristic, a connection, an interface, and/or an activity respectfully associated with at least one node of the plurality of network nodes. The method may also include testing at least two network addresses, and/or at least two ports of a node of the plurality of network nodes for an indicium of an activity. In addition to the foregoing, other method embodiments are described in the claims, drawings, and text forming a part of the present application.

A further embodiment provides a network device. The network device includes means for determining if a criterion is met for distribution of a countermeasure useable in at least substantially reducing a harm caused by malware (hereafter a "malware countermeasure") to at least one node of a plurality of networked nodes. The network device also includes means for causing a communication of the malware countermeasure to a first set of nodes of the plurality of networked nodes using a distribution schema if the criterion is met. The network device may include means for saving the malware countermeasure in an information store coupled with the computing device. The network device may include means for collecting information corresponding to at least one of a network address, a protocol, a host characteristic, a connection, an interface, and/or an activity respectfully associated with at least one node of the plurality of network nodes. The network device may include means for testing at least two network addresses, and/or at least two ports of a node of the plurality of network nodes for an indicium of an activity. In addition to the foregoing, other network device embodiments are described in the claims, drawings, and text forming a part of the present application.

An embodiment provides a computer-program product. The computer-program product includes program instructions operable to perform a process in a computing device. The process includes determining if a criterion is met for distribution of a countermeasure useable in at least substantially reducing a harm caused by malware (hereafter a "malware countermeasure") to at least one node of a plurality of networked nodes. The process also includes causing a communication of the malware countermeasure to a first set of nodes of the plurality of networked nodes using a distribution schema if the criterion is met. The computer-program product also includes a computer-readable signal-bearing medium bearing the program instructions. In addition to the foregoing, other computer-program product embodiments are described in the claims, drawings, and text forming a part of the present application.

Another embodiment provides a network device. The network device includes a countermeasure engine operable to generate a countermeasure useable in at least substantially reducing a harm caused by a malware (hereafter "malware countermeasure"). The network device also includes a decision module operable to determine if a criterion is met for distributing the generated malware countermeasure to a plurality of networked nodes. The network device further includes a distribution module operable to transmit the generated malware countermeasure to a first set of nodes of the plurality of networked nodes if the criterion is met. The network device may include an information store operable to save at least one generated malware countermeasure. The network device may include a communication module operable to cause transmission of a packet to at least one node of the plurality of networked nodes. In addition to the foregoing, other network device embodiments are described in the claims, drawings, and text forming a part of the present application.

A further embodiment provides a method implemented in a computing device operable to facilitate communication of a packet to at least one node of a plurality networked nodes. The method includes generating a countermeasure useable in at least substantially reducing a harm caused by a malware (hereafter "malware countermeasure"). The method also includes determining if a criterion is met for distribution of the generated malware countermeasure to the plurality of networked nodes. The method further includes causing a transmission of the generated malware countermeasure to a first set of nodes of the plurality of networked nodes if the criterion is met. The method may include saving at least one generated malware countermeasure to an information store. The method may include causing a transmission of a packet to at least one node of the plurality of networked nodes. In addition to the foregoing, other method embodiments are described in the claims, drawings, and text forming a part of the present application.

An embodiment provides a device. The device includes means for generating a countermeasure useable in at least substantially reducing a harm caused by a malware (hereafter "malware countermeasure"). The device also includes means for determining if a criterion is met for distribution of the generated malware countermeasure to a plurality of networked nodes. The device may include means for transmitting the generated malware countermeasure to a first set of nodes of the plurality of networked nodes if the criterion is met. The device may include means for saving at least one generated malware countermeasure to an information store. The device may include means for causing a transmission of a packet to at least one node of the plurality of networked nodes. In addition to the foregoing, other device embodiments are described in the claims, drawings, and text forming a part of the present application.

The foregoing is a summary and thus by necessity contains simplifications, generalizations, and omissions of detail. Consequently, those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein.

BRIEF DESCRIPTION OF THE DRAWINGS

FIG. 4 illustrates an alternative embodiment of the operational flow of FIG. 3;

FIG. 5 illustrates a further alternative embodiment of the operational flow of FIG. 3;

FIG. 6 illustrates another alternative embodiment of the operational flow of FIG. 3;

FIG. 7 illustrates a further embodiment of the operational flow of FIG. 3;

FIG. 8 illustrates an exemplary computer-program product;

FIG. 15 illustrates an exemplary computer-program product;

FIG. 24 illustrates another alternative embodiment of the exemplary operational flow of FIG. 20;

FIG. 25 illustrates a further alternative embodiment of the exemplary operational flow of FIG. 20;

FIG. 26 illustrates an exemplary embodiment of a network device;

FIG. 27 illustrates an exemplary computer-program product;

FIG. 30 illustrates an alternative embodiment of the operational flow of FIG. 29;

FIG. 31 illustrates an alternative embodiment of the operational flow of FIG. 29;

FIG. 32 illustrates another alternative embodiment of the operational flow of FIG. 29;

FIG. 33 illustrates a further alternative embodiment of the operational flow of FIG. 29;

FIG. 34 illustrates another alternative embodiment of the operational flow of FIG. 29;

FIG. 35 illustrates a further alternative embodiment of the operational flow of FIG. 29.

DETAILED DESCRIPTION

Figure 1:
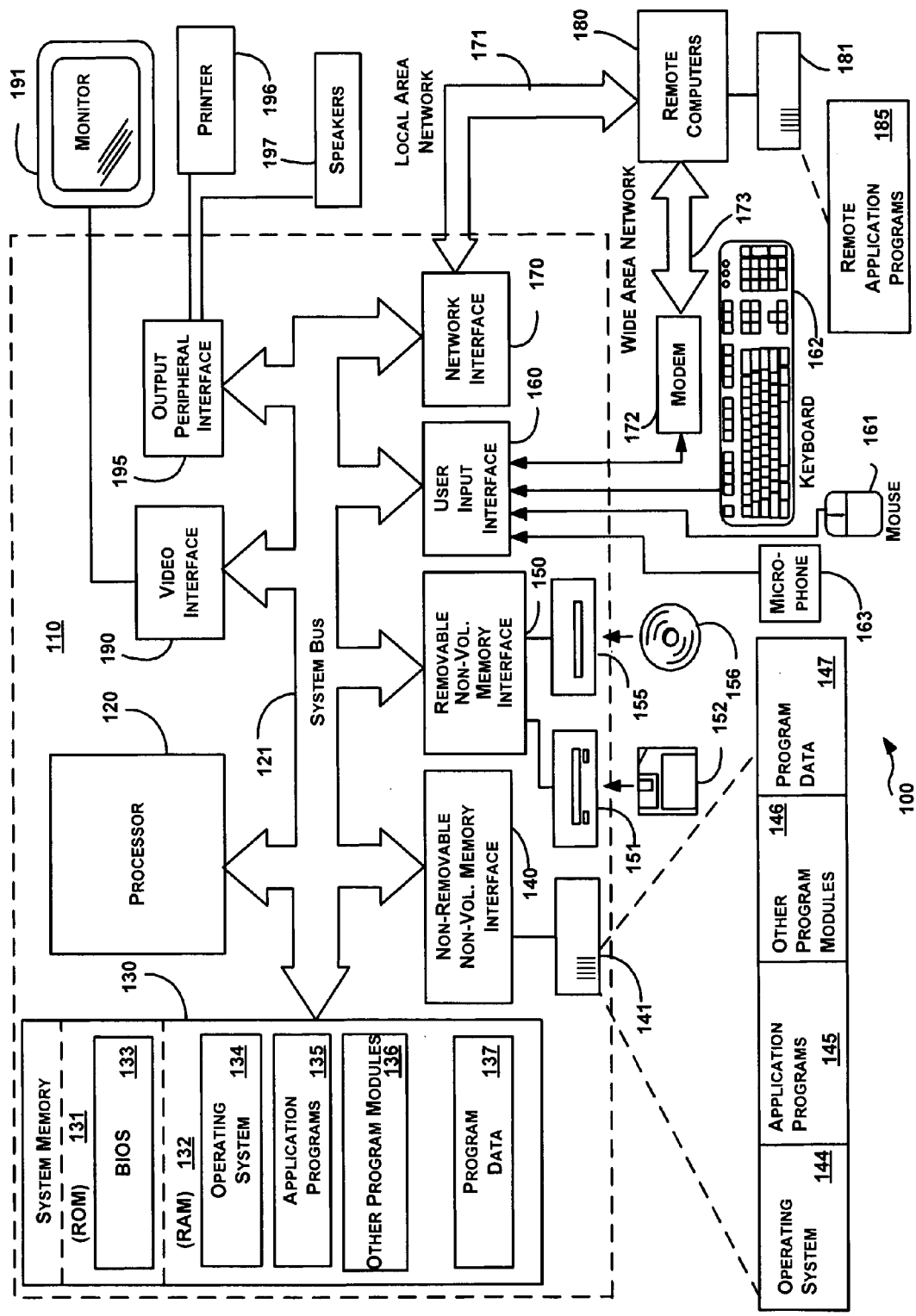
FIG. 1 illustrates an exemplary general-purpose computing system in which embodiments may be implemented.

In the following detailed description, reference is made to the accompanying drawings, which form a part hereof. In the drawings, similar symbols typically identify similar components, unless context dictates otherwise. The illustrated embodiments described in the detailed description, drawings, and claims are not meant to be limiting. Other embodiments may be utilized, and other changes may be made, without departing from the spirit or scope of the subject matter presented here.

FIG. 1 illustrates an exemplary general-purpose computing system in which embodiments may be implemented, shown as a computing system environment 100. Components of the computing system environment 100 may include, but are not limited to, a computing device 110 having a processor 120, a system memory 130, and a system bus 121 that couples various system components including the system memory to the processor 120. By way of example, the processor may include a microprocessor, a central processing unit (CPU), and/or multi-core processor. The system bus 121 may be any of several types of bus structures including a memory bus or memory controller, a peripheral bus, and a local bus using any of a variety of bus architectures. Such architectures may include at least one Industry Standard Architecture (ISA) bus, Micro Channel Architecture (MCA) bus, Enhanced ISA (EISA) bus, Video Electronics Standards Association (VESA) local bus, and/or Peripheral Component Interconnect (PCI) bus, also known as Mezzanine bus.

The computing system environment 100 typically includes a variety of computer-readable media products. Computer-readable media may include any media that can be accessed by the computing device 110 and include both volatile and nonvolatile media, removable and non-removable media. By way of example, and not of limitation, computer-readable media may include computer storage media and communications media. Computer storage media may include volatile and nonvolatile, removable and non-removable media implemented in any method or technology for storage of information such as computer-readable instructions, data structures, program modules, or other data. Computer storage media may include, but are not limited to, random-access memory (RAM), read-only memory (ROM), electrically erasable programmable read-only memory (EEPROM), flash memory, or other memory technology, CD-ROM, digital versatile disks (DVD), or other optical disk storage, magnetic cassettes, magnetic tape, magnetic disk storage, or other magnetic storage devices, or any other medium which can be used to store the desired information and which can be accessed by the computing device 110. Communications media typically embody computer-readable instructions, data structures, program modules, or other data in a modulated data signal such as a carrier wave or other transport mechanism and include any information delivery media. The term "modulated data signal" means a signal that has one or more of its characteristics set or changed in such a manner as to encode information in the signal. Communications media may include a wired media, such as a wired network and/or a direct-wired connection, and/or a wireless media, such as acoustic, RF, optical, and infrared media. Combinations of any of the above may also be included within the scope of computer-readable media.

The system memory 130 includes computer storage media in the form of volatile and nonvolatile memory such as ROM 131 and RAM 132. A basic input/output system (BIOS) 133, containing the basic routines that help to transfer information between elements within the computing device 110, such as during start-up, is typically stored in ROM 131. RAM 132 typically contains data and program modules that are immediately accessible to or presently being operated on by processor 120. By way of example, and not limitation, FIG. 1 illustrates an operating system 134, application programs 135, other program modules 136, and program data 137. Often, the operating system 134 offers services to applications programs 135 by way of one or more application programming interfaces (APIs) (not shown). Because the operating system 134 incorporates these services, developers of applications programs 135 need not redevelop code to use the services. Examples of APIs provided by operating systems such as Microsoft's WINDOWS® are well known in the art.

In an embodiment, an information store may include a computer storage media. In a further embodiment, an information store may include a group of digital information storage devices. In another embodiment, an information store may include a quantum memory device.

The computing device 110 may also include other removable/non-removable, volatile/nonvolatile computer storage media products. By way of example only, FIG. 1 illustrates a non-removable non-volatile memory interface (hard disk interface) 140 that reads from and writes to non-removable, non-volatile magnetic media, a magnetic disk drive 151 that reads from and writes to a removable, non-volatile magnetic disk 152, and an optical disk drive 155 that reads from and writes to a removable, non-volatile optical disk 156 such as a CD ROM. Other removable/nonremovable, volatile/nonvolatile computer storage media that can be used in the exemplary operating environment include, but are not limited to, magnetic tape cassettes, flash memory cards, DVDs, digital video tape, solid state RAM, and solid state ROM. The hard disk drive 141 is typically connected to the system bus 121 through a non-removable memory interface, such as the interface 140, and magnetic disk drive 151 and optical disk drive 155 are typically connected to the system bus 121 by a removable non-volatile memory interface, such as interface 150.

The drives and their associated computer storage media discussed above and illustrated in FIG. 1 provide storage of computer-readable instructions, data structures, program modules, and other data for the computing device 110. In FIG. 1, for example, hard disk drive 141, is illustrated as storing an operating system 144, application programs 145, other program modules 146, and program data 147. Note that these components can either be the same as or different from the operating system 134, application programs 135, other program modules 136, and program data 137. The operating system 144, application programs 145, other program modules 146, and program data 147 are given different numbers here to illustrate that, at a minimum, they are different copies. A user may enter commands and information into the computing device 110 through input devices such as a microphone 163, keyboard 162, and pointing device 161, commonly referred to as a mouse, trackball, or touch pad. Other input devices (not shown) may include a joystick, game pad, satellite dish, and scanner. These and other input devices are often connected to the processor 120 through a user input interface 160 that is coupled to the system bus, but may be connected by other interface and bus structures, such as a parallel port, game port, or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computing system environment 100 may operate in a networked environment using logical connections to one or more remote computers, such as a remote computer 180. The remote computer 180 may be a personal computer, a server, a router, a network PC, a peer device, or other common network node, and typically includes many or all of the elements described above relative to the computing device 110, although only a memory storage device 181 has been illustrated in FIG. 1. The logical connections depicted in FIG. 1 include a local area network (LAN) 171 and a wide area network (WAN) 173, but may also include other networks such as a personal area network (PAN) (not shown). Such networking environments are commonplace in offices, enterprise-wide computer networks, intranets, and the Internet.

When used in a LAN networking environment, the computing system environment 100 is connected to the LAN 171 through a network interface or adapter 170. When used in a WAN networking environment, the computing device 110 typically includes a modem 172 or other means for establishing communications over the WAN 173, such as the Internet. The modem 172, which may be internal or external, may be connected to the system bus 121 via the user input interface 160, or via another appropriate mechanism. In a networked environment, program modules depicted relative to the computing device 110, or portions thereof, may be stored in a remote memory storage device. By way of example, and not limitation, FIG. 1 illustrates remote application programs 185 as residing on computer storage medium 181. It will be appreciated that the network connections shown are exemplary and other means of establishing a communications link between the computers may be used.

FIG. 1 is intended to provide a brief, general description of an illustrative and/or suitable exemplary environment in which embodiments may be implemented. An exemplary system may include the computing system environment 100 of FIG. 1. FIG. 1 is an example of a suitable environment and is not intended to suggest any limitation as to the structure, scope of use, or functionality of an embodiment. A particular environment should not be interpreted as having any dependency or requirement relating to any one or combination of components illustrated in an exemplary operating environment. For example, in certain instances, one or more elements of an environment may be deemed not necessary and omitted. In other instances, one or more other elements may be deemed necessary and added.

In the description that follows, certain embodiments may be described with reference to acts and symbolic representations of operations that are performed by one or more computing devices, such as the computing device 110 of FIG. 1. As such, it will be understood that such acts and operations, which are at times referred to as being computer-executed, include the manipulation by the processor of the computer of electrical signals representing data in a structured form. This manipulation transforms the data or maintains them at locations in the memory system of the computer, which reconfigures or otherwise alters the operation of the computer in a manner understood by those skilled in the art. The data structures in which data is maintained are physical locations of the memory that have particular properties defined by the format of the data. However, while an embodiment is being described in the foregoing context, it is not meant to be limiting as those of skill in the art will appreciate that the acts and operations described hereinafter may also be implemented in hardware.

Embodiments may be implemented with numerous other general-purpose or special-purpose computing devices and computing system environments or configurations. Examples of well-known computing systems, environments, and configurations that may be suitable for use with an embodiment include, but are not limited to, personal computers, handheld or laptop devices, personal digital assistants, multiprocessor systems, microprocessor-based systems, set top boxes, programmable consumer electronics, network, minicomputers, server computers, game server computers, web server computers, mainframe computers, and distributed computing environments that include any of the above systems or devices.

Embodiments may be described in a general context of computer-executable instructions, such as program modules, being executed by a computer. Generally, program modules include routines, programs, objects, components, data structures, etc., that perform particular tasks or implement particular abstract data types. An embodiment may also be practiced in a distributed computing environment where tasks are performed by remote processing devices that are linked through a communications network. In a distributed computing environment, program modules may be located in both local and remote computer storage media including memory storage devices.

Figure 2:
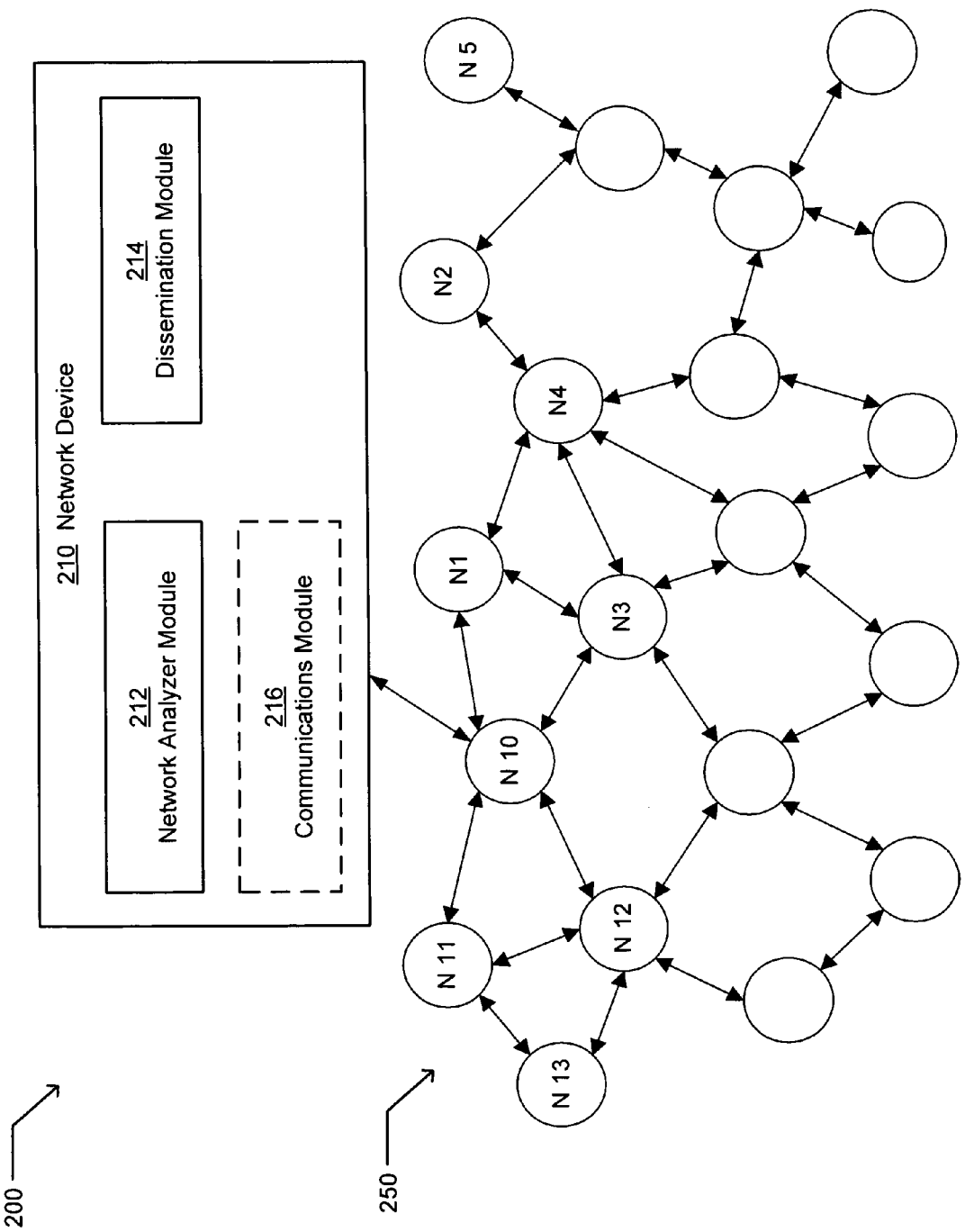
FIG. 2 illustrates an exemplary environment.

FIG. 2 illustrates an exemplary environment 200. The exemplary environment includes a network device 210 and a plurality of networked nodes 250. The network device includes a network analyzer module 212 and a dissemination module 214. The network analyzer module is operable to monitor the plurality of networked nodes for an indicium of an activity at each respective node. The dissemination module is operable to facilitate distribution of a malware countermeasure to a first set of networked nodes of the plurality of networked nodes in a manner responsive to an indicium of an activity associated with the first set of networked nodes of the plurality of networked nodes.

The plurality of networked nodes 250 may include at least any two nodes coupled directly or indirectly by a network. FIG. 2 illustrates the plurality of nodes as including nodes N1-N12. In an embodiment, at least a portion of the plurality of networked nodes may include a local area network (LAN) and/or a wide area network (WAN). In another embodiment, at least a portion of the plurality of networked nodes may include a personal area network. In a further embodiment, at least one of the plurality of networked nodes includes a wired node. In another embodiment, at least one of the plurality of networked nodes includes a wireless node. In an embodiment, at least one of the plurality of nodes includes a node couplable with the Internet.

In an embodiment, the network device 210 includes a computer networking device. In another embodiment, the malware includes at least one of a virus, a worm, Trojan horse, a rootkit, a spyware, an adware, a buffer overflow, a virus hoax, adware, a dialer, a hack tool, a joke program, a remote access without a user permission, a back door, a trackware, and/or a keystroke capture program.

In a further embodiment, the malware countermeasure includes a countermeasure useable in at least substantially reducing a harm causable by the malware. In another embodiment, the harm includes at least one of a detriment, an inconvenience, a logging of data, a spying, a downloading of a program, an unauthorized activation of a program, a display of an advertisement without a client permission, an unauthorized redirection of a URL, a malicious vector, an exploit, an at least substantial slowing of an operation of a computing device, a crashing a computing device, an unauthorized collection of data, and/or a loss of data.

In an embodiment, the network analyzer module 212 further includes a network analyzer module operable to examine a packet transmitted in a network for inspection and analysis. In certain embodiment, the network analyzer module may be characterized as a "sniffer," "packet sniffer," "packet analyzer," "traffic analyzer" and "protocol analyzer." In another embodiment, the "examine a packet" may include a capture, a sample, and/or a view of a packet. In a further embodiment, the network analyzer module further includes an operability to store packets for further analysis. In another embodiment, the network analyzer module further includes a network analyzer module implemented in at least one of a hardware, a software, and/or a firmware.

In an embodiment, the network analyzer module 212 further includes a network analyzer module operable to generate a list of nodes responsive to the monitoring of the plurality of networked nodes 250. In another embodiment, the network analyzer module further includes a network analyzer module operable to at least one of actively and/or passively monitor the plurality of networked nodes for an indicium of an activity at each respective node. In a further embodiment, the "actively monitor" includes broadcasting a query about connections that at least one node of the plurality of networked nodes has made over a period of time. In another embodiment, the network analyzer module further includes a network analyzer module operable to generate a topological map that includes each respective node of a plurality of networked nodes.

In an embodiment, the network analyzer module 212 further includes a network analyzer module operable to generate an information corresponding to each respective node of a plurality of networked nodes 250. In another embodiment, the network analyzer module further includes a network analyzer module operable to monitor a plurality of networked nodes for an indicium of an activity at each respective node, where at least one node of the plurality of networked nodes includes at least one of a read-only file server, a read-write file server, a file server, a web server, and/or a file-sharing node. In a further embodiment, the network analyzer module further includes a network analyzer module operable to monitor a plurality of networked nodes for an indicium of an activity at each respective node, the indicated activity corresponding to at least one of an operating system, a protocol, an application, a program, a usage, a traffic, a running service, and/or an active interface.

In an embodiment, the network analyzer module 212 further includes a network analyzer module operable to monitor a plurality of networked nodes 250 for an indicium of an activity at each respective node, the indicium of an corresponding to a presence of at least one of an iTunes® program, an Outlook® brand email program, a Word® brand word processing program, an AOL® brand instant messenger program, and/or a Firefox® brand browser program. In another embodiment, the network analyzer module further includes a network analyzer module operable to monitor a plurality of networked nodes for an indicium of an activity at each respective node, the indicium of an activity corresponding to at least one of page loads, visits, unique visitors, new visitors, frequency of visits, and/or downloads.

In an embodiment, a node of a plurality of networked nodes 250 further includes another network device, a network appliance, a computing device, a desktop computing device, a laptop computing device, a mobile computing device, a host, a server, and/or a network card of a computing device. In another embodiment, a node of a plurality of networked nodes further includes a switch, a bridge, a router, an edge router, a gateway, a hub, and/or a repeater. In a further embodiment, a node of the plurality of networked nodes further includes a wired node, and/or a wireless node.

In an embodiment, the dissemination module 214 further includes a dissemination module operable to at least one of cause, assist, instigate, and/or initiate a distribution of a malware countermeasure to a first set of networked nodes of the plurality of networked nodes 250 in a manner responsive to an indicium of an activity associated with the first set of networked nodes of the plurality of networked nodes. In another embodiment, the dissemination module further includes a dissemination module operable to at least one of directly distribute, and/or cause another to distribute a malware countermeasure to a first set of networked nodes of the plurality of networked nodes in a manner responsive to an indicium of an activity associated with the first set of networked nodes of the plurality of networked nodes. In a further embodiment, the dissemination module further includes a dissemination module operable to facilitate distribution of a malware countermeasure to a first set of networked nodes of the plurality of networked nodes in a manner responsive to a criterion and to an indicium of an activity associated with the first set of networked nodes of the plurality of networked nodes.

In an embodiment, dissemination module 214 further includes a dissemination module operable to facilitate distribution of a malware countermeasure to a first set of networked nodes of the plurality of networked nodes 250 in a manner responsive to a criterion and to an indicium of an activity associated with the first set of networked nodes of the plurality of networked nodes. The criterion including a correlation between an aspect of the malware and an indicated activity associated with the first set. For example, the dissemination module is operable to disseminate a countermeasure for a worm exploiting a vulnerability in Internet Explorer to a first set of nodes running Internet Explorer. In another embodiment, the dissemination module further includes a dissemination module operable to facilitate distribution of a malware countermeasure to a first set of networked nodes of the plurality of networked nodes in a manner responsive to a correlation between a ranking criteria and an indicium of a rank of an activity associated with the first set of networked nodes of the plurality of networked nodes. For example, the dissemination module is operable to facilitate distribution of a malware countermeasure according to a criterion that includes a correlation between a ranking criteria designating the most active 10% as first to receive the malware countermeasure and the first set including the 10% most active nodes of the plurality of networked nodes 250. In this example, the most active nodes would receive a countermeasure first. Continuing with the above example, the next 10% most active nodes would receive the countermeasure next. In a further embodiment, the dissemination module further includes a dissemination module operable to facilitate distribution of a malware countermeasure received from another or a malware countermeasure generated by the network device 210 to a first set of networked nodes of the plurality of networked nodes in a manner responsive to an indicium of an activity associated with the first set of networked nodes of the plurality of networked nodes.

In an embodiment, the dissemination module 214 further includes a dissemination module implemented in hardware, firmware, and/or software. In a further embodiment, the dissemination module further includes a dissemination module operable to facilitate distribution of a malware countermeasure to a first set of networked nodes of the plurality of networked nodes in a manner responsive to an indicium of an activity associated with the first set of networked nodes of the plurality of networked nodes. The dissemination module then facilitates distribution of the malware countermeasure to a second set of networked nodes of the plurality of networked nodes in a manner responsive to an indicium of the activity associated with the second set of networked nodes of the plurality of networked nodes.

In an embodiment, the dissemination module 214 further includes a dissemination module operable to at least substantially sequentially: facilitate distribution of a malware countermeasure to a first set of networked nodes of the plurality of networked nodes 250 in a manner responsive to an indicium of an activity associated with the first set of networked nodes of the plurality of networked nodes; and then facilitate distribution of the malware countermeasure to a second set of networked nodes of the plurality of networked nodes in a manner responsive to an indicium of the activity associated with the second set of networked nodes of the plurality of networked nodes.

In another embodiment, the first set of networked nodes includes at least one node of the plurality of network nodes. In a further embodiment, the first set of networked nodes includes all nodes of the plurality of network nodes. In another embodiment, the first set of networked nodes includes less than all nodes of the plurality of network nodes. In a further embodiment, the second set of networked nodes includes at least one node of the plurality of network nodes. In an embodiment, the network device 210 further includes a communications module 216 operable to send a packet to at least one node of the plurality of networked node. In another embodiment, a packet includes a digital packet, a data packet, a network packet, a block of data, a frame, and/or datagram transmittable over a network.

In use, an embodiment provides a network device 210 that may function as an active node or a passive node of the plurality of networked nodes 250. For example, a passive network device may be passively coupled to a node of the plurality of networked nodes, illustrated in FIG. 2 as coupled to the node N1. The network analyzer module 212 may observe traffic across the plurality of networked nodes, behavior of at least one node of the plurality of networked nodes, and/or map a topography of the plurality of networked nodes. A goal of observation and/or monitoring includes gathering information useful in distribution of a malware countermeasure to one or more nodes having a significance in the plurality of networked nodes. A significance may include high bandwidth nodes. Another goal includes gathering information indicating a characteristic of each respective node of the plurality of nodes useful in tailoring a distribution of a malware countermeasure to one or more nodes having a vulnerability to a malware. A characteristic may include an operating system used by one or more nodes, and/or port activity.

Upon an indication that a malware countermeasure should be disseminated, the dissemination module 214 facilitates distribution of the malware countermeasure to a first set of networked nodes of the plurality of networked nodes. The first set of networked nodes is established in a manner responsive to an indicium of an activity associated with the first set of networked nodes of the plurality of networked nodes. For example, a rule set may be established that for a class of malware that the ten percent most active nodes of the plurality of networked nodes receive the malware countermeasure first. These nodes would constitute the first set of nodes. The rule set may then include distributing the malware countermeasure for the class of malware to the next ten percent most active nodes next, and so on. In another example, a rule set may be established that nodes using an operating system targeted by a malware receive the malware countermeasure first. For example, nodes using a Windows 2000 operating system will constitute the first set of nodes and receive a first distribution of a malware countermeasure indicated for a malware targeting Windows 2000 machines.

If the embodiment of the network device is a passive network device, then the dissemination module may instruct another node to distribute the malware countermeasure. For example, the dissemination module 214 may communicate with another network device at node N5, and node N5 in response transmits the malware countermeasure. Alternatively, if the embodiment of the network device is an active network device, the dissemination module may transmit the malware countermeasure.

Figure 3:
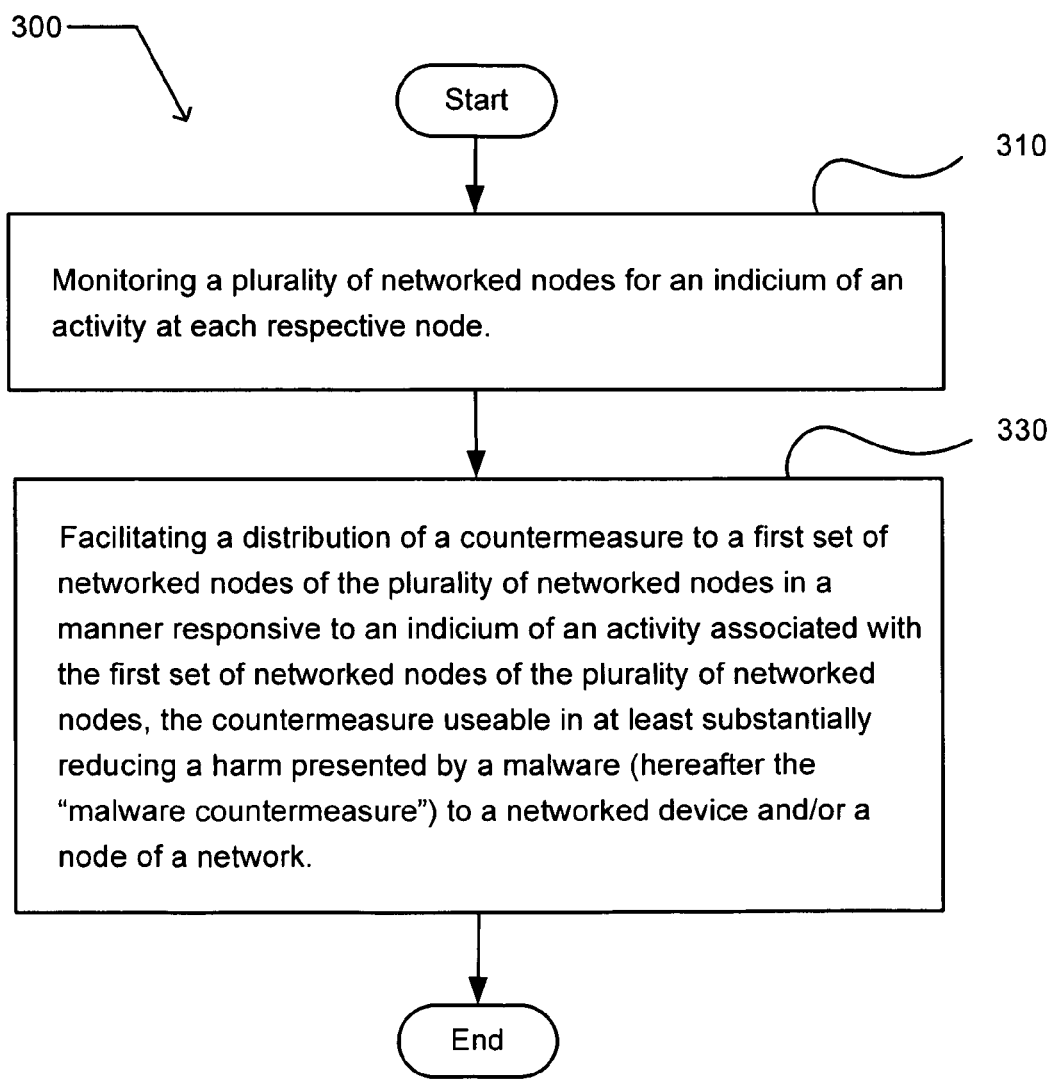
FIG. 3 illustrates an exemplary operational flow.

FIG. 3 illustrates an exemplary operational flow 300. After a start operation, the operational flow moves to an observation operation 310. The observation operation monitors a plurality of networked nodes for an indicium of an activity at each respective node. A propagation operation 330 facilitates a distribution of a countermeasure to a first set of networked nodes of the plurality of networked nodes in a manner responsive to an indicium of an activity associated with the first set of networked nodes of the plurality of networked nodes. The countermeasure being useable in at least substantially reducing a harm presented by a malware (hereafter the "malware countermeasure") to a networked device and/or a node of a network. The operational flow then moves to an end operation.

FIG. 4 illustrates an alternative embodiment of the operational flow 300 of FIG. 3. The observation operation 310 may include at least one additional operation. The at least one additional operation may include an operation 312, an operation 314, an operation 316, and/or an operation 318. The operation 312 examines a packet destined for a node of the plurality of networked nodes for an indicium of an activity corresponding to the node. The operation 314 generates a topological map that includes each node of the plurality of networked nodes. The operation 316 generates an information corresponding to each respective node of the plurality of networked nodes. The operation 318 at least one of actively and/or passively monitors a plurality of networked nodes for an indicium of an activity at each respective node.

FIG. 5 illustrates an alternative embodiment of the operational flow 300 of FIG. 3. The propagation operation 330 may include at least one additional operation. The at least one additional operation may include an operation 332, an operation 334, and/or an operation 336. The operation 332 at least one of causes, assists, instigates, and/or initiates a distribution of a malware countermeasure to a first set of networked nodes of the plurality of networked nodes in a manner responsive to an indicium of an activity associated with the first set of networked nodes of the plurality of networked nodes. The operation 334 facilitates distribution of a malware countermeasure to a first set of networked nodes of the plurality of networked nodes in a manner responsive to a correlation of an aspect of the malware and an indicium of an activity associated with the first set of networked nodes of the plurality of networked nodes. The operation 336 facilitates a distribution of a malware countermeasure to a first set of networked nodes of the plurality of networked nodes in a manner responsive to a correlation of an Outlook® orientated email virus and an indicium of a presence of an Outlook® email program associated with the first set of networked nodes of the plurality of networked nodes.

FIG. 6 illustrates another alternative embodiment of the operational flow 300 of FIG. 3. The propagation operation 330 may include at least one additional operation. The at least one additional operation may include an operation 338. The operation 338 facilitates distribution of a malware countermeasure to a first set of networked nodes of the plurality of networked nodes in a manner responsive to a correlation of a Windows® orientated worm and an indicium of a use of a Windows® XP OS associated with the first set of networked nodes of the plurality of networked nodes. The operation 338 at least subsequently then facilitates a distribution of a malware countermeasure to a second set of networked nodes of the plurality of networked nodes in a manner responsive to a correlation of the Windows® orientated worm and an indicium of a use of a Windows® 2000 OS associated with the second set of networked nodes of the plurality of networked nodes.

FIG. 7 illustrates a further embodiment of the operational flow 300 of FIG. 3. The propagation operation 330 may include at least one additional operation. The at least one additional operation may include an operation 342, and/or an operation 344. The operation 342 facilitates a distribution of a malware countermeasure to a first set of networked nodes of the plurality of networked nodes in a manner responsive to a correlation of a web browser worm and an indicium of a use of a Internet Explorer® web browser associated with the first set of networked nodes of the plurality of networked nodes. The operation 342 at least subsequently then facilitates a distribution of a malware countermeasure to a second set of networked nodes of the plurality of networked nodes in a manner responsive to a correlation of the web browser orientated worm and an indicium of a use of a Firefox® web browser associated with the second set of networked nodes of the plurality of networked nodes. The operation 344 facilitates a distribution of a malware countermeasure to a first set of networked nodes of the plurality of networked nodes in a manner responsive to a correlation of a criterion and an indicium of an activity associated with the first set of networked nodes of the plurality of networked nodes.

FIG. 8 illustrates an exemplary computer-program product 400. The computer-program product includes program instructions 410 operable to perform a process in a computing device. The process includes monitor a plurality of networked nodes for an indicium of an activity at each respective node. The process also includes facilitate a distribution of a malware countermeasure to a first set of networked nodes of the plurality of networked nodes in a manner responsive to an indicium of an activity associated with the first set of networked nodes of the plurality of networked nodes. The computer-program product also includes a computer-readable signal-bearing medium 405 bearing the program instructions.

In an alternative embodiment, the process of facilitate a distribution of a malware countermeasure further includes facilitate a distribution of a malware countermeasure to a first set of networked nodes of the plurality of networked nodes in a manner responsive to correlation between a criterion and an indicium of an activity associated with the first set of networked nodes of the plurality of networked nodes. In another embodiment, the computer-readable signal-bearing medium 405 includes a computer storage medium 422. In another embodiment, the computer-readable signal-bearing medium includes a communication medium 424.

Figure 9:
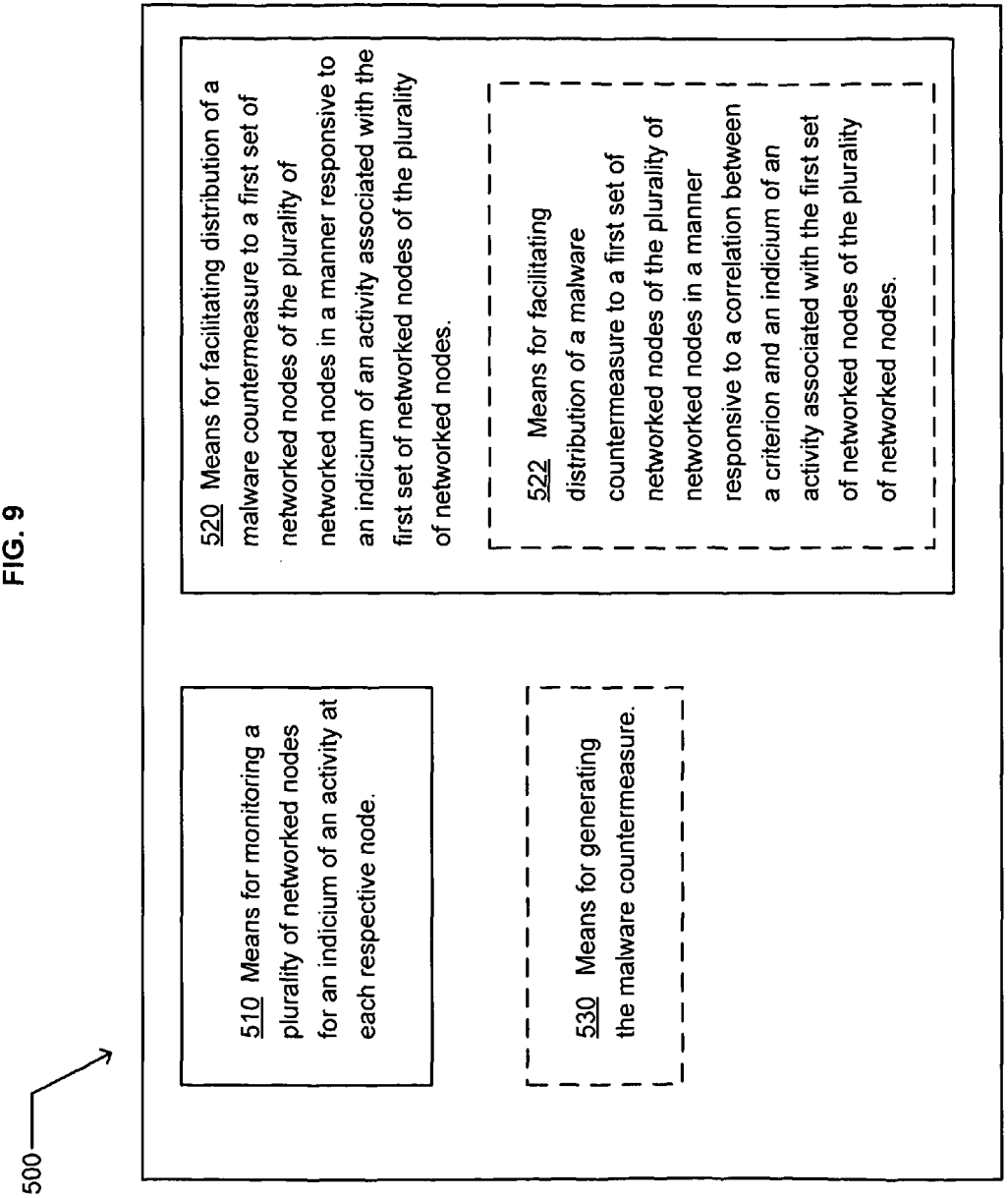
FIG. 9 illustrates an exemplary network device.

FIG. 9 illustrates an exemplary network device 500. The network device includes means 510 for monitoring a plurality of networked nodes for an indicium of an activity at each respective node. The network device also includes means 520 for facilitating distribution of a malware countermeasure to a first set of networked nodes of the plurality of networked nodes in a manner responsive to an indicium of an activity associated with the first set of networked nodes of the plurality of networked nodes.

In an alternative embodiment, the means 520 further includes means 552 for facilitating distribution of a malware countermeasure to a first set of networked nodes of the plurality of networked nodes in a manner responsive to a correlation between a criterion and an indicium of an activity associated with the first set of networked nodes of the plurality of networked nodes. In another alternative embodiment, the network device further includes means 530 for generating the malware countermeasure.

Figure 10:
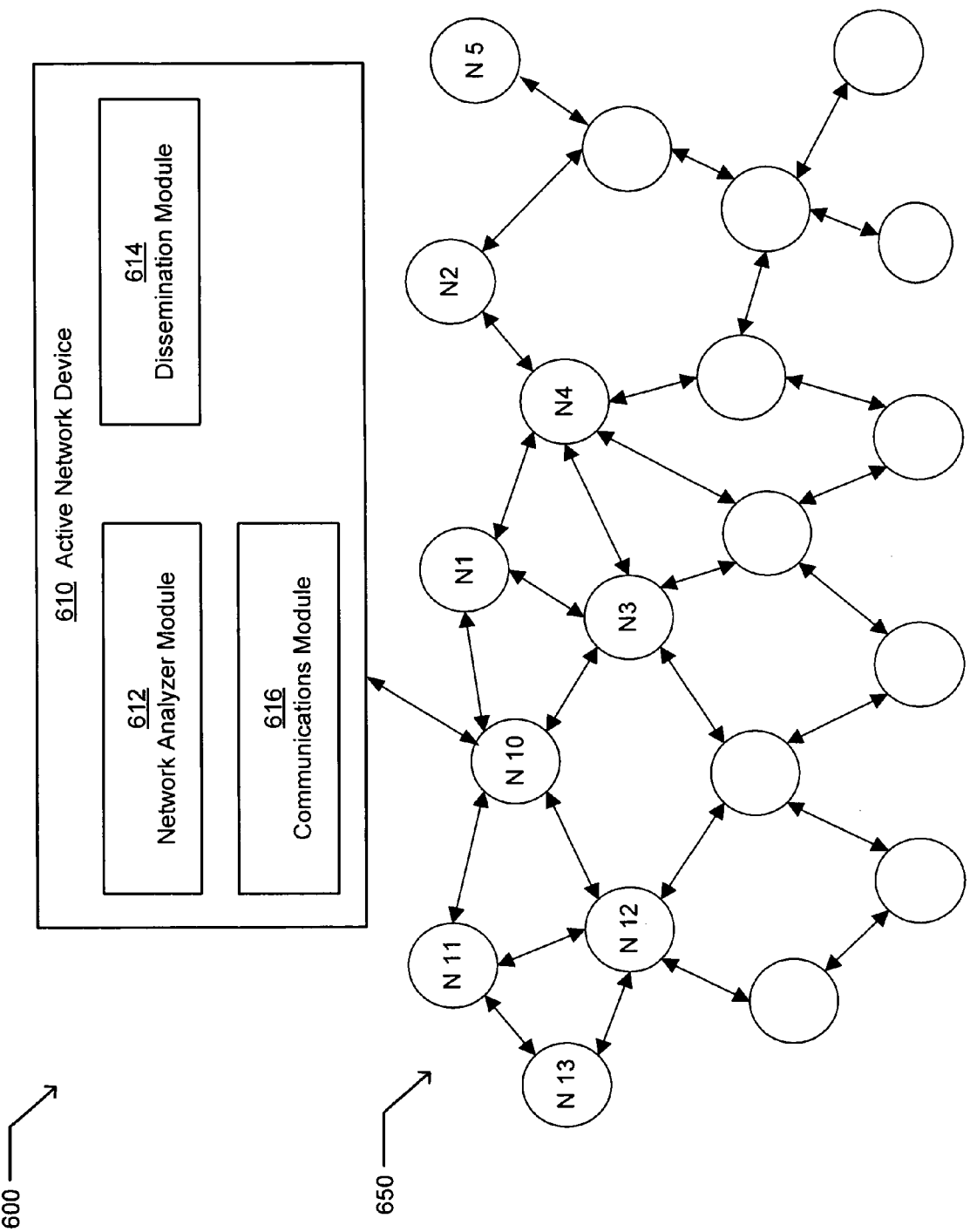
FIG. 10 illustrates an exemplary environment.

FIG. 10 illustrates an exemplary environment 600. The environment includes an active network device 610 and a plurality of networked nodes 650. In an embodiment, the plurality of networked nodes may be at least substantially similar to the plurality of networked nodes 250 of FIG. 2. The active network device includes a communications module 616, a network analyzer module 612, and a dissemination module 614. The communications module includes a communications module operable to facilitate a movement of packets to at least one node of a plurality of networked nodes. The network analyzer module includes a network analyzer module operable to monitor each respective node of the plurality of networked nodes for an indicium of an activity. The dissemination module includes a dissemination module operable to distribute a malware countermeasure to a first set of nodes of the plurality of networked nodes in a manner responsive to the indicium of an activity corresponding to the first set of networked nodes of the plurality of networked nodes.

In an embodiment, the active network device 610 includes a computer networking device. In another embodiment, the active network device includes an active digital network device implementing a TCP/IP, a SONET, an ATM, an IPX, and/or wireless protocol. For example, a wireless protocol may include an IEEE 802.11 protocol.

In an embodiment, the communications module 616 further includes a communications module operable to forward packets to the at least one node of a plurality of networked nodes. In another embodiment, the communications module further includes a communications module operable to receive and forward a packet to at least one node of the plurality of networked nodes.

Figure 11:
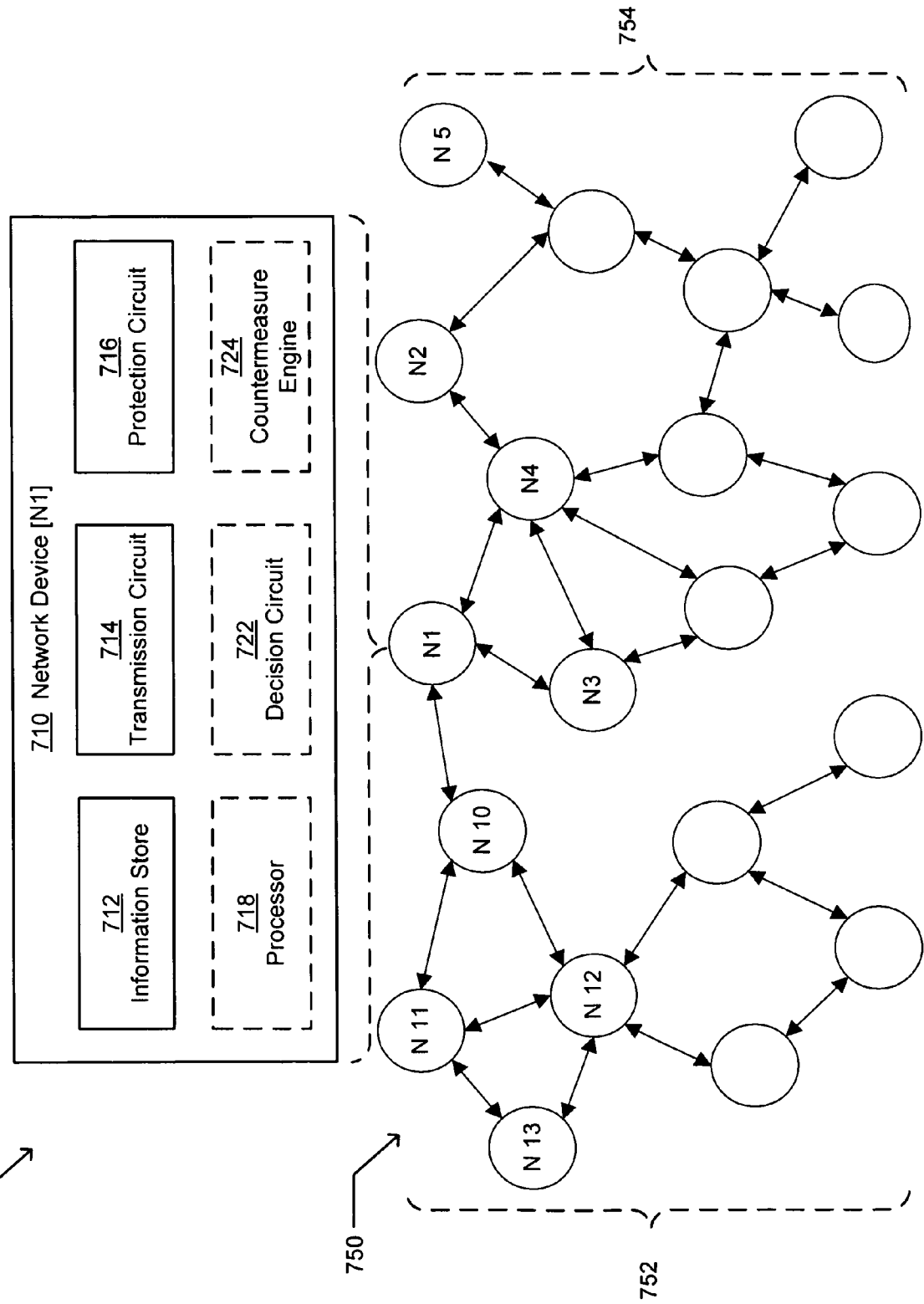
FIG. 11 illustrates an exemplary environment.

FIG. 11 illustrates an exemplary environment 700. The exemplary environment includes a network that includes a plurality of sub-network nodes 750. The plurality of sub-network nodes include a first sub-network of the plurality network nodes, illustrated as a first sub-network 752 that includes nodes N 10-N13, and a second sub-network of the plurality of network nodes, illustrated as a second sub-network 754 that includes nodes N2-N6. In an embodiment, the plurality of sub-network nodes may be at least substantially similar to the plurality of networked nodes 250 of FIG. 2. The exemplary environment also includes a network device 710, illustrated as a node N1. In an embodiment, the network device may include a network appliance, a computing device, a desktop computing device, a laptop computing device, a mobile computing device, a host, a server, and/or a network card of a computing device. In another embodiment, the network device may include a switch, a bridge, a router, an edge router, a gateway, a hub, and/or a repeater. In an embodiment, a node of the plurality of networked nodes further includes a wired node, and/or a wireless node. In another embodiment, the network device includes a network device wirelessly couplable to a node the plurality of networked nodes. In a further embodiment, the network device includes a network device physically couplable to a node of the plurality of networked nodes. For example, a physically couplable may include directly and/or indirectly couplable using an Ethernet cable, a fiber optic cable, and/or other connector that includes a physical communications media.

The network device 710 includes an information store 712, a transmission circuit 714, and a protection circuit 716. The information store includes an information store operable to save a countermeasure useable in at least substantially reducing a harm caused by a malware (hereafter the "malware countermeasure"). The transmission circuit includes a transmission circuit for sending a packet to at least one sub-network of a plurality of sub-networks 750. The protection circuit includes a protection circuit for implementing the malware countermeasure in the network device. In an alternative embodiment, the protection circuit includes a protection circuit for implementing the malware countermeasure on the network device.

In an embodiment, the information store 712 further includes an information store implemented in at least one of a computer storage media, a digital information storage device, a group of digital information storage devices, and/or a quantum memory device operable to save a countermeasure useable in at least substantially reducing a harm caused by a malware. In another embodiment, the transmission circuit 714 further includes a transmission circuit for receiving a packet from a node of another network and communicating the received packet to at least a node of the least one sub-network of a plurality of sub-networks.

In an embodiment, the protection circuit 716 further includes a protection circuit for applying the malware countermeasure in the network device 710. In another embodiment, the protection circuit further includes a protection circuit for implementing the malware countermeasure in the network device. The implementing the malware countermeasure includes closing at least one port (not shown) of the network device. In a further embodiment, the protection circuit further includes a protection circuit for implementing the malware countermeasure in the network device, the implementing the malware countermeasure including at least substantially isolating the network device from a network. For example, the network device may be isolated from the plurality of sub-networks 750. Alternatively, the network device may be isolated from the Internet (not shown). In another embodiment, the protection circuit further includes a protection circuit for implementing the malware countermeasure in the network device, the implementing the malware countermeasure including at least substantially isolating at least one sub-network of the plurality sub-networks from the network device. For example, the network device may isolate the sub-network 752 from the network device.

In an embodiment, the protection circuit 716 further includes a protection circuit for implementing the malware countermeasure in the network device 710. The implementing the malware countermeasure includes at least substantially isolating at least one node of the plurality of sub-networks 750 from the network device 710. For example, the node N2 may be logically isolated from the network device. In another embodiment, the protection circuit further includes a protection circuit for implementing the malware countermeasure in the network device, the implementing the malware countermeasure including at least substantially isolating the first sub-network 752 of the plurality sub-networks from the second sub-network 754 of the plurality sub-networks. In a further embodiment, the protection circuit further includes a protection circuit for implementing the malware countermeasure in the network device, the implementing the malware countermeasure including at least substantially isolating at least two sub-networks (752, 754) of the plurality sub-networks from another network, such as the Internet (not shown).

In an embodiment, the protection circuit 716 further includes a protection circuit for implementing the malware countermeasure in the network device 710. The implementing the malware countermeasure includes at least substantially isolating the network device from at least one network address of a sub-network of the plurality sub-networks 750. In another embodiment, the protection circuit further includes a protection circuit for implementing the malware countermeasure in the network device, the implementing the malware countermeasure including at least substantially reducing a functionally of the network device. The reduced functionality may include a restricted communication right, a reduced transmission rate and/or volume, a reduced reception rate and/or volume, a restriction against performing a destructive writing operation, a blocking an application from running, a disabling an account, and/or a forcing a user and/or an application to execute in a tighter security environment. In a further embodiment, the protection circuit further includes a protection circuit for implementing the malware countermeasure in the network device, the implementing the malware countermeasure including at least substantially reducing a communication privilege allowed a node of one sub-network of the plurality of sub-networks. The reduced communication privilege may include a right to send only, or a right to receive only. Alternatively, the reduced communication privilege may include a right to send only a specified file format, such as TIF or a PDF format.

In an embodiment, the protection circuit 716 further includes a protection circuit for implementing the malware countermeasure in the network device 710. The implementing the malware countermeasure including sending a notice receivable by a device (not shown) associatable with a person. For example, the protection circuit may be configured to send an email to an email account associated with a network administrator, to send a text message to a portable wireless device carried by the network administrator, such as a cell phone, and/or to send a recorded voice message to a telephone number designated by the network administrator. In another embodiment, the protection circuit further includes a protection circuit for implementing the malware countermeasure in the network device if the criterion is met for implementation of the malware countermeasure.

In an embodiment, the network device 710 further includes a processor 718. The processor may be at least substantially similar to the processor 120 of FIG. 1. In another embodiment, the network device further includes a decision circuit 722 for determining if a criterion is met for implementation of the malware countermeasure. In a further embodiment, the network device may include a countermeasure engine 724 operable to generate the malware countermeasure.

In an embodiment, the decision circuit 722 further includes a decision circuit for determining if an authorization to implement the countermeasure has been received. In another embodiment, the decision circuit further includes a decision circuit for determining if a presence of the malware is indicated. In a further embodiment, the decision circuit further includes a decision circuit for determining if an indicium of the malware is present in at least one of the network device, and/or in a node of the at least on sub-network of a plurality of sub-networks.

Figure 12:
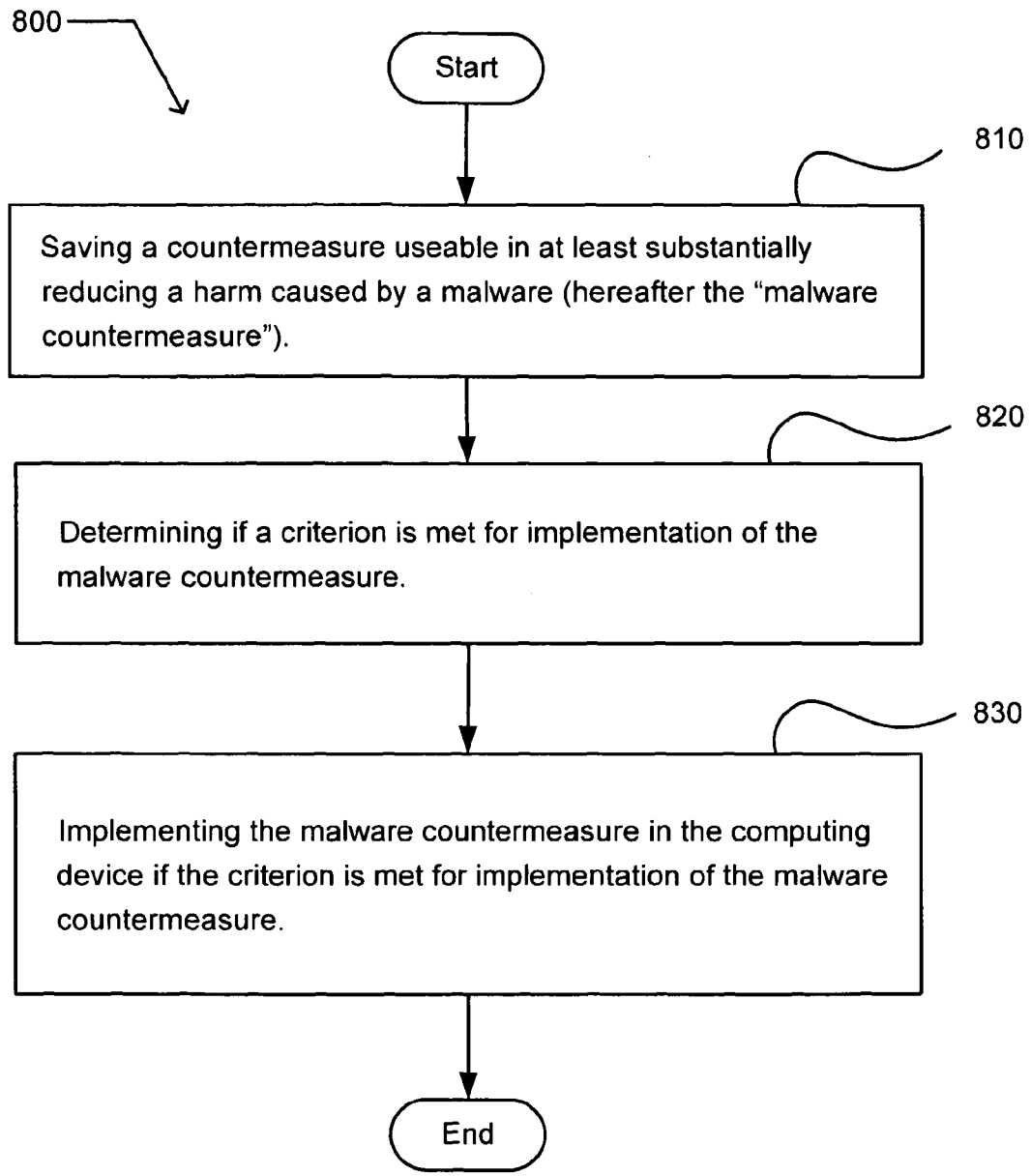
FIG. 12 illustrates an exemplary operational flow implemented in a computing device operable to facilitate communication of a packet to at least one sub-network of a plurality of sub-networks.

FIG. 12 illustrates an exemplary operational flow 800 implemented in a computing device operable to facilitate communication of a packet to at least one sub-network of a plurality of sub-networks. After a start operation, the operational flow moves to a storage operation 810. The storage operation saves a countermeasure useable in at least substantially reducing a harm caused by a malware (hereafter the "malware countermeasure"). A decision operation 820 determines if a criterion is met for implementation of the malware countermeasure. An effectuation operation 830 implements the malware countermeasure in the computing device if the criterion is met for implementation of the malware countermeasure.

Figure 13:
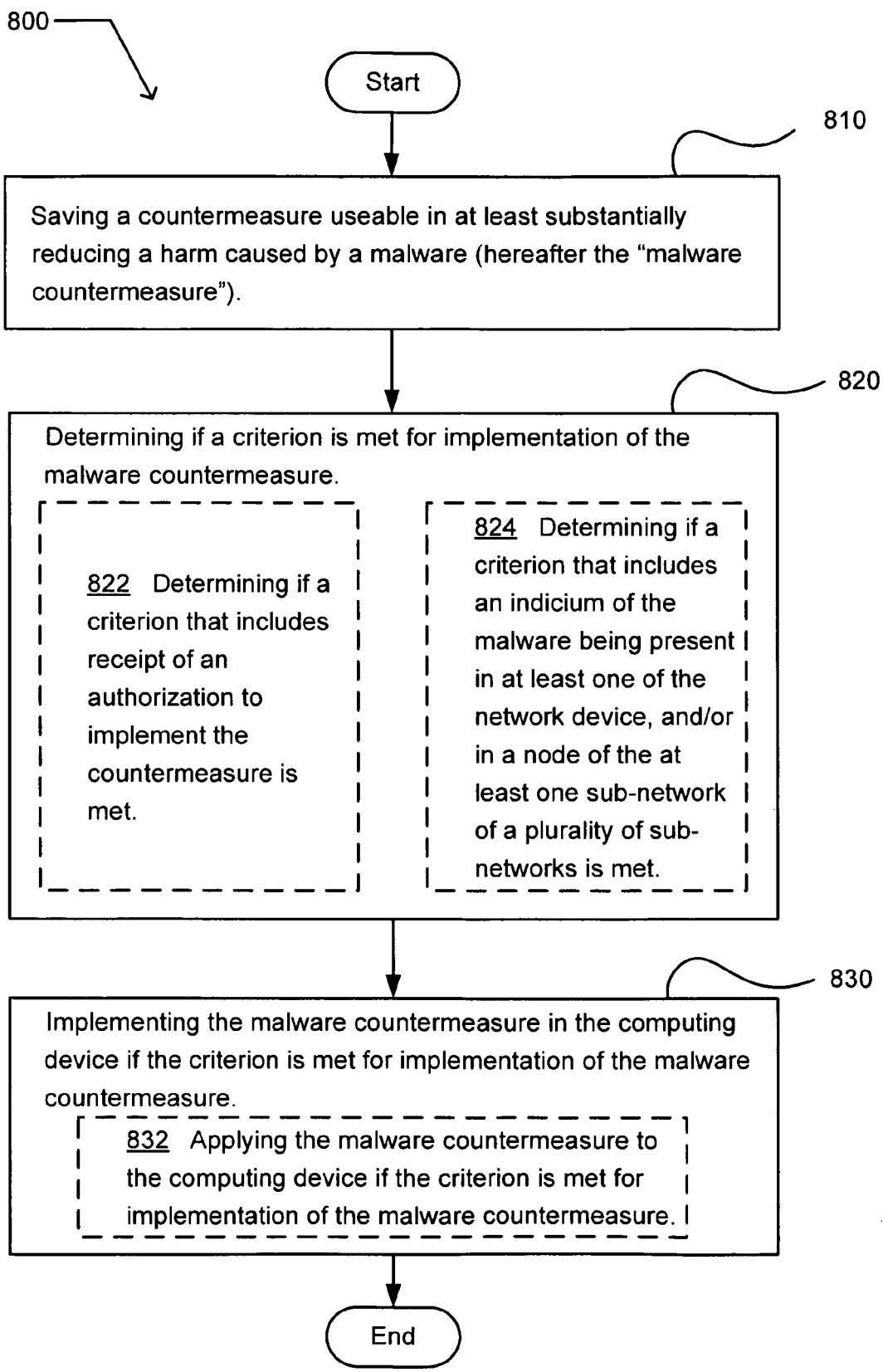
FIG. 13 illustrates an alternative embodiment of the operational flow of FIG. 12.

FIG. 13 illustrates an alternative embodiment of the operational flow 800 of FIG. 12. The decision operation 820 may include at least one additional operation. The at least one additional operation may include an operation 822, and/or an operation 824. The operation 822 determines if a criterion that includes receipt of an authorization to implement the countermeasure is met. The operation 824 determines if a criterion that includes an indicium of the malware being present in at least one of the network device, and/or in a node of the at least one sub-network of a plurality of sub-networks is met. The effectuation operation 830 may include at least one additional operation, such as an operation 832. The operation 832 applies the malware countermeasure to the computing device if the criterion is met for implementation of the malware countermeasure.

Figure 14:
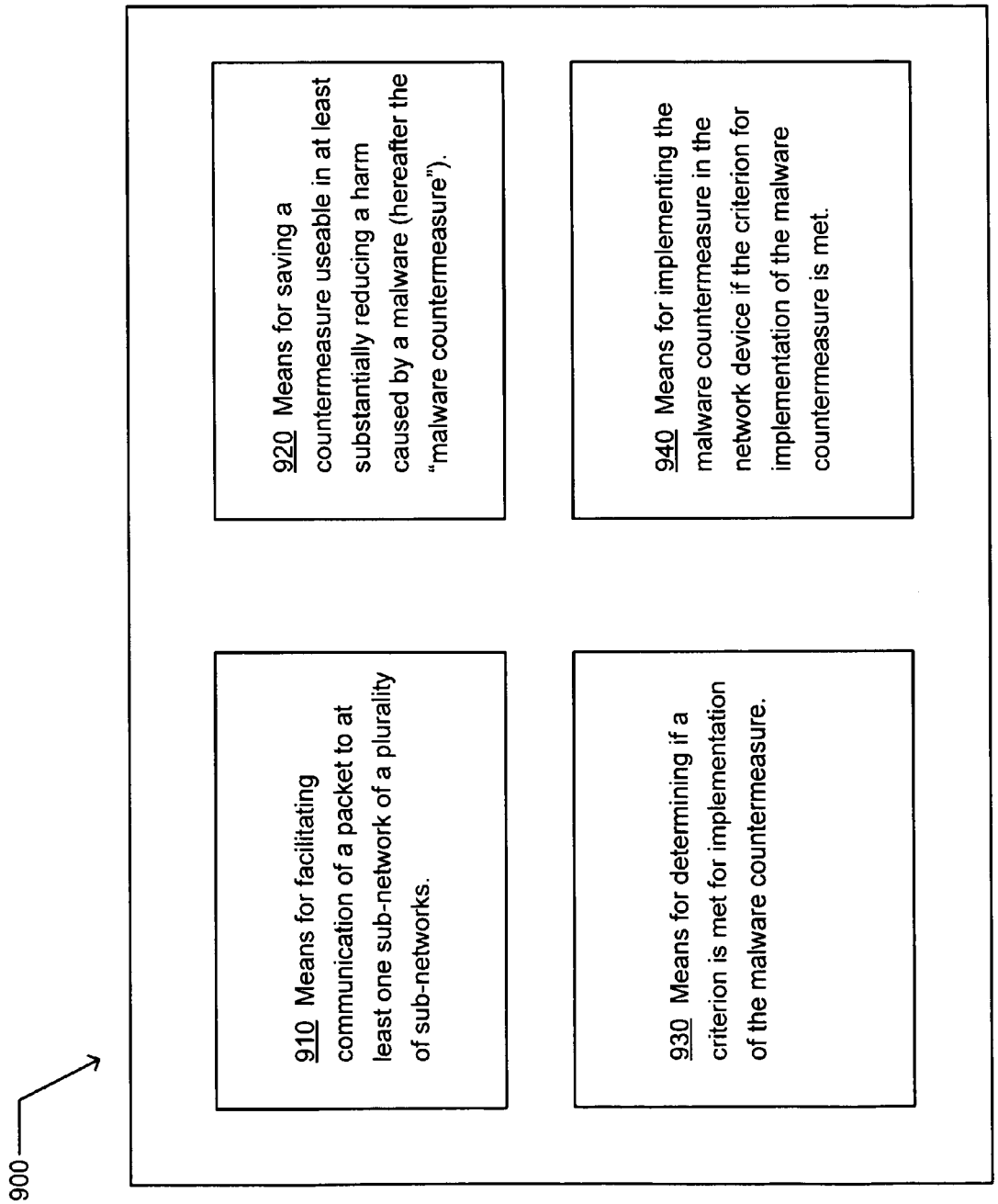
FIG. 14 illustrates an exemplary network device.

FIG. 14 illustrates an exemplary network device 900. The network device includes means 910 for facilitating communication of a packet to at least one sub-network of a plurality of sub-networks. The network device also includes means 920 for saving a countermeasure useable in at least substantially reducing a harm caused by a malware (hereafter the "malware countermeasure"). The network device further includes means 930 for determining if a criterion is met for implementation of the malware countermeasure. The network device also includes means 940 for implementing the malware countermeasure in the network device if the criterion for implementation of the malware countermeasure is met.

FIG. 15 illustrates an exemplary computer-program product 1000. The computer-program product includes program instructions 1010 operable to perform a process in a computing device. The process includes saving a countermeasure useable in at least substantially reducing a harm presented by a malware (hereafter the "malware countermeasure") to a networked device and/or a node of a network. The process also includes determining if a criterion for implementation of the malware countermeasure is met. The process further includes implementing the malware countermeasure in the computing device if the criterion is met for implementation of the malware countermeasure. The computer-program product also includes a computer-readable signal-bearing medium 1005 bearing the program instructions. In an embodiment, the computer-readable signal-bearing medium includes a computer storage medium 1022. In another embodiment, the computer-readable signal-bearing medium includes a communication medium 1024.

Figure 16:
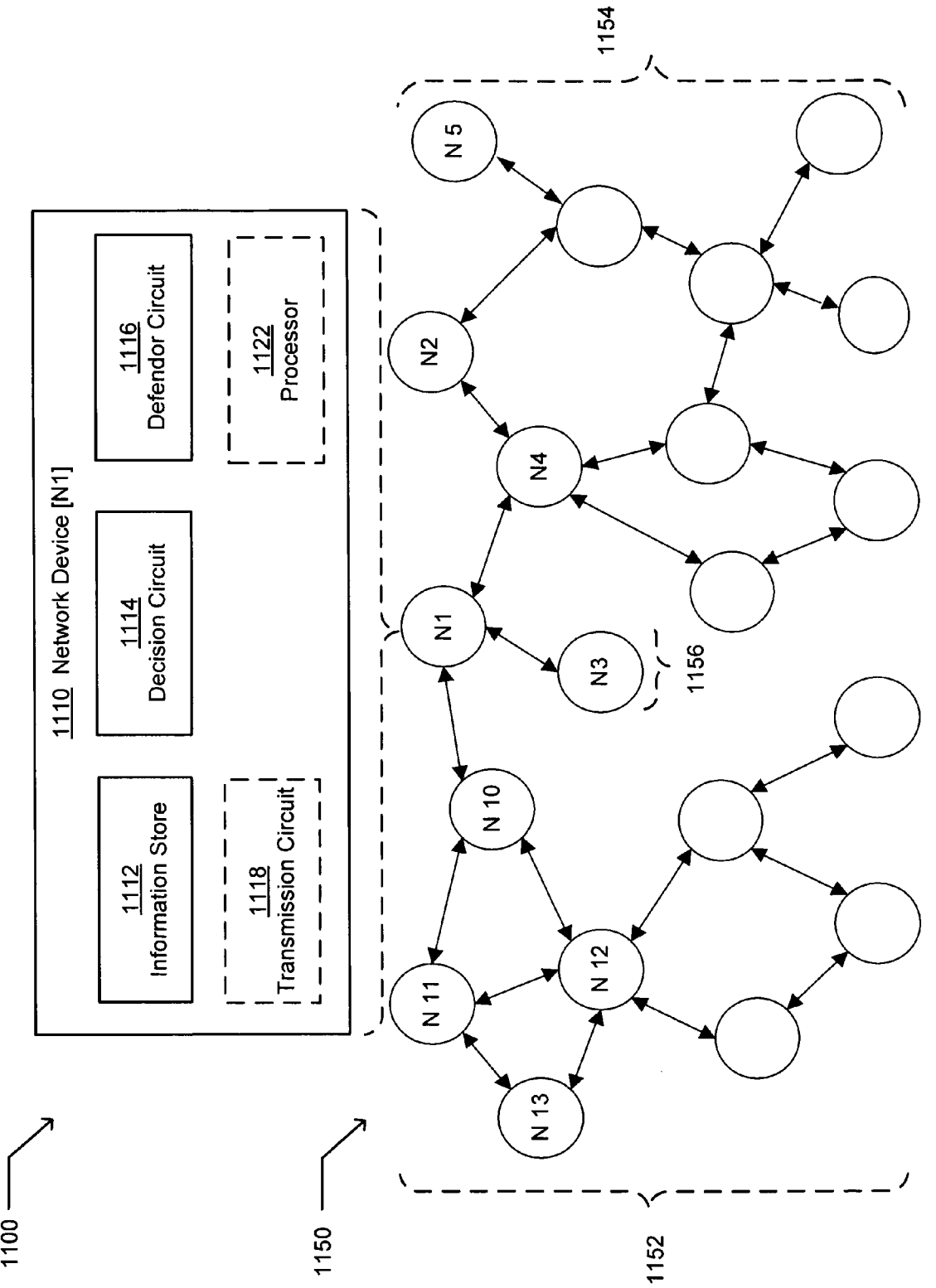
FIG. 16 illustrates an exemplary environment.

FIG. 16 illustrates an exemplary environment 1100. The exemplary environment includes a plurality of networked nodes 1150 that includes a node N1. The node N1 includes a network device, illustrated as a network device 1110 (N1). The plurality of networked nodes includes a plurality of sub-networks. The plurality of sub-networks are illustrated as a sub-network 1152 that includes nodes N10-N13, a sub-network 1154 that includes nodes N2-N5, and a sub-network 1156 that includes node N3. In another embodiment, at least one of the plurality of networked nodes includes a wired node. In another embodiment, at least one of the plurality of networked nodes includes a wireless node. In an embodiment, at least one of the plurality of nodes includes a node couplable with the Internet.

The network device 1110 includes an information store 1112, a decision circuit 1114, and a defender circuit 1116. The information store includes an information store configurable by a countermeasure useable in at least substantially reducing a harm caused by a malware (hereafter a "malware countermeasure"). The decision circuit includes a decision circuit for determining if a criterion for implementation of a malware countermeasure is met. The defender circuit includes a defender circuit for applying a malware countermeasure to the network device if the criterion for implementation of a malware countermeasure is met.

In an embodiment, the decision circuit 1114 further includes a decision circuit for determining if a criterion for implementation of a malware countermeasure is met and for selecting a malware countermeasure for application to the network device from among at least two malware countermeasures. In another embodiment, the defender circuit 1116 further includes a defender circuit for applying the selected malware countermeasure to the network device. In a further embodiment, the defender circuit further includes a defender circuit for applying a malware countermeasure to the network device and for generating the malware countermeasure.

In an embodiment, the defender circuit 1116 further includes a defender circuit for applying a malware countermeasure to the network device 1110. The application of the malware countermeasure includes at least one of: closing at least one port of the network device 1110; at least substantially isolating the network device from a network; at least substantially isolating at least one sub-network of the plurality sub-networks from the network device; at least substantially isolating at least one node of a sub-network of the plurality sub-networks from the network device; and/or at least substantially isolating a first sub-network of the plurality sub-networks from a second sub-network of the plurality sub-networks. In another embodiment, the defender circuit further includes a defender circuit for applying a malware countermeasure to the networked device. The application of the malware countermeasure includes at least one of: at least substantially isolating at least two sub-networks of the plurality sub-networks from another network; at least substantially isolating the network device from at least one network address of a sub-network of the plurality sub-networks; at least substantially reducing a functionally of the network device; at least substantially reducing a communication privilege allowed a node of one sub-network of the plurality of sub-networks; and/or sending a notice receivable by a device associatable with a person associated of the network device.

In an embodiment, the network device includes a transmission circuit 1118 for receiving a packet from a network and facilitate transmission of the packet to at least one sub-network of a plurality of sub-networks. In another embodiment, the network device includes a processor 1122.

Figure 17:
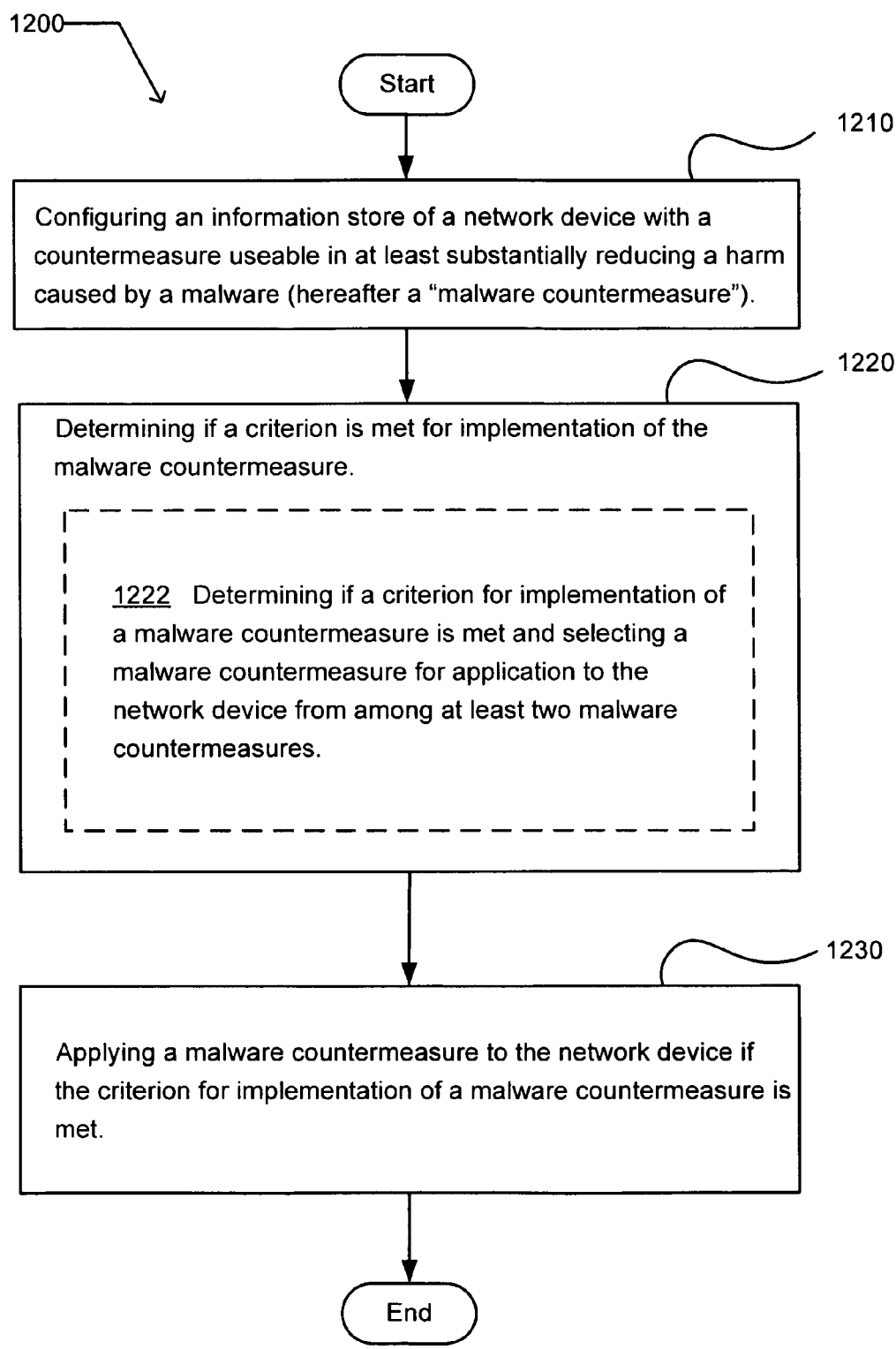
FIG. 17 illustrates an exemplary operational flow.

FIG. 17 illustrates an exemplary operational flow 1200. After a start operation, the operational flow includes a saving operation 1210. The saving operation configures an information store of a network device with a countermeasure useable in at least substantially reducing a harm caused by a malware (hereafter a "malware countermeasure"). A decision operation 1220 determines if a criterion for implementation of a malware countermeasure is met. A protection operation 1230 applies a malware countermeasure to the network device if the criterion for implementation of a malware countermeasure is met. The operational flow then moves to an end operation.

In an alternative embodiment, the decision operation 1220 may include at least one additional operation, such as an operation 1222. The operation 1222 determines if a criterion for implementation of a malware countermeasure is met, and selects a malware countermeasure for application to the network device from among at least two malware countermeasures.

Figure 18:
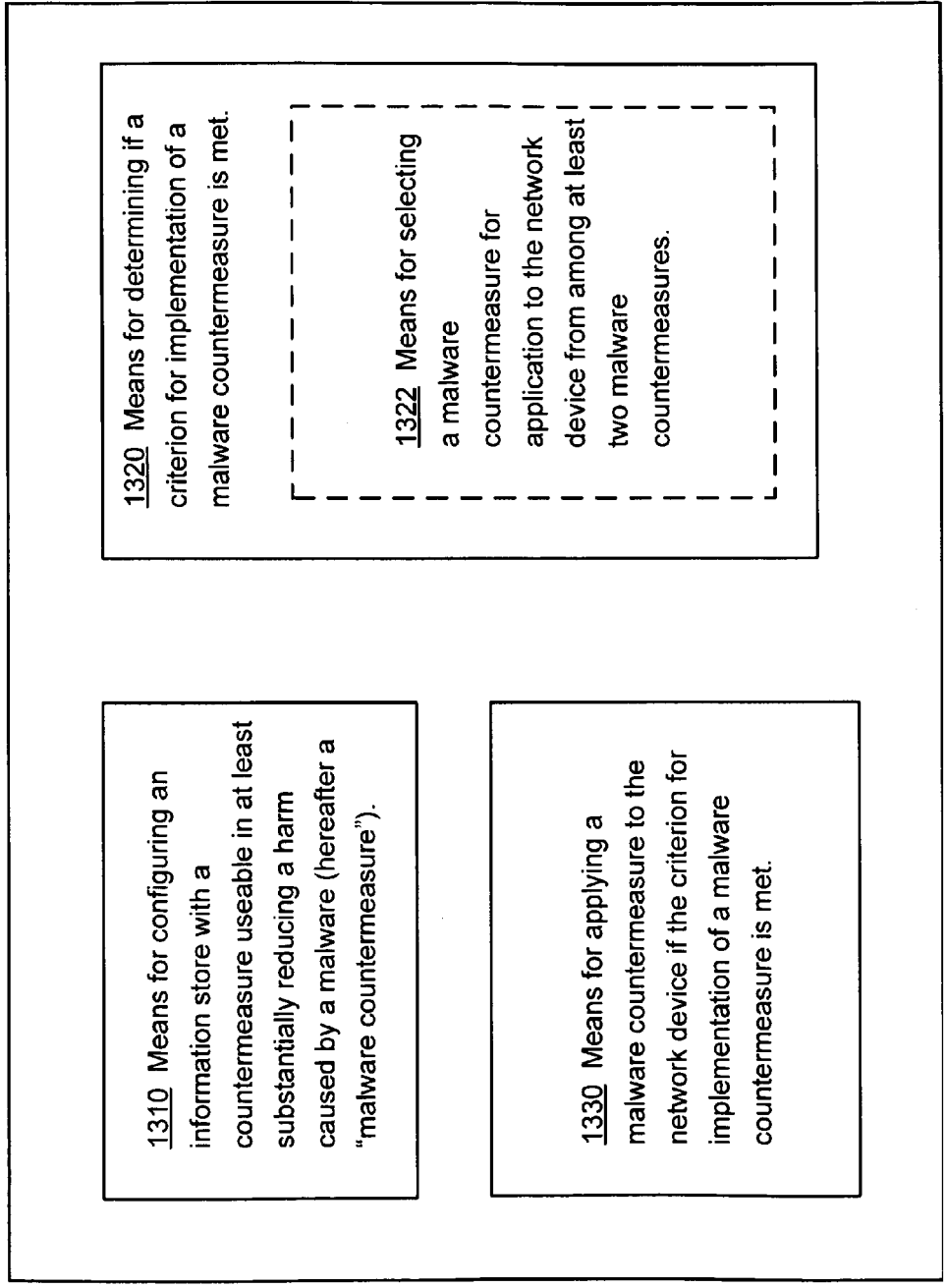
FIG. 18 illustrates an exemplary network device.

FIG. 18 illustrates an exemplary network device 1300. The network device includes means 1310 for configuring an information store with a countermeasure useable in at least substantially reducing a harm caused by a malware (hereafter a "malware countermeasure"). The network device further includes means 1320 for determining if a criterion for implementation of a malware countermeasure is met. The network device further includes means 1330 for applying a malware countermeasure to the network device if the criterion for implementation of a malware countermeasure is met. In an alternative embodiment, the means 1320 further includes a means 1322 for selecting a malware countermeasure for application to the network device from among at least two malware countermeasures.

Figure 19:
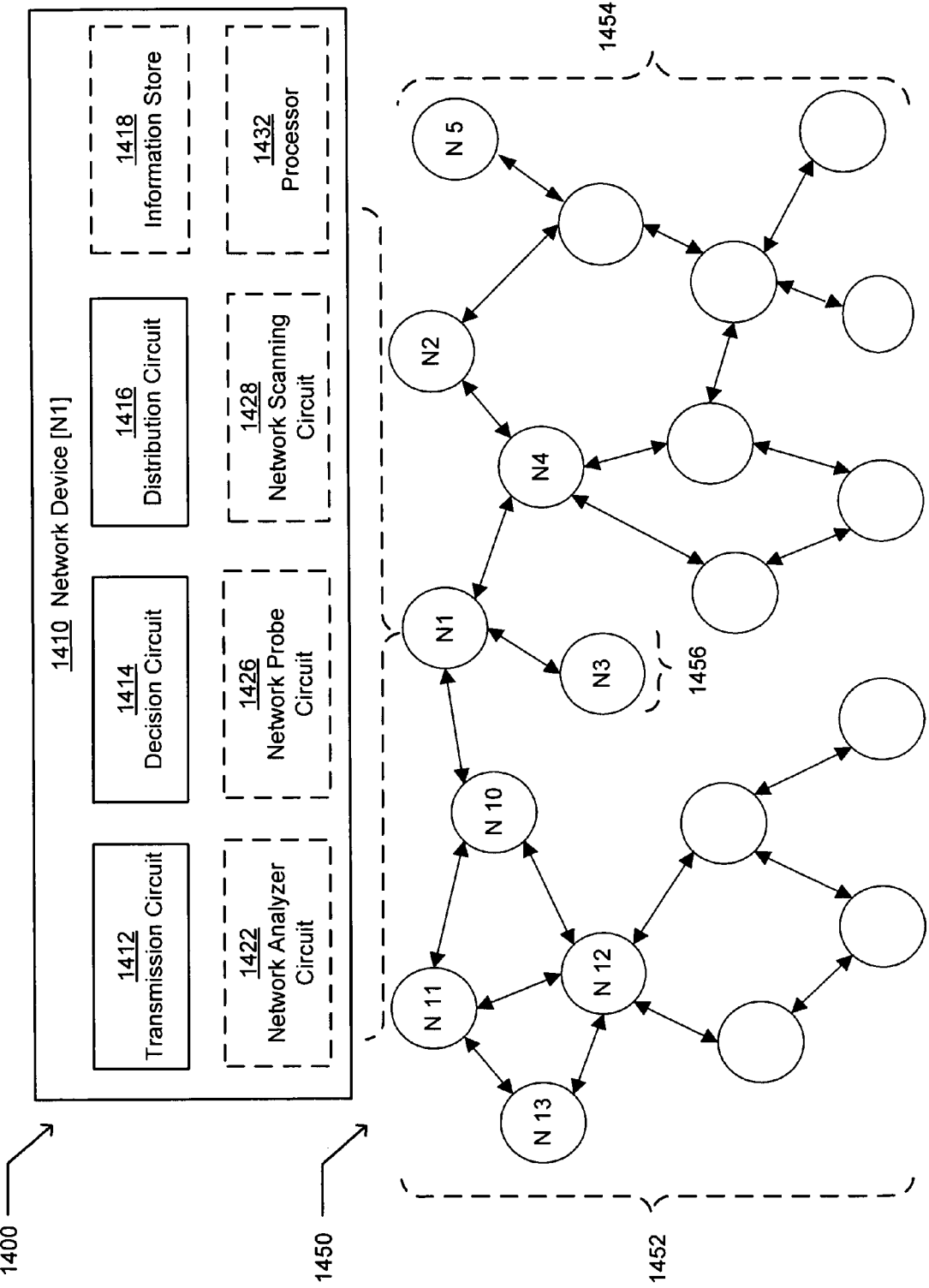
FIG. 19 illustrates an exemplary environment.

FIG. 19 illustrates an exemplary environment 1400. The environment includes a plurality of networked nodes 1450. The plurality of networked nodes includes: a first sub-network of the plurality network nodes, illustrated as a first sub-network 1452 that includes nodes N 10-N13; a second sub-network of the plurality of network nodes, illustrated as a second sub-network 1454 that includes nodes N2-N5; and a third sub-network of the plurality of networked nodes, illustrated as a third sub-network of the plurality of networked nodes 1456 that includes a node N3. In an embodiment, the plurality of sub-network nodes may be at least substantially similar to the plurality of networked nodes 250 of FIG. 2.

The exemplary environment 1400 also includes a network device 1410, illustrated as a node N1. In an embodiment, the network device may include a network appliance, a computing device, a desktop computing device, a laptop computing device, a mobile computing device, a host, a server, and/or a network card of a computing device. In another embodiment, the network device may include a switch, a bridge, a router, an edge router, a gateway, a hub, and/or a repeater. In an embodiment, a node of the plurality of networked nodes further includes a wired node, and/or a wireless node. In another embodiment, the network device includes a network device wirelessly couplable to a node the plurality of networked nodes. In a further embodiment, the network device includes a network device physically couplable to a node of the plurality of networked nodes. For example, a physically couplable device may include a device that is directly and/or indirectly coupable using an Ethernet cable, a fiber optic cable, and/or other connector that includes a physical communications media.

The network device 1410 includes a transmission circuit 1412, a decision circuit 1414, and a distribution circuit 1416. The transmission circuit includes a transmission circuit for communicating a packet to at least one node of a plurality of networked nodes. The decision circuit includes a decision circuit for determining if a criterion is met for distribution of a countermeasure to at least one node of the plurality of networked nodes, the countermeasure useable in at least substantially reducing a harm caused by malware (hereafter a "malware countermeasure"). The distribution circuit includes a distribution circuit for causing, in response to a determination that the criterion is met, a communication of the malware countermeasure using a distribution schema to a first set of nodes of the plurality of networked nodes.

In an embodiment, the transmission circuit 1412 further includes a transmission circuit for receiving and forwarding a packet to at least one node of a plurality of networked nodes 1450. In another embodiment, the transmission circuit further includes a dedicated transmission circuit for receiving and forwarding only the malware countermeasure to at least one node of a plurality of networked nodes. In a further embodiment, the transmission circuit further includes a transmission circuit for causing another device to communicate a packet to at least one node of a plurality of networked nodes. In another embodiment, the transmission circuit further includes a transmission circuit for directly causing the network device 1410 to communicate a packet to at least one node of a plurality of networked nodes.

In another embodiment, the transmission circuit 1412 further includes a transmission circuit for communicating a packet to at least one node of a plurality of networked nodes over a primary path. In another embodiment, the transmission circuit for communicating a packet to at least one node of a plurality of networked nodes over an alternative malware containment-coordination path. For example, the alternative malware containment-coordination path may include a bypass network. An example of a bypass network is described in U.S. patent application entitled MULTI-NETWORK VIRUS IMMUNIZATION, naming Edward K. Y. Jung; Royce A. Levien; Robert W. Lord; Mark A. Malamud; John D. Rinaldo, Jr.; and Lowell L. Wood, Jr. as inventors, U.S. application Ser. No. 11/413,969; filed Apr. 27, 2006. Another example of an alternative malware containment-coordination path may include a prioritized transmission pathway. An example of a prioritized transmission pathway is described in U.S. patent application entitled VIRUS IMMUNIZATION USING PRIORITIZED ROUTING, naming Edward K. Y. Jung; Royce A. Levien; Robert W. Lord; Mark A. Malamud; John D. Rinaldo, Jr.; and Lowell L. Wood, Jr. as inventors, U.S. application Ser. No. 11/474,523; filed Jun. 22, 2006.

In an embodiment, the decision circuit 1414 further includes a decision circuit for determining if a criterion is met for distribution of a malware countermeasure to at least one node of the plurality of networked nodes 1450 using a distribution schema. The criterion including a received instruction to distribute a malware countermeasure. For example, the received instruction to distribute a malware countermeasure may be received from another node of the plurality of networked nodes 1450, a node of another network (not shown), a dedicated server, and/or a commercial provider of antivirus services, such as McAfee, and/or Symantec. In another embodiment, the decision circuit further includes a decision circuit for determining if a criterion is met for distribution of a malware countermeasure to at least one node of the plurality of networked nodes using a distribution schema, the criterion including an indicium of malware present in at least one of the network device 1410, and/or in a node of the plurality of networked nodes. In a further embodiment, the decision circuit further includes a decision circuit for determining if a criterion is met for distribution of a malware countermeasure to at least one node of the plurality of networked nodes using a distribution schema, and for selecting the distribution schema. For example, the distribution schema may be selected in response to a node selection strategy and the indicium of an activity. In another embodiment, the decision circuit further includes a decision circuit for determining if a criterion is met for distribution of a malware countermeasure to at least one node of the plurality of networked nodes using a distribution schema, and for selecting a malware countermeasure from at least two malware countermeasures to be communicated to a first set of nodes of the plurality of networked nodes.

In an embodiment, the distribution circuit 1416 further includes a distribution circuit for causing in response to a determination that the criterion is met a communication of the malware countermeasure to a first set of nodes of the plurality of networked nodes 1450 using a hit list. A hit list may include IP addresses of a number of potentially vulnerable nodes of the plurality of networked nodes 1450, and/or computers. In another embodiment, the distribution circuit further includes a distribution circuit for causing, in response to a determination that the criterion is met, a communication of the malware countermeasure to a first set of nodes of the plurality of networked nodes using a hit list generated at least partially by a scanning technique. For example, a first set of nodes may include the first set of nodes 1452 of the plurality of networked nodes. In a further example, the distribution circuit further includes a distribution circuit for causing, in response to a determination that the criterion is met, a communication of the malware countermeasure to a first set of nodes of the plurality of networked nodes using a hit list based at least partially on a topology map of the plurality of networked nodes. For example, the topology map may be locally generated by the network device 1410, and/or may be received from another source.

In an embodiment, the distribution circuit 1416 further includes a distribution circuit for causing, in response to a determination that the criterion is met, a communication of the malware countermeasure to a first set of nodes of the plurality of networked nodes 1450 using a list generated at least partially in response to listening to the plurality of networked nodes. In another embodiment, the distribution circuit further includes a distribution circuit for causing, in response to a determination that the criterion is met, a communication of the malware countermeasure to a first set of nodes of the plurality of networked nodes using a quick-division hit list technique. For example, the distribution circuit may first communicate the malware countermeasure and a hit list to node N10. The node N10 then begins communicating the malware countermeasure to one-half of the nodes on the hit list and the distribution circuit continues communicating the malware countermeasure to the other-half of the nodes on the hit list. In a further example, the distribution circuit further includes a distribution circuit for causing, in response to a determination that the criterion is met, a communication of the malware countermeasure to a first set of nodes of the plurality of networked nodes using a received hit list.

In an embodiment, the distribution circuit 1416 further includes a distribution circuit for causing, in response to a determination that the criterion is met, a communication of the malware countermeasure to a first set of nodes of the plurality of networked nodes 1450 using a locally generated hit list. For example, the locally generated hit list may include a hit list generated by a network analyzer circuit 1422 by at least one of a listening, a scanning, a permutation scanning, a probing IP addresses and/or ports of host machines, and/or a surveying a topology of the plurality of network nodes. In another embodiment, the distribution circuit further includes a distribution circuit for causing, in response to a determination that the criterion is met, a communication of the malware countermeasure to a first set of nodes of the plurality of networked nodes using a hit list selected from at least two hit lists. In a further embodiment, the distribution circuit further includes distribution circuit for causing, in response to a determination that the criterion is met, a communication of the malware countermeasure to a first set of nodes of the plurality of networked nodes using a hit list. The hit list being based upon at least one of an assessment of at least one node of the plurality of networked nodes, a significance of at least one node of the plurality of networked nodes, a criticality of at least one node of the plurality of networked nodes, and/or a high bandwidth capacity of at least one node of the plurality of networked node.

In an embodiment, the distribution circuit 1416 further includes a distribution circuit for causing, in response to a determination that the criterion is met, a communication of the malware countermeasure using a distribution schema to a first set of nodes of the plurality of networked nodes 1450. The distribution schema corresponding to a list generated by a permutation scanning technique, and/or a partitioned permutation scan technique. In another embodiment, the distribution circuit further includes a distribution circuit for causing, in response to a determination that the criterion is met, a communication of the malware countermeasure using a distribution schema to a first set of nodes of the plurality of networked nodes. The distribution schema corresponding to a list generated at least partially in response to a permutation scanning technique and another scanning technique. In a further embodiment, the distribution circuit further includes a distribution circuit for causing, in response to a determination that the criterion is met, a communication of the malware countermeasure using a distribution schema to a first set of nodes of the plurality of networked nodes. The first set of nodes of the plurality of networked nodes being selected in response to a node selection strategy. For example, a node selection strategy may include selecting ten most active nodes. By way of further example, the node selection strategy may include selecting ten highest bandwidth capacity nodes. The first set of nodes may include only one node, or may include two or more nodes. In another embodiment, the distribution circuit further includes a distribution circuit for causing, in response to a determination that the criterion is met, a communication of the malware countermeasure to a first set of nodes of the plurality of networked nodes, and then for causing a communication of the malware countermeasure to a second set of nodes of the plurality of networked nodes. In further embodiment, the malware countermeasure includes an antivirus patch, a patch, a defense, a quarantine of at least one node of the plurality of networked nodes, a quarantine of at least one sub-network of the plurality of networked nodes, a containment measure, a blocking of a port of a host at a node of the plurality of networked nodes, a transmitting a notification receivable by a device associatable with a human.

In an embodiment, the network device 1410 further includes an information store 1418 operable to save at least two malware countermeasures. In another embodiment, the network device further includes the network analyzer circuit 1422 for respectively monitoring at least two nodes of the plurality of networked nodes 1450. In a further embodiment, the network analyzer circuit further includes a network analyzer circuit for at least one of learning, mapping, scanning, protocol analyzing, and/or probing at least two respective nodes of the plurality of networked nodes. In another embodiment, the network analyzer circuit further includes a network analyzer circuit for respectively monitoring at least two nodes of the plurality of networked nodes for an indicium of an activity. In a further embodiment, the network analyzer circuit further includes a network analyzer circuit for respectively monitoring at least two nodes of the plurality of networked nodes and for generating a node hit list based upon the monitoring. The node hit list may include a tiered hit list generated in response to a criterion.

In an embodiment, the network device 1410 further includes a network probe circuit 1426 for collecting information corresponding to at least one of a network address, a protocol, a host characteristic, a connection, an interface, and/or an activity respectfully associated with at least one node of the plurality of network nodes 1450. In another embodiment, the network device further includes a network scanning circuit 1428 for testing at least two network addresses, and/or a port of a node of the plurality of network nodes.

In an embodiment, "criterion" may include a single standard, reference, and/or rule on which a decision or judgment can be based. In another embodiment, "criterion" may include two or more standards, references, and/or rules in a combination on which a decision or judgment can be based.

In use, an embodiment of the network device 1410 includes an active network device operable to receive and forward a packet to at least one node of the networked nodes 1450. The network device may have stored at least one malware countermeasure in the information store 1418. The at least one malware countermeasure may have been locally generated by the network device, or may have been received from another device. The decision circuit 1414 determines if a criterion is met for distribution of a malware countermeasure to at least one node of the plurality of networked nodes. A criterion may include an instruction received from another device to distribute a malware countermeasure. For example, the instruction may simply be to distribute an identified malware countermeasure. By way of further example, the criterion may include a received data indicating that a Code Red II infection is spreading across the Internet, and the network device selects an appropriate Code Red II countermeasure from its storage. Another criterion may include the network device determining that packets received by it or transported through it include an indicium of a malware content. If the criterion is met, the distribution circuit goes into action and causes the malware countermeasure to be communicated to a first set of nodes of the plurality of networked nodes using a distribution schema. The first set of nodes may include the highest bandwidth nodes selected in response to a distribution schema that includes a rule that responds to worm attacks by distributing to high bandwidth nodes first. The countermeasure may be communicated from the network device, or the distribution circuit may initiate communication of the countermeasure from another network device.

Figure 20:
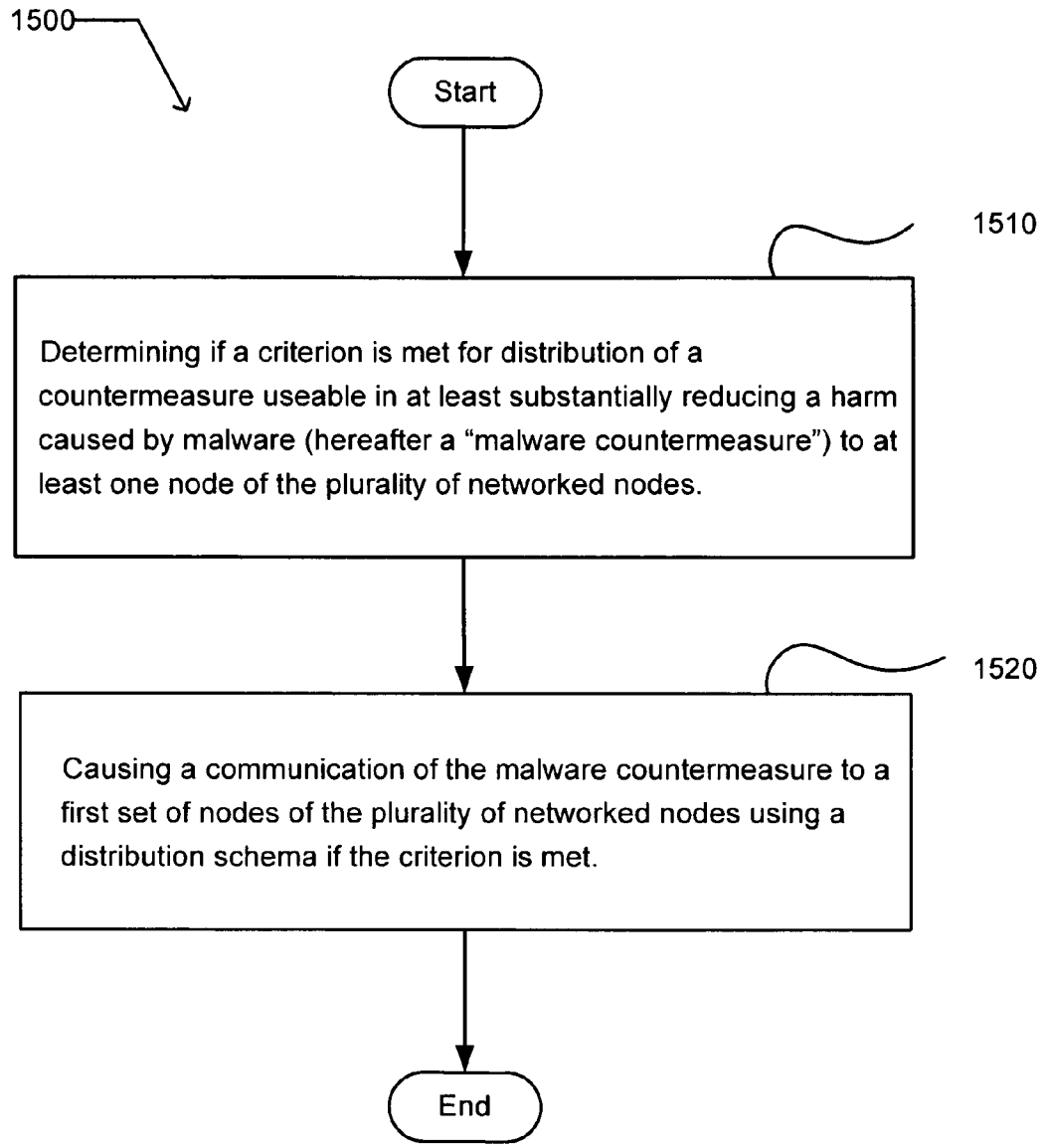
FIG. 20 illustrates an exemplary operational flow implemented in a computing device operable to facilitate communication of a packet to at least one node of a plurality of networked nodes.

FIG. 20 illustrates an exemplary operational flow 1500 implemented in a computing device operable to facilitate communication of a packet to at least one node of a plurality of networked nodes. After a start operation, the flow moves to a resolution operation 1510. The resolution operation determines if a criterion is met for distribution of a countermeasure useable in at least substantially reducing a harm caused by malware (hereafter a "malware countermeasure") to at least one node of the plurality of networked nodes. A dissemination operation 1520 causes a communication of the malware countermeasure to a first set of nodes of the plurality of networked nodes using a distribution schema if the criterion is met. The operational flow then moves to an end operation.

Figure 21:
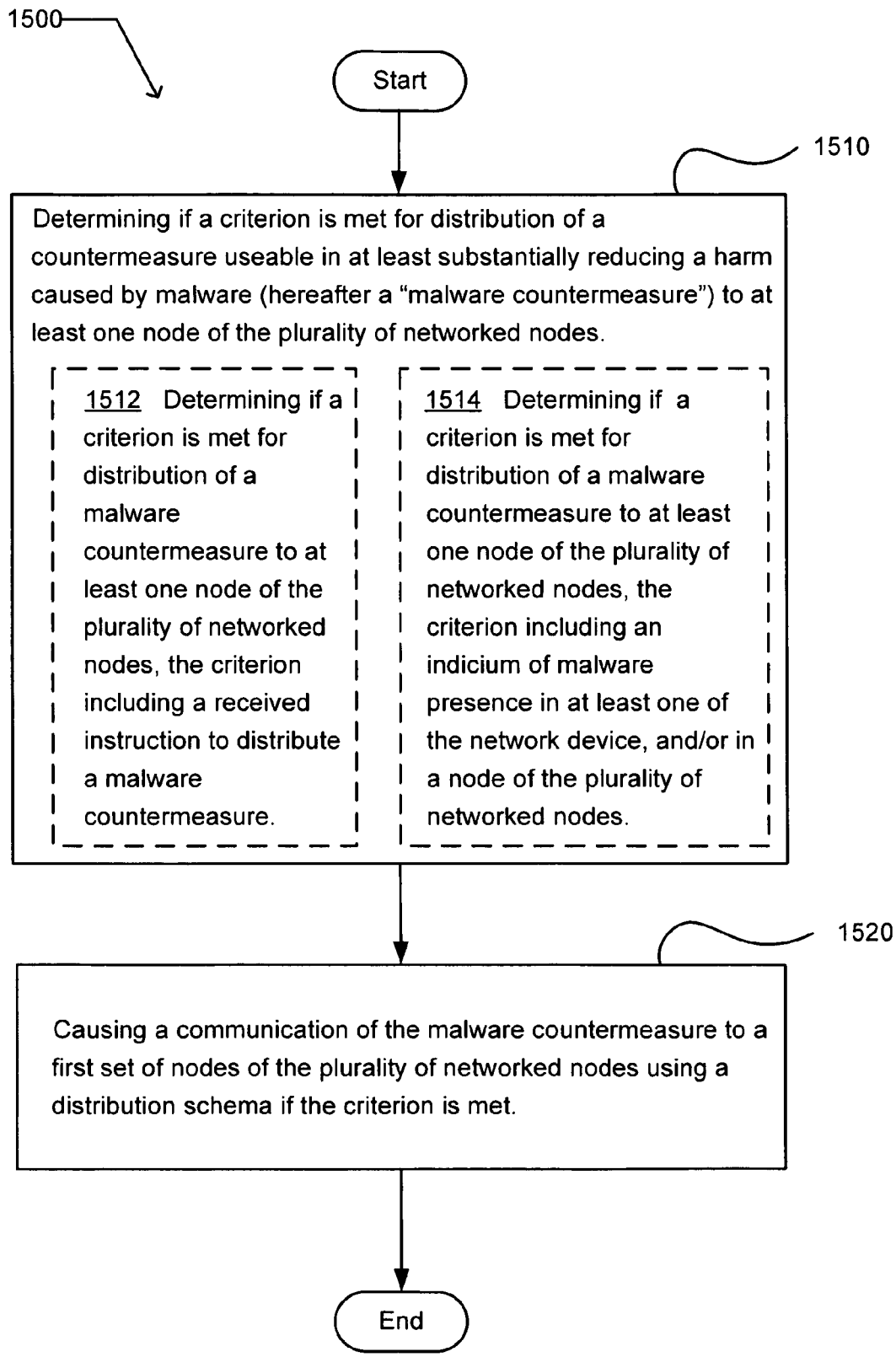
FIG. 21 illustrates an alternative embodiment of the exemplary operational flow of FIG. 20.

FIG. 21 illustrates an alternative embodiment of the exemplary operational flow 1500 of FIG. 20. The resolution operation 1510 may contain at least one additional operation. The at least one additional operation may include an operation 1512, and/or an operation 1514. The operation 1512 determines if a criterion is met for distribution of a malware countermeasure to at least one node of the plurality of networked nodes. The criterion includes a received instruction to distribute a malware countermeasure. The operation 1514 determines if a criterion is met for distribution of a malware countermeasure to at least one node of the plurality of networked nodes. The criterion includes an indicium of malware presence in at least one of the network device, and/or in a node of the plurality of networked nodes.

Figure 22:
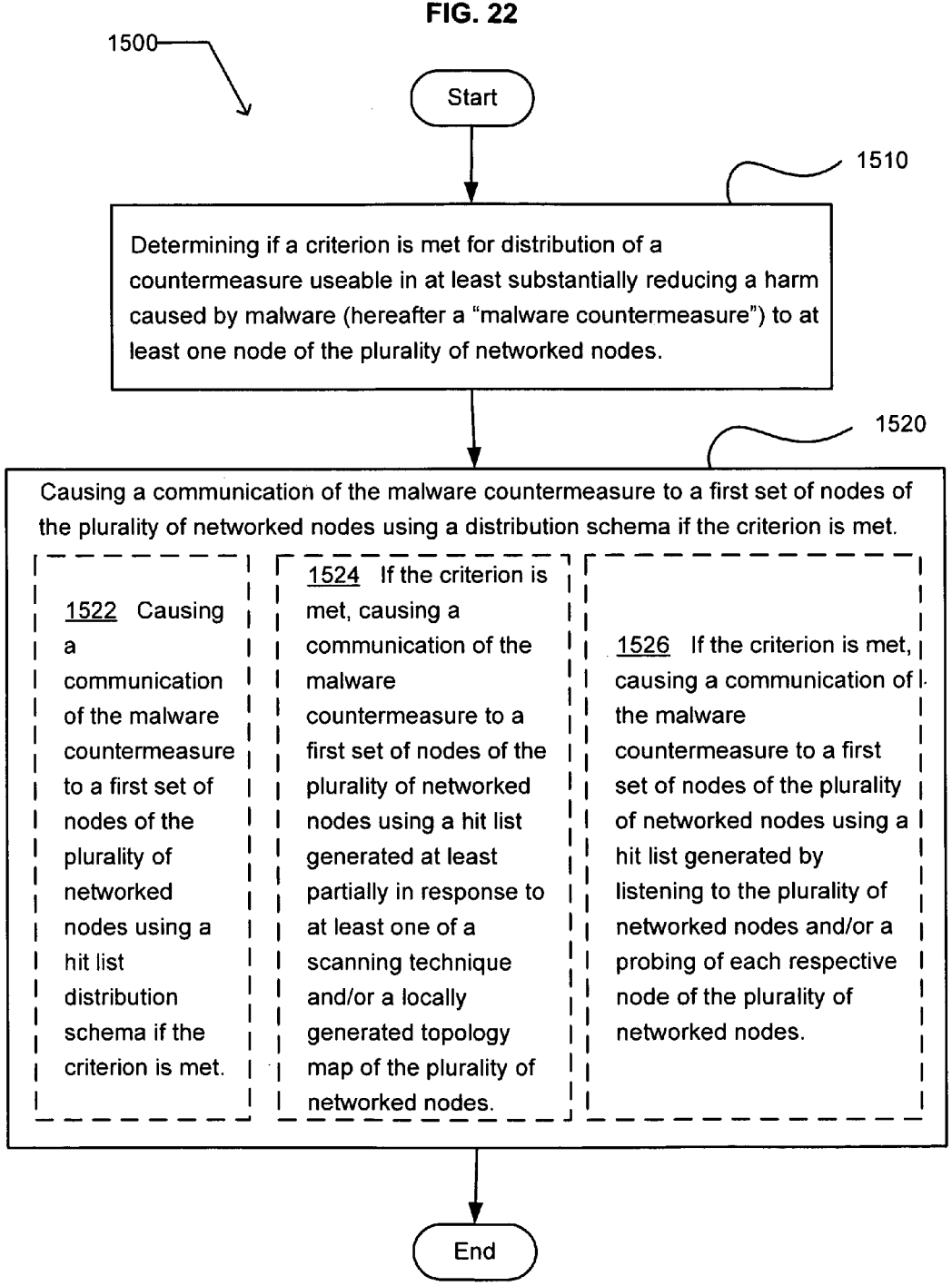
FIG. 22 illustrates another alternative embodiment of the exemplary operational flow of FIG. 20.

FIG. 22 illustrates another alternative embodiment of the exemplary operational flow 1500 of FIG. 20. The dissemination operation 1520 may contain at least one additional operation. The at least one additional operation may include an operation 1522, an operation 1524, and/or an operation 1526. The operation 1522 causes a communication of the malware countermeasure to a first set of nodes of the plurality of networked nodes using a hit list distribution schema if the criterion is met. The operation 1524 causes if the criterion is met a communication of the malware countermeasure to a first set of nodes of the plurality of networked nodes using a hit list. The hit list is generated at least partially in response to at least one of a scanning technique and/or a locally generated topology map of the plurality of networked nodes. The operation 1526 causes if the criterion is met a communication of the malware countermeasure to a first set of nodes of the plurality of networked nodes using a hit list. The hit list is generated at least partially by listening to the plurality of networked nodes and/or a probing of each respective node of the plurality of networked nodes.

Figure 23:
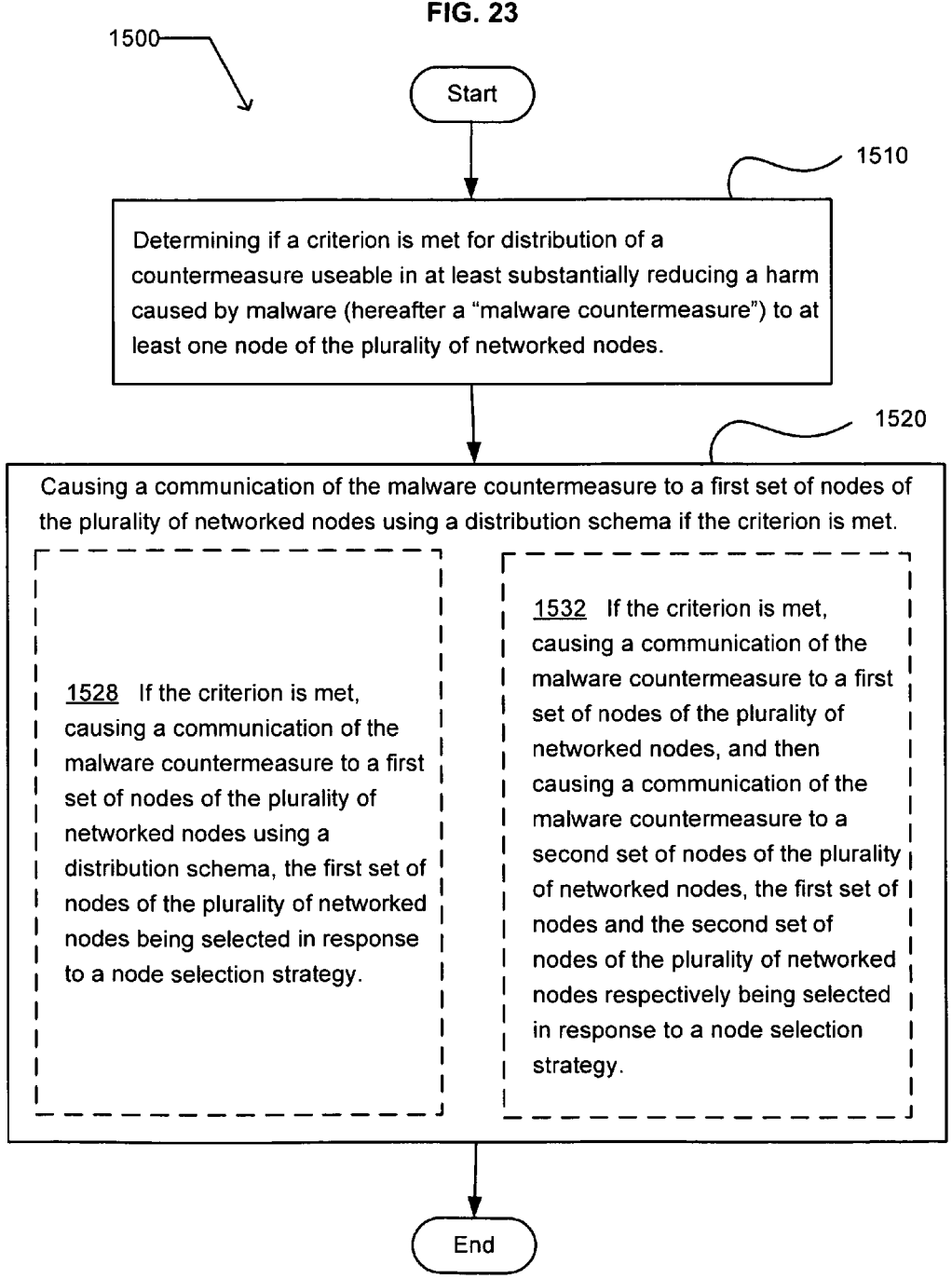
FIG. 23 illustrates a further alternative embodiment of the exemplary operational flow of FIG. 20.

FIG. 23 illustrates a further alternative embodiment of the exemplary operational flow 1500 of FIG. 20. The dissemination operation 1520 may contain at least one additional operation. The at least one additional operation may include an operation 1528 and/or an operation 1532. The operation 1528 causes if the criterion is met a communication of the malware countermeasure to a first set of nodes of the plurality of networked nodes using a distribution schema. The first set of nodes of the plurality of networked nodes being selected in response to a node selection strategy. The operation 1532 causes if the criterion is met a communication of the malware countermeasure to a first set of nodes of the plurality of networked nodes, and then causes a communication of the malware countermeasure to a second set of nodes of the plurality of networked nodes. The first set of nodes and the second set of nodes of the plurality of networked nodes respectively being selected in response to a node selection strategy.

FIG. 24 illustrates another alternative embodiment of the exemplary operational flow 1500 of FIG. 20. The dissemination operation 1520 may contain at least one additional operation. The at least one additional operation may include an operation 1534, and/or an operation 1536. The operation 1534 selects a distribution schema and causes a communication of the malware countermeasure to a first set of nodes of the plurality of networked nodes using the selected distribution schema if the criterion is met. The operation 1536 selects a malware countermeasure from at least two malware countermeasures and causes a communication of the selected malware countermeasure to a first set of nodes of the plurality of networked nodes using a distribution schema if the criterion is met.

FIG. 25 illustrates a further alternative embodiment of the exemplary operational flow 1500 of FIG. 20. The operational flow may include at least one additional operation 1550. The at least one additional operation 1550 may include an operation 1552, an operation 1554, and/or an operation 1556. The operation 1552 saves the malware countermeasure in an information store coupled with the computing device. The operation 1554 collects information corresponding to at least one of a network address, a protocol, a host characteristic, a connection, an interface, and/or an activity respectfully associated with at least one node of the plurality of network nodes. The operation 1556 tests at least two network addresses, and/or at least two ports of a node of the plurality of network nodes for an indicium of an activity.

FIG. 26 illustrates an exemplary embodiment of a network device 1600. The network device includes means 1610 for determining if a criterion is met for distribution of a countermeasure useable in at least substantially reducing a harm caused by malware (hereafter a "malware countermeasure") to at least one node of a plurality of networked nodes. The network device also includes means 1620 for causing a communication of the malware countermeasure to a first set of nodes of the plurality of networked nodes using a distribution schema if the criterion is met.

In an alternative embodiment, the network device 1600 includes means 1630 for saving the malware countermeasure in an information store coupled with the network device. In another alternative embodiment, the network device includes means 1640 for collecting information corresponding to at least one of a network address, a protocol, a host characteristic, a connection, an interface, and/or an activity respectfully associated with at least one node of the plurality of network nodes. In a further embodiment, the network device includes means 1650 for testing at least two network addresses, and/or at least two ports of a node of the plurality of network nodes for an indicium of an activity.

FIG. 27 illustrates an exemplary computer-program product 1700. The computer-program product includes a computer-readable signal-bearing medium 1705 bearing program instructions 1710. The program instructions are operable to perform a process in a computing device. The process includes determining if a criterion is met for distribution of a countermeasure useable in at least substantially reducing a harm caused by malware (hereafter a "malware countermeasure") to at least one node of a plurality of networked nodes. The process also includes causing a communication of the malware countermeasure to a first set of nodes of the plurality of networked nodes using a distribution schema if the criterion is met.

In an embodiment, the process of the program instruction 1710 further includes saving the malware countermeasure in an information store 1712. In another embodiment, the process of the program instruction further includes collecting information corresponding to at least one of a network address, a protocol, a host characteristic, a connection, an interface, and/or an activity respectfully associated with at least one node of the plurality of network nodes 1714. In a further embodiment, the process of the program instruction further includes testing at least two network addresses, and/or at least two ports of a node of the plurality of network nodes, for an indicium of an activity 1716.

In another embodiment, the computer-readable signal-bearing medium 1705 includes a computer storage medium 1732. In a further embodiment, the computer-readable signal-bearing medium includes a communication medium 1734.

Figure 28:
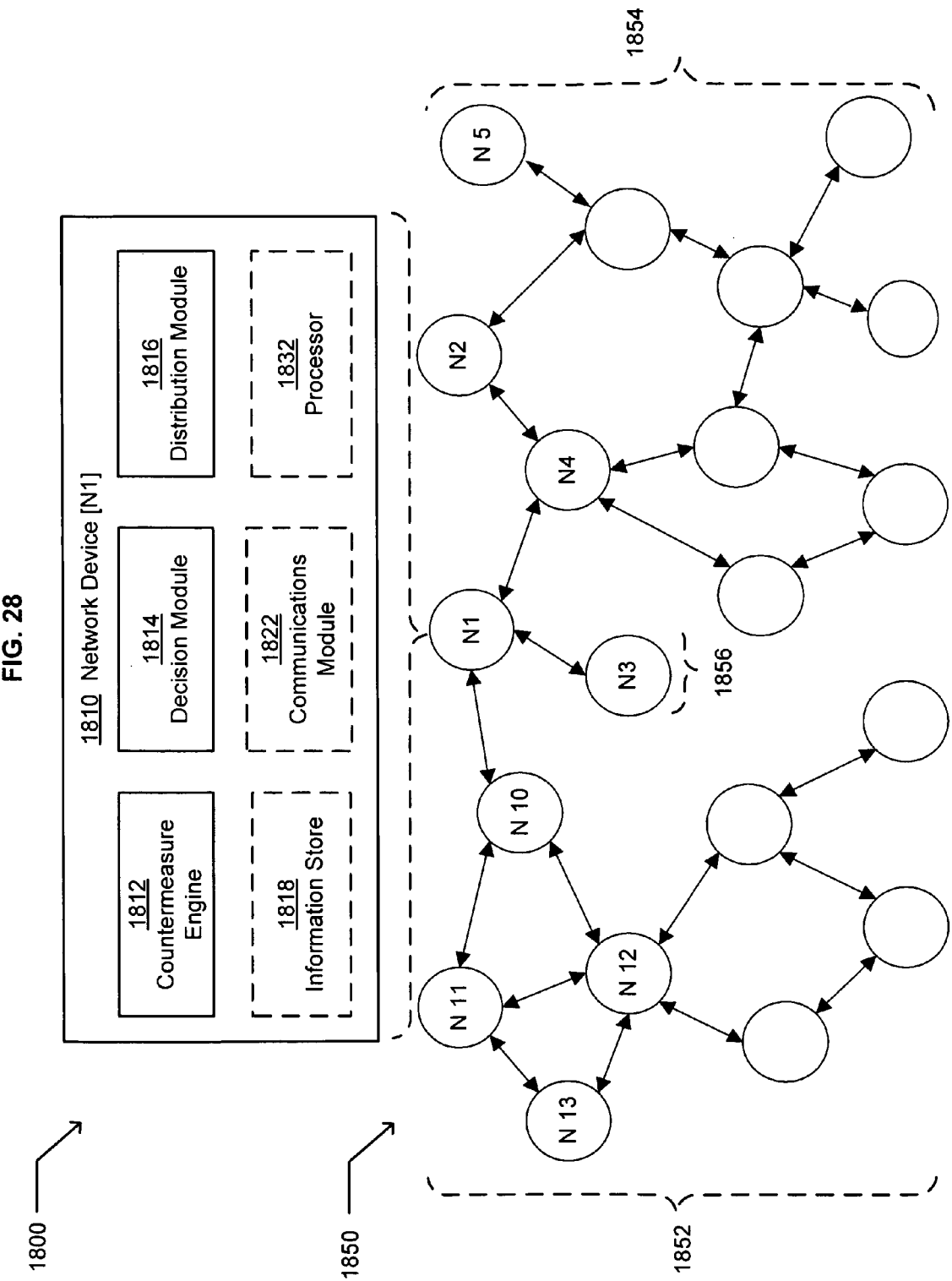
FIG. 28 illustrates an exemplary environment.

FIG. 28 illustrates an exemplary environment 1800. The environment includes a plurality of networked nodes, illustrated as a plurality of networked nodes 1850. The plurality of network nodes includes a first sub-network of the plurality network nodes, illustrated as a first sub-network 1852 that includes nodes N10-N13, and a second sub-network of the plurality of network nodes, illustrated as a second sub-network 1854 that includes nodes N2-N5. The plurality of network nodes also includes a third sub-network of the plurality of networked nodes, illustrated as a third sub-network of the plurality of networked nodes 1856 that includes a node N3. In an embodiment, the plurality of networked nodes 1850 may be at least substantially similar to the plurality of networked nodes 250 of FIG. 2.

The exemplary environment 1800 also includes a network device 1810, illustrated as a node N1. In an embodiment, the network device may include a network appliance, a computing device, a desktop computing device, a laptop computing device, a mobile computing device, a host, a server, and/or a network card of a computing device. In another embodiment, the network device may include a switch, a bridge, a router, an edge router, a gateway, a hub, and/or a repeater. In an embodiment, a node of the plurality of networked nodes further includes a wired node, and/or a wireless node. In another embodiment, the network device includes a network device wirelessly couplable to a node the plurality of networked nodes. In a further embodiment, the network device includes a network device physically couplable to a node of the plurality of networked nodes. For example, a physically couplable may include directly and/or indirectly couplable using an Ethernet cable, a fiber optic cable, and/or other connector that includes a physical communications media.

The network device includes a countermeasure engine 1812, a decision module 1814, and a distribution module 1816. The countermeasure engine includes a countermeasure engine operable to generate a countermeasure useable in at least substantially reducing a harm caused by a malware (hereafter "malware countermeasure"). The decision module includes a decision module operable to determine if a criterion is met for distribution of the generated malware countermeasure to a plurality of networked nodes. The distribution module includes a distribution module operable to transmit the generated malware countermeasure to a first set of nodes of the plurality of networked nodes if the criterion is met.

In an embodiment, the countermeasure engine 1812 further includes a countermeasure engine operable to generate a malware countermeasure in response to indicium of a malware presence. In another embodiment, the countermeasure engine further includes a countermeasure engine operable to detect an indication of a malware presence in at least one of the network device, and/or in a node of the plurality of networked nodes. The countermeasure engine is also operable to generate a malware countermeasure in response to the indicium of a malware presence. In a further embodiment, the countermeasure engine further includes a countermeasure engine operable to detect a signature of and/or anomaly corresponding to a malware presence in at least one of the network device, and/or in a node of the plurality networked nodes. The countermeasure engine is also operable to generate a malware countermeasure in response to the detected signature of and/or anomaly corresponding to a malware presence.

In an embodiment, the countermeasure engine 1812 further includes a countermeasure engine operable to identify a malware having a presence in at least one of the network device and/or in a node of the plurality of networked nodes. The countermeasure engine is also operable to generate a malware countermeasure in response to the identified malware. In a another embodiment, the countermeasure engine further includes a countermeasure engine operable to identify a signature and/or anomaly of a malware having a presence in at least one of the network device and/or in a node of the plurality of networked nodes. The countermeasure engine is also operable to generate a malware countermeasure in response to the identified malware. In a further embodiment, the countermeasure further includes a countermeasure engine operable to generate a malware countermeasure in response to a signature characteristic of a malware having an indicated presence in at least one of the network device, and/or in a node of the plurality of networked nodes.

In an embodiment, the countermeasure engine 1812 further includes countermeasure engine operable to generate a malware countermeasure in response to an anomaly aspect of a malware having an indicated presence in at least one of the network device, and/or in a node of the plurality of networked nodes. In another embodiment, the countermeasure engine further includes a countermeasure engine operable to generate a malware countermeasure that includes at least one of: closing at least one port of a node of the plurality of networked nodes; at least substantially isolating a node of the plurality of networked nodes from a remaining plurality of the networked nodes; at least substantially isolating at least one sub-network of nodes from the remaining plurality of networked nodes; and/or at least substantially isolating a first sub-network of the plurality network nodes from a second sub-network of the plurality network nodes. In a further embodiment, the countermeasure engine further includes a countermeasure engine operable to generate a malware countermeasure that includes at least one of: at least substantially reducing a functionally of a node of the plurality of networked nodes; at least substantially reducing a communication privilege allowed a host coupled with a node of the plurality of networked nodes; and/or sending a notice receivable by a device associatable with a person associated with a node of the plurality of networked nodes.

In an embodiment, the decision module 1814 further includes a decision module operable to determine if a criterion is met for distribution of the generated malware countermeasure to the plurality of networked nodes. The criterion includes an indicium of malware present in at least one of the network device, and/or in a node of the plurality of networked nodes. In another embodiment, the decision module further includes a decision module operable to select a generated malware countermeasure for distribution from among at least two generated malware countermeasures. The decision module is also operable to determine if a criterion is met for distribution of the selected generated malware countermeasure to the plurality of networked nodes. In a further embodiment, the distribution module further includes a distribution module operable to transmit the generated malware countermeasure to a first set of nodes of the plurality of networked nodes using a distribution schema if the criterion is met.

In an embodiment, a node of a plurality of networked nodes 1850 further includes at least one of another network device, a network appliance, a computing device, a desktop computing device, a laptop computing device, a mobile computing device, a host, a server, and/or a network card of a computing device. In another embodiment, a node of a plurality of networked nodes further includes at least one of a switch, a bridge, a router, an edge router, a gateway, a hub, and/or a repeater.

In an embodiment, the network device 1810 further includes an information store 1818 operable to save at least one generated malware countermeasure. In another embodiment, the network device further includes a communication module 1822 operable to cause transmission of a packet to at least one node of the plurality of networked nodes. In a further embodiment, the network device further includes a processor 1832.

In use, an example embodiment of the network device 1810 includes a countermeasure engine 1812 operable to generate a malware countermeasure useable in at least substantially reducing a harm caused by a malware. The countermeasure engine may be implemented in software, hardware, and/or firmware. For example, in an embodiment, the countermeasure engine may include a module operable to recognize a signature of a malware, and/or operable to recognize a behavior of a node, and/or a network, indicative of a malware being present. By way of further example, the countermeasure engine may detect or receive data indicating a buffer overflow occurrence and/or a crash at a node, such as the node N2 of the plurality of networked nodes 1850. In an embodiment, the countermeasure may be generated on an ad hoc basis in response to an indication of a malware presence. In another embodiment, the countermeasure may be generated by selecting a countermeasure from a library available to the countermeasure engine, or by combining several available countermeasures. In a further example, the countermeasure engine may be unable to discern a likely cause of a crash of a node of the plurality of nodes, and in response generates a countermeasure that temporarily isolates a node, such as the node N2, from the remaining nodes of the plurality of networked nodes.

The above in-use example embodiment of the network device 1810 further includes a decision module 1814 operable to determine if a criterion is met for distribution of the generated malware countermeasure to a plurality of networked nodes. The decision module may be implemented in software, hardware, and/or firmware. For example, the criterion may be met by the decision module receiving data from a third party indicating that a worm attack is occurring across the Internet. By way of further example, the criterion may be met by the decision module detecting an indication of a malware presence in at least one node of the plurality of networked nodes 1850. In another example, the decision module may draw on the same data or indicators as the countermeasure engine 1812, but require a level of malware activity and/or presence before the criterion is met for distribution. For example, while the countermeasure engine may generate a countermeasure in response to a single indication of a malware activity, and the criterion may not be met until indications of malware activity are found in at least two nodes of the plurality of networked nodes. Thus, while the countermeasure engine may generate a countermeasure in response to an indication of the Code Red II worm in one node, the criterion of the decision module may not be met until an indication of the Code Red II worm is present in two nodes.

Once the criterion is met for distribution of the generated malware countermeasure, the distribution module 1816 transmits or causes to be transmitted the generated malware countermeasure. The distribution module may transmit the generated malware countermeasure directly to a first set of nodes of the plurality of nodes 1850, or may use services of the communications module 1822 to transmit the generated malware countermeasure. The first set of nodes may be selected in any manner, including a distribution schema described above.

Figure 29:
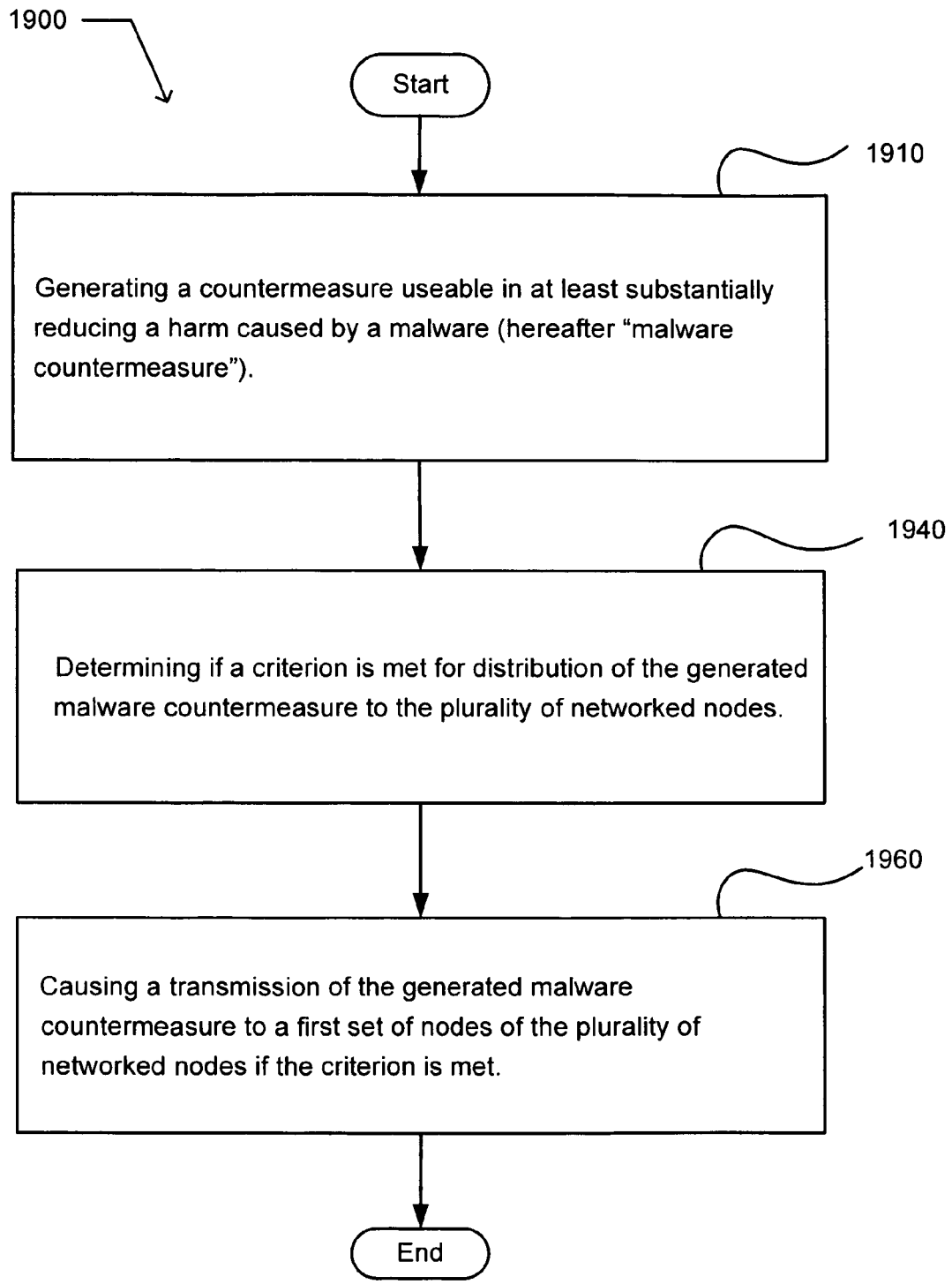
FIG. 29 illustrates an exemplary operational flow implemented in a computing device operable to facilitate communication of a packet to at least one node of a plurality networked nodes.

FIG. 29 illustrates an exemplary operational flow 1900 implemented in a computing device operable to facilitate communication of a packet to at least one node of a plurality networked nodes. After a start operation, the operational flow moves to a creation operation 1910. The creation operation generates a countermeasure useable in at least substantially reducing a harm caused by a malware (hereafter "malware countermeasure"). A decision operation 1940 determines if a criterion is met for distribution of the generated malware countermeasure to the plurality of networked nodes. A dissemination operation 1960 causes a transmission of the generated malware countermeasure to a first set of nodes of the plurality of networked nodes if the criterion is met. The operational flow then moves to an end operation.

FIG. 30 illustrates an alternative embodiment of the operational flow 1900 of FIG. 29. The creation operation 1910 may include at least one additional operation. The at least one additional operation may include an operation 1912, an operation 1914, and/or an operation 1916. The operation 1912 generates a malware countermeasure in response to indicium of a malware presence. The operation 1914 detects an indication of a malware presence in at least one of the network device, and/or in a node of the plurality of networked nodes, and generates a malware countermeasure in response to the indicated malware. The operation 1916 detects a signature and/or an anomaly corresponding to a malware presence in at least one of the network device, and/or in a node of the plurality networked nodes, and generates a malware countermeasure in response to the detected signature and/or anomaly.

FIG. 31 illustrates an alternative embodiment of the operational flow 1900 of FIG. 29. The creation operation 1910 may include at least one additional operation. The at least one additional operation may include an operation 1918, an operation 1922, and/or an operation 1924. The operation 1918 identifies a malware having a presence in at least one of the network device and/or in a node of the plurality of networked nodes, and generates a malware countermeasure in response to the identified malware. The operation 1922 identifies a signature and/or anomaly indicative of a malware having a presence in at least one of the network device and/or in a node of the plurality of networked nodes, and generates a malware countermeasure in response to the identified malware. The operation 1924 generates a malware countermeasure in response to a signature characteristic of a malware having an indicated presence in at least one of the network device, and/or in a node of the plurality of networked nodes.

FIG. 32 illustrates another alternative embodiment of the operational flow 1900 of FIG. 29. The creation operation 1910 may include at least one additional operation. The at least one additional operation may include an operation 1926, and/or an operation 1928. The operation 1926 generates a malware countermeasure in response to an anomaly aspect of a malware having an indicated presence in at least one of the network device, and/or in a node of the plurality of networked nodes. The operation 1928 generates a malware countermeasure that includes at least one of: closing at least one port of a node of the plurality of networked nodes; at least substantially isolating a node of the plurality of networked nodes from a remaining plurality of the networked nodes; at least substantially isolating at least one sub-network of nodes from a remaining plurality of networked nodes; and/or at least substantially isolating a first sub-network of the plurality network nodes from a second sub-network of the plurality network nodes.

FIG. 33 illustrates a further alternative embodiment of the operational flow 1900 of FIG. 29. The creation operation 1910 may include at least one additional operation. The at least one additional operation may include an operation 1932. The operation 1932 generates a malware countermeasure that includes at least one of: at least substantially reducing a functionally of a node of the plurality of networked nodes; at least substantially reducing a communication privilege allowed a node of the plurality of networked nodes; and/or sending a notice receivable by a device associatable with a person associated with a node of the plurality of networked nodes.

FIG. 34 illustrates another alternative embodiment of the operational flow 1900 of FIG. 29. The decision operation 1940 may include at least one additional operation. The at least one additional operation may include an operation 1942, an operation 1944, and/or an operation 1946. The operation 1942 determines if a criterion is met for distribution of the generated malware countermeasure to the plurality of networked nodes. The criterion includes an indicium of malware present in at least one of the network device, and/or in a node of the plurality of networked nodes. The operation 1944 determines if a criterion is met for distribution of a selected generated malware countermeasure to the plurality of networked nodes and selects the generated malware countermeasure for distribution from among at least two generated malware countermeasures. The operation 1946 transmits the generated malware countermeasure to a first set of nodes of the plurality of networked nodes using a distribution schema if the criterion is met.

In an embodiment, the node of a plurality of networked nodes further includes another network device, a network appliance, a computing device, a desktop computing device, a laptop computing device, a mobile computing device, a host, a server, and/or a network card of a computing device. In another embodiment, the node of a plurality of networked nodes further includes a switch, a bridge, a router, an edge router, a gateway, a hub, and/or a repeater.

FIG. 35 illustrates a further alternative embodiment of the operational flow 1900 of FIG. 29. The operational flow 1900 may include an at least one additional operation 1970. The at least one additional operation 1970 may include an operation 1972, and/or an operation 1974. The operation 1972 saves at least one generated malware countermeasure to an information store. The operation 1974 causes a transmission of a packet to at least one node of the plurality of networked nodes.

Figure 36:
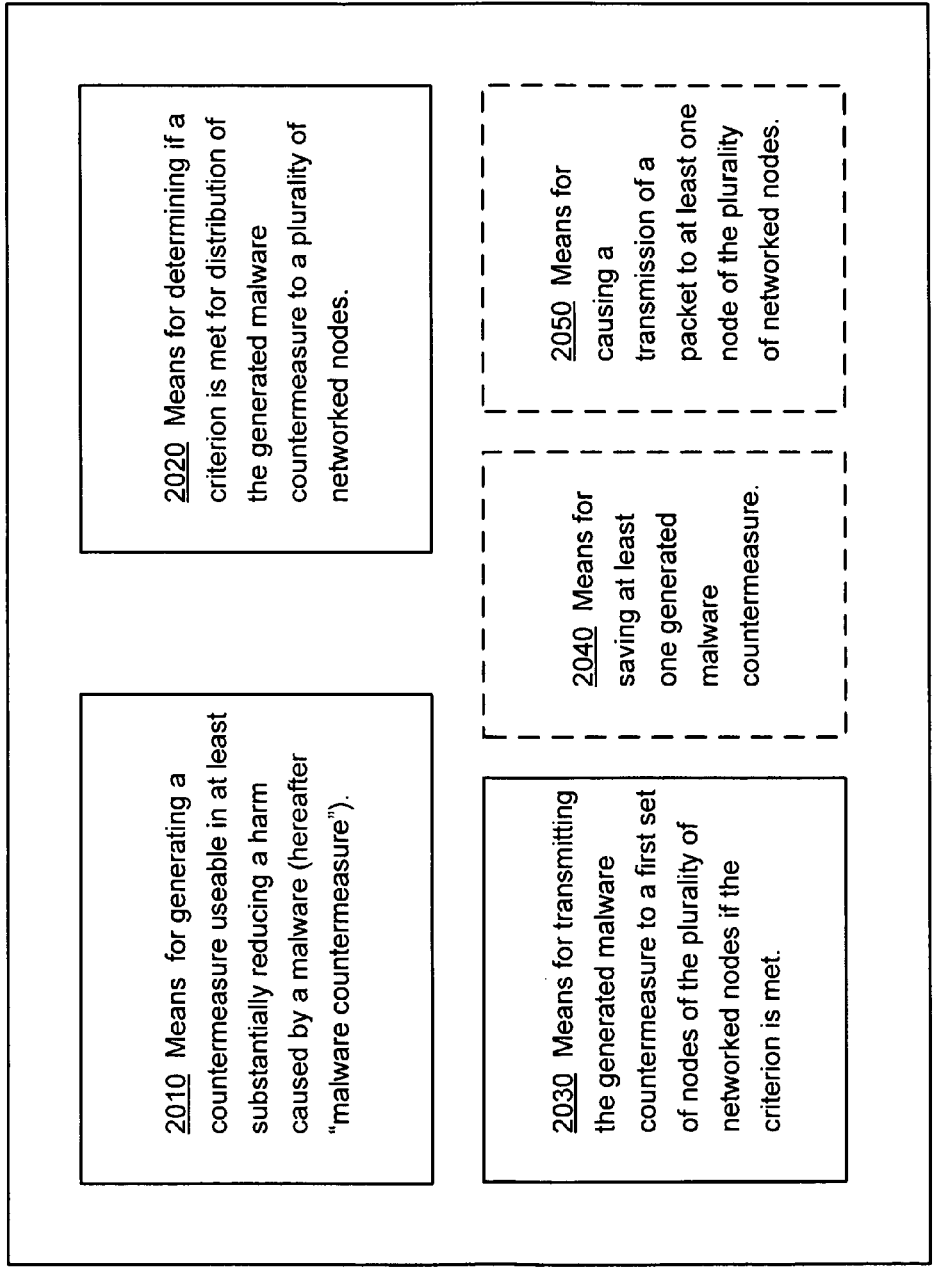
FIG. 36 illustrates an exemplary network device.

FIG. 36 illustrates an exemplary network device 2000. The network device includes means 2010 for generating a countermeasure useable in at least substantially reducing a harm caused by a malware (hereafter "malware countermeasure"). The network device also includes means 2020 for determining if a criterion is met for distribution of the generated malware countermeasure to a plurality of networked nodes. The network device further includes means 2030 for transmitting the generated malware countermeasure to a first set of nodes of the plurality of networked nodes if the criterion is met.

In an alternative embodiment, the network device 2000 includes means 2040 for saving at least one generated malware countermeasure. In another alternative embodiment, the network device includes means 2050 for causing a transmission of a packet to at least one node of the plurality of networked nodes.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In addition, those skilled in the art will appreciate that the mechanisms of the subject matter described herein are capable of being distributed as a program product in a variety of forms, and that an illustrative embodiment of the subject matter described herein applies equally regardless of the particular type of signal-bearing media used to actually carry out the distribution. Examples of a signal-bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.).

The herein described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality. Any two components capable of being so associated can also be viewed as being "operably couplable" to each other to achieve the desired functionality. Specific examples of operably couplable include but are not limited to physically mateable and/or physically interacting components and/or wirelessly interactable and/or wirelessly interacting components.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A network device comprising:
 a memory coupled to a processor;
 a processor-executable countermeasure engine operable to generate a plurality of countermeasures useable in at least substantially reducing a harm caused by a malware (hereafter "malware countermeasure"), the malware countermeasures generated responsive to an indication of the malware being present on a node of a plurality of networked nodes;
 a processor-executable decision module operable to select a generated malware countermeasure for distribution from among at least two of the generated malware countermeasures and to determine if a criterion for distribution of the selected generated malware countermeasure to the plurality of networked nodes is met, the criterion for distribution of the selected generated malware countermeasure is independent of the indication of the malware being present on the node of the plurality of networked nodes; and
 a processor-executable distribution module operable to transmit the selected generated malware countermeasure to a first set of nodes of the plurality of networked nodes if the criterion is met.

2. The network device of claim 1, wherein the countermeasure engine operable to generate a plurality of malware countermeasures further includes:
 a countermeasure engine operable to detect an indication of a malware presence in at least one of the network device, and/or in a node of the plurality networked nodes, and to generate the plurality of malware countermeasures in response to the indicium of a malware presence.

3. The network device of claim 1, wherein the countermeasure engine operable to generate a plurality of malware countermeasures further includes:
 a countermeasure engine operable to detect a signature of and/or anomaly corresponding to a malware presence in at least one of the network device, and/or in a node of the plurality of networked nodes, and to generate the plurality of malware countermeasures in response to the detected signature of and/or anomaly.

4. The network device of claim 1, wherein the countermeasure engine operable to generate a plurality of malware countermeasures further includes:
 a countermeasure engine operable to identify a malware having a presence in at least one of the network device and/or in a node of the plurality of networked nodes, and to generate the plurality of malware countermeasures in response to the identified malware.

5. The network device of claim 1, wherein the countermeasure engine operable to generate a plurality of malware countermeasures further includes:
 a countermeasure engine operable to identify a signature and/or anomaly of a malware having a presence in at least one of the network device and/or in a node of the plurality of networked nodes, and to generate the plurality of malware countermeasures in response to the identified malware.

6. The network device of claim 1, wherein the countermeasure engine operable to generate a plurality of malware countermeasures further includes:
 a countermeasure engine operable to generate the plurality of malware countermeasures in response to a signature characteristic of a malware having an indicated presence in at least one of the network device, and/or in a node of the plurality of networked nodes.

7. The network device of claim 1, wherein the countermeasure engine operable to generate a plurality of malware countermeasures further includes:
 a countermeasure engine operable to generate the plurality of malware countermeasures in response to an anomaly aspect of a malware having an indicated presence in at least one of the network device, and/or in a node of the plurality of networked nodes.

8. The network device of claim 1, wherein the countermeasure engine operable to generate a plurality of malware countermeasures further includes:
 a countermeasure engine operable to generate the plurality of malware countermeasures that includes at least one of:
 closing at least one port of the node of the plurality of networked nodes;
 at least substantially isolating the node of the plurality of networked nodes from a remaining plurality of the networked nodes;
 at least substantially isolating at least one sub-network of nodes of the plurality of networked nodes from the remaining plurality of the networked nodes; and/or at least substantially isolating a first sub-network of the plurality of networked nodes from a second sub-network of the plurality of networked nodes.

9. The network device of claim 1, wherein the countermeasure engine operable to generate a plurality of malware countermeasures further includes:
a countermeasure engine operable to generate the plurality of malware countermeasures that includes at least one of:
at least substantially reducing a functionality of the node of the plurality of networked nodes;
at least substantially reducing a communication privilege allowed to the node of the plurality of networked nodes; and/or
sending a notice receivable by a device associatable with a person associated with the node of the plurality of networked nodes.

10. The network device of claim 1, wherein the countermeasure engine operable to generate a plurality of malware countermeasures further includes:
a countermeasure engine operable to generate at least one of the plurality of malware countermeasures by combining a number of available malware countermeasures.

11. The network device of claim 1, wherein the distribution module operable to transmit the selected generated malware countermeasure to a first set of nodes of the plurality of networked nodes if the criterion is met further includes:
a distribution module operable to transmit the selected generated malware countermeasure to a first set of nodes of the plurality of networked nodes using a distribution schema if the criterion is met.

12. The network device of claim 1, wherein a particular node of the plurality of networked nodes further includes:
at least one of another network device, a network appliance, a computing device, a desktop computing device, a laptop computing device, a mobile computing device, a host, a server, and/or a network card of a computing device.

13. The network device of claim 1, wherein a particular node of the plurality of networked nodes further includes:
at least one of a switch, a bridge, a router, an edge router, a gateway, a hub, and/or a repeater.

14. The network device of claim 1, further comprising:
an information store operable to save at least one generated malware countermeasure.

15. The network device of claim 1, further comprising:
a communication module operable to cause transmission of a packet to at least one node of the plurality of networked nodes.

16. A method implemented in a computing device operable to facilitate communication of a packet to at least one node of a plurality of networked nodes, the method comprising:
generating a plurality of countermeasures useable in at least substantially reducing a harm caused by a malware (hereafter "malware countermeasure"), the plurality of malware countermeasures generated responsive to an indication of the malware being present on a node of the plurality of networked nodes;
selecting a generated malware countermeasure for distribution from among at least two of the generated malware countermeasures;
determining if a criterion for distribution of the selected generated malware countermeasure to the plurality of networked nodes is met, the criterion for distribution of the selected generated malware countermeasure is independent of the indication of the malware being present on the node of the plurality of networked nodes; and
causing a transmission of the selected generated malware countermeasure to a first set of nodes of the plurality of networked nodes if the criterion is met.

17. The method of claim 16, wherein the generating a plurality of malware countermeasures further includes:
detecting an indication of a malware presence in the network device and generating the plurality of malware countermeasures in response to the indicated malware.

18. The method of claim 16, wherein the generating a plurality of malware countermeasures further includes:
detecting a signature and/or an anomaly corresponding to a malware presence in at least one of the network device, and/or in a node of the plurality of networked nodes, and generating the plurality of malware countermeasures in response to the detected signature and/or anomaly.

19. The method of claim 16, wherein the generating a plurality of malware countermeasures further includes:
identifying a malware having a presence in at least one of the network device and/or in a node of the plurality of networked nodes, and generating the plurality of malware countermeasures in response to the identified malware.

20. The method of claim 16, wherein the generating a plurality of malware countermeasures further includes:
identifying a signature and/or anomaly indicative of a malware having a presence in at least one of the network device and/or in a node of the plurality of networked nodes, and generating the plurality of malware countermeasures in response to the identified malware.

21. The method of claim 16, wherein the generating a plurality of malware countermeasures further includes:
generating the plurality of malware countermeasures in response to a signature characteristic of a malware having an indicated presence in at least one of the network device, and/or in a node of the plurality of networked nodes.

22. The method of claim 16, wherein the generating a plurality of malware countermeasures further includes:
generating the plurality of malware countermeasures in response to an anomaly aspect of a malware having an indicated presence in at least one of the network device, and/or in a node of the plurality of networked nodes.

23. The method of claim 16, wherein the generating a plurality of malware countermeasures further includes:
generating the plurality of malware countermeasures that include at least one of:
closing at least one port of the node of the plurality of networked nodes;
at least substantially isolating the node of the plurality of networked nodes from a remaining plurality of networked nodes;
at least substantially isolating at least one sub-network of nodes from the remaining plurality of networked nodes; and/or
at least substantially isolating a first sub-network of the plurality network nodes from a second sub-network of the plurality network nodes.

24. The method of claim 16, wherein the generating a plurality of malware countermeasures further includes:
generating the plurality of malware countermeasures that includes at least one of:
at least substantially reducing a functionality of the node of the plurality of networked nodes;
at least substantially reducing a communication privilege allowed the node of the plurality of networked nodes; and/or sending a notice receivable by a device associatable with a person associated with the node of the plurality of networked nodes.

25. The method of claim 16, wherein the generating a plurality of malware countermeasures further includes:
    generating the plurality of malware countermeasures in response to receiving data indicating a buffer overflow occurrence at the node of the plurality of nodes.

26. The method of claim 16, wherein the determining if a criterion is met for distribution of the selected generated malware countermeasure to the plurality of networked nodes further includes:
    transmitting the selected generated malware countermeasure to a first set of nodes of the plurality of networked nodes using a distribution schema if the criterion is met.

27. The method of claim 16, wherein a particular node of a plurality of networked nodes further includes:
    another network device, a network appliance, a computing device, a desktop computing device, a laptop computing device, a mobile computing device, a host, a server, and/or a network card of a computing device.

28. The method of claim 16, wherein a particular node of a plurality of networked nodes further includes:
    a switch, a bridge, a router, an edge router, a gateway, a hub, and/or a repeater.

29. The method of claim 16, further comprising:
    saving at least one generated malware countermeasure to an information store.

30. The method of claim 16, further comprising:
    causing a transmission of a packet to at least one node of the plurality of networked nodes.

31. A device comprising:
    means for generating a plurality of countermeasures useable in at least substantially reducing a harm caused by a malware (hereafter "malware countermeasure"), the malware countermeasures generated responsive to an indication of the malware being present on a node of a plurality of networked nodes;
    means for selecting a generated malware countermeasure for distribution from among at least two of the generated malware countermeasures;
    means for determining if a criterion for distribution of the selected generated malware countermeasure to the plurality of networked nodes is met, the criterion for distribution of the selected generated malware countermeasure is independent of the indication of the malware being present on the node of the plurality of networked nodes; and
    means for transmitting the selected generated malware countermeasure to a first set of nodes of the plurality of networked nodes if the criterion is met.

32. The device of claim 31, further comprising:
    means for saving at least one generated malware countermeasure.

33. The device of claim 31, further comprising:
    means for causing a transmission of a packet to at least one node of the plurality of networked nodes.

* * * * *

UNITED STATES PATENT AND TRADEMARK OFFICE
CERTIFICATE OF CORRECTION

PATENT NO. : 8,966,630 B2  
APPLICATION NO. : 11/487595  
DATED : February 24, 2015  
INVENTOR(S) : Jung et al.

Page 1 of 2

It is certified that error appears in the above-identified patent and that said Letters Patent is hereby corrected as shown below:

In the Claims

Column 36, Line 60, Claim 8 please delete "closing at least one port of the node of the plurality of" replace with --closing at least one port of a node of the plurality of--

Column 36, Line 62, Claim 8 please delete "at least substantially isolating the node of the plurality of" replace with --at least substantially isolating a node of the plurality of--

Column 37, Line 7, Claim 9 please delete "a countermeasure engine operable to generate the plurality of malware..." replace with --a countermeasure engine operable to generate a malware...--

Column 37, Line 10, Claim 9 please delete "at least substantially reducing a functionality of the node of" replace with --at least substantially reducing a functionality of a node of--

Column 37, Line 13, Claim 9 please delete "allowed to the node of the plurality of networked nodes;" replace with --allowed to a node of the plurality of networked nodes;--

Column 37, Line 16, Claim 9 please delete "person associated with the node of the plurality of" replace with --person associated with a node of the plurality of--

Column 37, Line 32, Claim 12 please delete "The network device of claim 1, wherein a particular node" replace with --The network device of claim 1, wherein a node--

Column 37, Line 39, Claim 13 please delete "The network device of claim 1, wherein a particular node" replace with --The network device of claim 1, wherein a node--

Column 38, Line 48, Claim 23 please delete "closing at least one port of the node..." replace with --closing at least one port of a node...--

Signed and Sealed this  
Eighteenth Day of August, 2015

Michelle K. Lee  
*Director of the United States Patent and Trademark Office*

CERTIFICATE OF CORRECTION (continued)
U.S. Pat. No. 8,966,630 B2

Column 38, Line 50, Claim 23 "at least substantially isolating the node..." replace with --at least substantially isolating a node...--

Column 38, Line 63, Claim 24 please delete "at least substantially reducing a functionality of the node..." replace with --at least substantially reducing a functionality of a node...--

Column 38, Line 66, Claim 24 please delete "allowed the node of the plurality of networked nodes;" replace with --allowed a node of the plurality of networked nodes;--

Column 39, Line 2, Claim 24 please delete "person associated with the node of the plurality..." replace with --person associated with a node of the plurality...--